US008452898B2

(12) United States Patent
Abe et al.

(10) Patent No.: US 8,452,898 B2
(45) Date of Patent: May 28, 2013

(54) INFORMATION PROCESSING APPARATUS, METHOD THEREFOR, AND COMPUTER-READABLE STORAGE MEDIUM

(75) Inventors: Koichi Abe, Yokohama (JP); Hideki Honda, Kawasaki (JP); Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 12/425,289

(22) Filed: Apr. 16, 2009

(65) Prior Publication Data

US 2009/0265482 A1  Oct. 22, 2009

(30) Foreign Application Priority Data

Apr. 17, 2008 (JP) ................... 2008-107942
Oct. 1, 2008 (JP) ................... 2008-256417
Feb. 18, 2009 (JP) ................... 2009-035628

(51) Int. Cl.
*G06F 3/00* (2006.01)

(52) U.S. Cl.
USPC ............................................................ 710/8

(58) Field of Classification Search
USPC ............................................................ 710/8
See application file for complete search history.

(56) References Cited

U.S. PATENT DOCUMENTS

| | | | |
|---|---|---|---|
| 6,839,742 B1 * | 1/2005 | Dyer et al. | 709/217 |
| 7,640,554 B2 * | 12/2009 | Yamade | 710/8 |
| 2003/0187922 A1 | 10/2003 | Ohara | |
| 2004/0001238 A1 * | 1/2004 | Leja et al. | 358/474 |
| 2005/0111856 A1 * | 5/2005 | Kawai | 399/8 |
| 2005/0174609 A1 * | 8/2005 | Thurlow | 358/425 |
| 2007/0002355 A1 | 1/2007 | Kai | |
| 2007/0064268 A1 | 3/2007 | Hino | |

FOREIGN PATENT DOCUMENTS

| | | |
|---|---|---|
| JP | 11-232066 A | 8/1999 |
| JP | 2002-157126 A | 5/2002 |
| JP | 2003-296273 A | 10/2003 |
| JP | 2007-011794 A | 1/2007 |
| JP | 2007-069388 A | 3/2007 |

OTHER PUBLICATIONS

Office action issued on Feb. 12, 2013 in counterpart Japanese Application No. 2009-035628.

* cited by examiner

*Primary Examiner* — Chun-Kuan Lee
*Assistant Examiner* — Dayton Lewis-Taylor
(74) *Attorney, Agent, or Firm* — Carter, DeLuca, Farrell & Schmidt LLP

(57) ABSTRACT

An information processing apparatus connected with a peripheral apparatus via a communication line includes an acquisition unit configured to acquire information about a destination of the peripheral apparatus, and a provision unit configured to provide functions for at least one of managing and controlling the peripheral apparatus according to the destination information acquired by the acquisition unit. The provision unit is configured to refer to information indicating a function to be provided according to the destination of the peripheral apparatus and to provide a function for at least one of managing and controlling the peripheral apparatus.

15 Claims, 76 Drawing Sheets

ARROW "↔" INDICATES ADDRESS BUS AND DATA BUS.

FIG.4
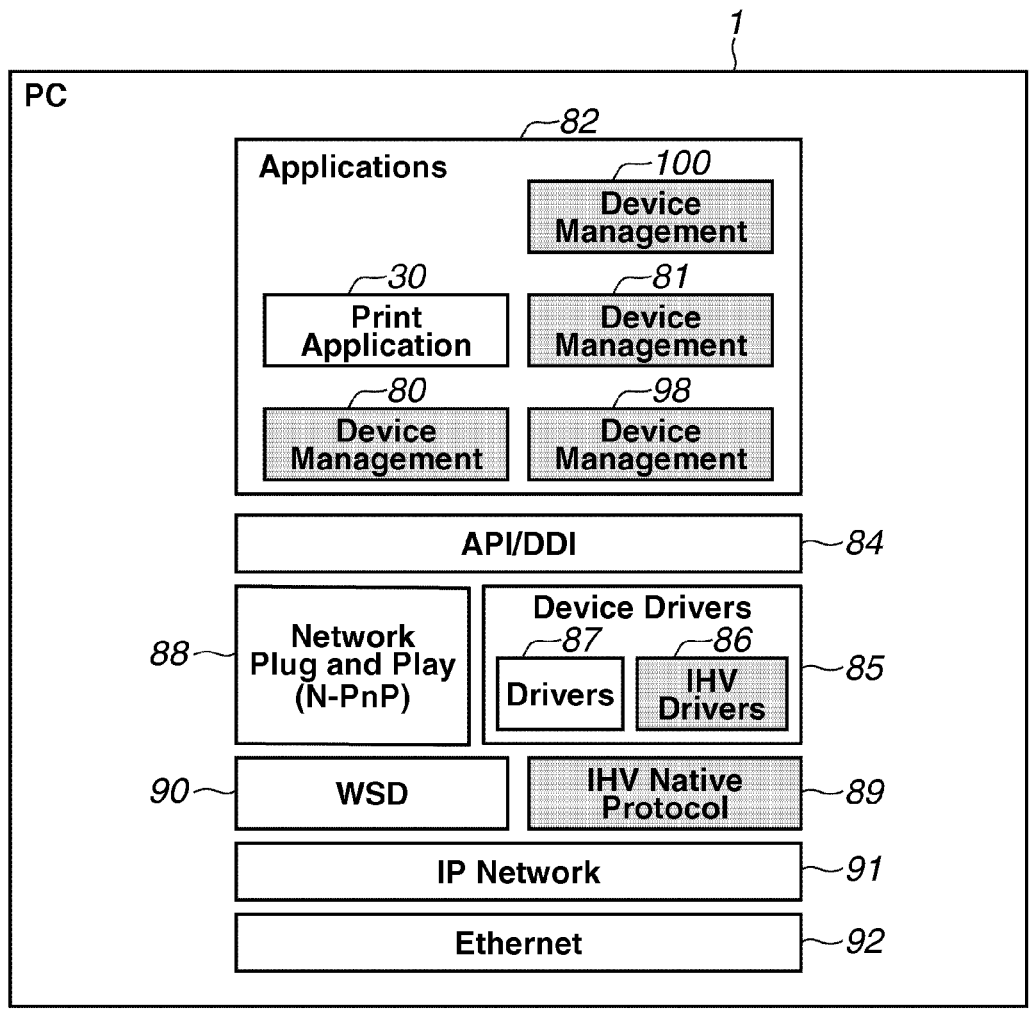
 ... MODULE BUNDLED TO OS AS STANDARD
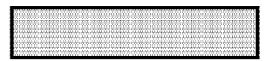 ... MODULE MANUFACTURED BY IHV

FIG.10A

MFG:ABC;MDL:Kmmn;CLS:PRINTER;CMD:K4;DES:ABC Kmmn;LOC:JPN;

FIG.10B

MFG:ABC;MDL:Kmmn;CLS:PRINTER;CMD:K4;DES:ABC Kmmn;LOC:USA;

FIG.10C

MFG:ABC;MDL:Kmmn;CLS:PRINTER;CMD:K4;DES:ABC Kmmn;LOC:FRA;

FIG.10D

MFG:ABC;MDL:Kmmn;CLS:PRINTER;CMD:K4;DES:ABC Kmmn;LOC:KOR;

FIG.11

| DESTINATION OF DEVICE | "LOC" OF DEVICE ID |
|---|---|
| JAPAN | JPN |
| USA | USA |
| FRANCE | FRA |
| KOREA | KOR |

FIG.12

```xml
<?xml version="1.0" encoding="utf-8"?>
<dm:deviceManagement xmlns:dm="http://abc.xxx/dm/control">
    <dm:manufacturer>ABC<dm:manufacturer>
    <dm:model>Kmmn<dm:model>
    <dm:functions>
        <dm:keywordInDeviceId string="LOC:JPN">
            <dm:function>
                <dm:name xml:lang="ja">PRINTING PREFERENCES</dm:name>
                <dm:execute>printingPreferences</dm:execute>
            </dm:function>
            <dm:function>
                <dm:name xml:lang="ja">MAINTENANCE</dm:name>
                <dm:execute>printerMaintenance</dm:execute>
            </dm:function>
            <dm:function>
                <dm:name xml:lang="ja">BUY CARTRIDGE</dm:name>
                <dm:execute>http://abc.xxx/buyink/index.html</dm:execute>
            </dm:function>
        </dm:keywordInDeviceId>
        <dm:keywordInDeviceId string="LOC:USA">
            <dm:function>
                <dm:name xml:lang="en-US">Printing Preferences</dm:name>
                <dm:execute>printingPreferences</dm:execute>
            </dm:function>
            <dm:function>
                <dm:name xml:lang="en-US">Maintenance</dm:name>
                <dm:execute>printerMaintenance</dm:execute>
            </dm:function>
        </dm:keywordInDeviceId>
        <dm:keywordInDeviceId string="LOC:FRA">
            <!-- If Device ID has the keyword "LOC:FRA", nothing will be displayed. -->
        </dm:keywordInDeviceId>
    </dm:functions>
</dm:deviceManagement>
```

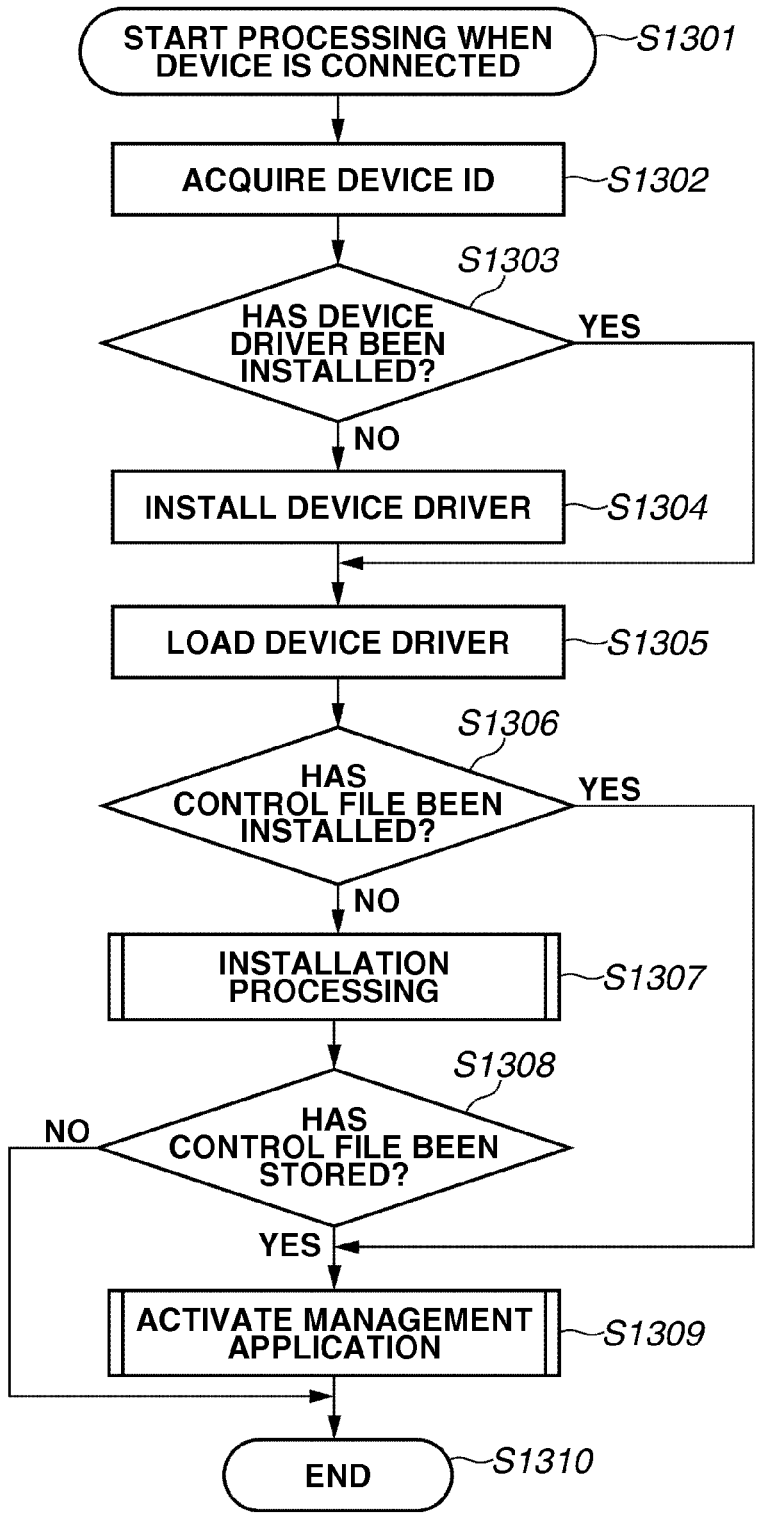

FIG.19

```xml
<?xml version="1.0" encoding="utf-8"?>
<dm:deviceManagement xmlns:dm="http://abc.xxx/dm/control">
    <dm:manufacturer>ABC<dm:manufacturer>
    <dm:model>Kmmn<dm:model>
    <dm:functions>
        <dm:function nameDLL="vendor.dll" name="10">
            <dm:execute>printingPreferences</dm:execute>
        </dm:function>
        <dm:getKeyword DLL="vendor.dll" keywordName="LOC">
            <dm:keywordFound keywordName="LOC" keywordValue="JPN">
                <dm:function nameDLL="vendor.dll" name="20">
                    <dm:execute>http://abc.xxx/buyink/index.html</dm:execute>
                </dm:function>
            </dm:keywordFound>
        </dm:getKeyword>
    </dm:functions>
</dm:deviceManagement>
```

FIG.23

| | 2301 | 2302 | 2303 | |
|---|---|---|---|---|

| Registry Editor | | | |
|---|---|---|---|
| My Computer | name | type | data |
| ⋯HKEY_CLASSES_ROOT | LOC | REG_SZ | JPN |
| ⋯HKEY_CURRENT_USER | | | |
| ⋯HKEY_LOCAL_MACHINE | 2304 | 2305 | 2306 |
|    ⋯HARDWARE | | | |
|    ⋯SOFTWARE | | | |
|      ⋯ABC | | | |
|        ⋯ABC Kmmn (JPN) | | | |
|        ⋯ABC Kmmn (USA) | | | |

FIG.26

```
<?xml version="1.0" encoding="utf-8"?>
<dm:deviceManagement xmlns:dm="http://abc.xxx/dm/control">
    <dm:manufacturer>ABC<dm:manufacturer>
    <dm:model>Kmmn<dm:model>
    <dm:functions>
        <dm:keywordInRegistry
            key="HKEY_LOCAL_MACHINE¥SOFTWARE¥ABC¥ABC Kmmn (JPN)"value="LOC:JPN">
            <dm:function>
                <dm:name xml:lang="ja">PRINTING PREFERENCES</dm:name>
                <dm:execute>printingPreferences</dm:execute>
            </dm:function>
            <dm:function>
                <dm:name xml:lang="ja">MAINTENANCE</dm:name>
                <dm:execute>printerMaintenance</dm:execute>
            </dm:function>
            <dm:function>
                <dm:name xml:lang="ja">BUY CARTRIDGE</dm:name>
                <dm:execute>http://abc.xxx/buyink/index.html?LOC=JPN</dm:execute>
            </dm:function>
        </dm:keywordInRegistry>
        <dm:keywordInRegistry
            key="HKEY_LOCAL_MACHINE¥SOFTWARE¥ABC¥ABC Kmmn (USA)"value="LOC:USA">
            <dm:function>
                <dm:name xml:lang="en-US">Printing Preferences</dm:name>
                <dm:execute>printingPreferences</dm:execute>
            </dm:function>
            <dm:function>
                <dm:name xml:lang="en-US">Maintenance</dm:name>
                <dm:execute>printerMaintenance</dm:execute>
            </dm:function>
            <dm:function>
                <dm:name xml:lang="en-US">Buy Cartridge</dm:name>
                <dm:execute>http://abc.xxx/buyink/index.html?LOC=US</dm:execute>
            </dm:function>
        </dm:keywordInRegistry>
    </dm:functions>
</dm:deviceManagement>
```

FIG.35

|  | 3501 | 3502 | 3503 |  |
|---|---|---|---|---|
| Registry Editor | | | | |
| My Computer<br>⊢-- HKEY_CLASSES_ROOT<br>⊢-- HKEY_CURRENT_USER<br>⊢-- HKEY_LOCAL_MACHINE<br>    ⊢-- HARDWARE<br>    ⊢-- SOFTWARE<br>        ⊢-- ABC<br>            ⊢- ABC Kmmn (JPN)<br>            ⊢- ABC Kmmn (USA) | name<br>LOC<br>3504 | type<br>REG_SZ<br>3505 | data<br>US-English<br>3506 | |

FIG.36

```xml
<?xml version="1.0" encoding="utf-8"?>
<dm:deviceManagement xmlns:dm="http://abc.xxx/dm/control">
    <dm:functions>
        <dm:keywordInRegistry path="HKEY_LOCAL_MACHINE¥SOFTWARE¥ABC¥ABC Kmmn (USA)">
            <dm:function>
                <dm:name xml:lang="en-US">Printing Preferences</dm:name>
                <dm:execute>printingPreferences</dm:execute>
            </dm:function>
            <dm:function>
                <dm:name xml:lang="en-US">Maintenance</dm:name>
                <dm:execute>printerMaintenance</dm:execute>
            </dm:function>
            <dm:keywordInRegistryValue type="REG_SZ" name="LOC" value="US" search="part">
                <dm:function>
                    <dm:name xml:lang="en-US">Buy Cartridge</dm:name>
                    <dm:execute>http://abc.xxx/buyink/index.html?LOC=US</dm:execute>
                </dm:function>
            </dm:keywordInRegistryValue>
        </dm:keywordInRegistry>
    </dm:functions>
</dm:deviceManagement>
```

FIG.37

|  | 3701 | 3702 | 3703 |
|---|---|---|---|

| Registry Editor | | | |
|---|---|---|---|
| My Computer | name | type | data |
| ---HKEY_CLASSES_ROOT | INKREMAIN | REG_DWORD | 0x0000000a(10) |
| ---HKEY_CURRENT_USER | | | |
| ---HKEY_LOCAL_MACHINE | 3704 | 3705 | 3706 |
|    ---HARDWARE | | | |
|    ---SOFTWARE | | | |
|       ---ABC | | | |
|          --- ABC Kmmn (JPN) | | | |
|          --- ABC Kmmn (USA) | | | |

FIG.38

```xml
<?xml version="1.0" encoding="utf-8"?>
<dm:deviceManagement xmlns:dm="http://abc.xxx/dm/control">
    <dm:functions>
        <dm:keywordInRegistry path="HKEY_LOCAL_MACHINE¥SOFTWARE¥ABC¥ABC Kmmn (USA)">
            <dm:function>
                <dm:name xml:lang="en-US">Printing Preferences</dm:name>
                <dm:execute>printingPreferences</dm:execute>
            </dm:function>
            <dm:function>
                <dm:name xml:lang="en-US">Maintenance</dm:name>
                <dm:execute>printerMaintenance</dm:execute>
            </dm:function>
            <dm:keywordInRegistryValue type="REG_DWORD" name="INKREMAIN" value="20" search="smaller">
                <dm:function>
                    <dm:name xml:lang="en-US">Buy Cartridge</dm:name>
                    <dm:execute>http://abc.xxx/buyink/index.html?LOC=US</dm:execute>
                </dm:function>
            </dm:keywordInRegistryValue>
        </dm:keywordInRegistry>
    </dm:functions>
</dm:deviceManagement>
```

FIG.46

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions>
        <dm:keywordInRegistry
            key="HKEY_LOCAL_MACHINE¥SOFTWARE¥ABC¥Setup¥Kmmn" value="CD_Name:JPN_CD">
            <dm:function>
                <dm:name xml:lang="en-US">Support (Japan)</dm:name>
                <dm:execute>
                    http://abc.xxx/support/index.html?
                        CD_Name=JPN_CD&AREA=Japan&LANG=0409&MDL1=Kmmn
                </dm:execute>
            </dm:function>
            <dm:function>
                <dm:name xml:lang="en-US">Download (Japan)</dm:name>
                <dm:execute>
                    http://abc.xxx/download/index.html?
                        CD_Name=JPN_CD&AREA=Japan&LANG=0409&MDL1=Kmmn
                </dm:execute>
            </dm:function>
        </dm:keywordInRegistry>
        <dm:keywordInRegistry
            key="HKEY_LOCAL_MACHINE¥SOFTWARE¥ABC¥Setup¥Kmmn" value="CD_Name:USA_CD">
            <dm:function>
                <dm:name xml:lang="en-US">Support (America)</dm:name>
                <dm:execute>
                    http://abc.xxx/support/index.html?
                        CD_Name=USA_CD&AREA=America&LANG=0409&MDL1=Kmmn
                </dm:execute>
            </dm:function>
            <dm:function>
                <dm:name xml:lang="en-US">Download (America)</dm:name>
                <dm:execute>
                    http://abc.xxx/download/index.html?
                        CD_Name=USA_CD&AREA=America&LANG=0409&MDL1=Kmmn
                </dm:execute>
            </dm:function>
        </dm:keywordInRegistry>
```

FIG.47

```
<dm:keywordInRegistry
    key="HKEY_LOCAL_MACHINE¥SOFTWARE¥ABC¥Setup¥Kmmn" value="CD_Name:EUR_CD">
    <dm:function>
        <dm:name xml:lang="en-US">Support (Europe)</dm:name>
        <dm:execute>
            http://abc.xxx/support/index.html?
                CD_Name=EUR_CD&AREA=Europe&LANG=0409&MDL1=Kmmn
        </dm:execute>
    </dm:function>
    <dm:function>
        <dm:name xml:lang="en-US">Download (Europe)</dm:name>
        <dm:execute>
            http://abc.xxx/download/index.html?
                CD_Name=EUR_CD&AREA=Europe&LANG=0409&MDL1=Kmmn
        </dm:execute>
    </dm:function>
</dm:keywordInRegistry>
<dm:keywordInRegistry
    key="HKEY_LOCAL_MACHINE¥SOFTWARE¥ABC¥Setup¥Kmmn" value="CD_Name:ASIA_CD">
    <dm:function>
        <dm:name xml:lang="en-US">Support (Asia)</dm:name>
        <dm:execute>
            http://abc.xxx/support/index.html?
                CD_Name=ASIA_CD&AREA=Asia&LANG=0409&MDL1=Kmmn
        </dm:execute>
    </dm:function>
    <dm:function>
        <dm:name xml:lang="en-US">Download (Asia)</dm:name>
        <dm:execute>
            http://abc.xxx/download/index.html?
                CD_Name=ASIA_CD&AREA=Asia&LANG=0409&MDL1=Kmmn
        </dm:execute>
    </dm:function>
</dm:keywordInRegistry>
</dm:functions>
</dm:deviceManagement>
```

FIG.48

```
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions>
        <dm:keywordInRegistry invert="true"
            key="HKEY_LOCAL_MACHINE¥SOFTWARE¥ABC¥Setup¥Kmmn"
            key="HKEY_LOCAL_MACHINE¥SOFTWARE¥ABC¥Setup¥Deef"
            key="HKEY_LOCAL_MACHINE¥SOFTWARE¥ABC¥Setup¥Oppq"
            key="HKEY_LOCAL_MACHINE¥SOFTWARE¥ABC¥Setup¥Rsst">
            <dm:function>
                <dm:name xml:lang="en-US">Support</dm:name>
                <dm:execute>selectSupportArea1_0409</dm:execute>
            </dm:function>
            <dm:function>
                <dm:name xml:lang="en-US">Download</dm:name>
                <dm:execute>selectDownloadArea1_0409</dm:execute>
            </dm:function>
        </dm:keywordInRegistry>
    </dm:functions>
</dm:deviceManagement>
```

FIG.49

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions id="selectSupportArea1_0409">
        <dm:keywordInRegistry invert="true"
            key="HKEY_LOCAL_MACHINE¥SOFTWARE¥ABC¥Setup¥Kmmn"
            key="HKEY_LOCAL_MACHINE¥SOFTWARE¥ABC¥Setup¥Deef"
            key="HKEY_LOCAL_MACHINE¥SOFTWARE¥ABC¥Setup¥Oppq"
            key="HKEY_LOCAL_MACHINE¥SOFTWARE¥ABC¥Setup¥Rsst">
            <dm:function id="supportJapan_0409">
                <dm:name xml:lang="en-US">Japan</dm:name>
                <dm:execute>
                    http://abc.xxx/support/index.html?CD_Name=JPN_CD&AREA=Japan&LANG=0409
                </dm:execute>
            </dm:function>
            <dm:function id="supportAmerica_0409">
                <dm:name xml:lang="en-US">America</dm:name>
                <dm:execute>
                    http://abc.xxx/support/index.html?CD_Name=USA_CD&AREA=America&LANG=0409
                </dm:execute>
            </dm:function>
            <dm:function id="supportEurope_0409">
                <dm:name xml:lang="en-US">Europe</dm:name>
                <dm:execute>
                    http://abc.xxx/support/index.html?CD_Name=EUR_CD&AREA=Europe&LANG=0409
                </dm:execute>
            </dm:function>
            <dm:function id="supportAsia_0409">
                <dm:name xml:lang="en-US">Asia</dm:name>
                <dm:execute>
                    http://abc.xxx/support/index.html?CD_Name=ASIA_CD&AREA=Asia&LANG=0409
                </dm:execute>
            </dm:function>
        </dm:keywordInRegistry>
    </dm:functions>
</dm:deviceManagement>
```

FIG.50

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions id="selectDownloadArea1_0409">
        <dm:keywordInRegistry invert="true"
            key="HKEY_LOCAL_MACHINE¥SOFTWARE¥ABC¥Setup¥Kmmn"
            key="HKEY_LOCAL_MACHINE¥SOFTWARE¥ABC¥Setup¥Deef"
            key="HKEY_LOCAL_MACHINE¥SOFTWARE¥ABC¥Setup¥Oppq"
            key="HKEY_LOCAL_MACHINE¥SOFTWARE¥ABC¥Setup¥Rsst">
            <dm:function id="downloadJapan_0409">
                <dm:name xml:lang="en-US">Japan</dm:name>
                <dm:execute>
                    http://abc.xxx/download/index.html?CD_Name=JPN_CD&AREA=Japan&LANG=0409
                </dm:execute>
            </dm:function>
            <dm:function id="downloadAmerica_0409">
                <dm:name xml:lang="en-US">America</dm:name>
                <dm:execute>
                    http://abc.xxx/download/index.html?CD_Name=USA_CD&AREA=America&LANG=0409
                </dm:execute>
            </dm:function>
            <dm:function id="downloadEurope_0409">
                <dm:name xml:lang="en-US">Europe</dm:name>
                <dm:execute>
                    http://abc.xxx/download/index.html?CD_Name=EUR_CD&AREA=Europe&LANG=0409
                </dm:execute>
            </dm:function>
            <dm:function id="downloadAsia_0409">
                <dm:name xml:lang="en-US">Asia</dm:name>
                <dm:execute>
                    http://abc.xxx/download/index.html?CD_Name=ASIA_CD&AREA=Asia&LANG=0409
                </dm:execute>
            </dm:function>
        </dm:keywordInRegistry>
    </dm:functions>
</dm:deviceManagement>
```

FIG.51

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions>
        <dm:keywordInRegistry
            key="HKEY_LOCAL_MACHINE¥SOFTWARE¥ABC¥Device¥Kmmn¥LOC:JPN">
            <dm:function>
                <dm:name xml:lang="en-US">Support (Japan)</dm:name>
                <dm:execute>
                    http://abc.xxx/support/index.html?
                        CD_Name=JPN_CD&AREA=Japan&LANG=0409&MDL1=Kmmn
                </dm:execute>
            </dm:function>
            <dm:function>
                <dm:name xml:lang="en-US">Download (Japan)</dm:name>
                <dm:execute>
                    http://abc.xxx/download/index.html?
                        CD_Name=JPN_CD&AREA=Japan&LANG=0409&MDL1=Kmmn
                </dm:execute>
            </dm:function>
        </dm:keywordInRegistry>
        <dm:keywordInRegistry
            key="HKEY_LOCAL_MACHINE¥SOFTWARE¥ABC¥Device¥Kmmn¥LOC:USA">
            <dm:function>
                <dm:name xml:lang="en-US">Support (America)</dm:name>
                <dm:execute>
                    http://abc.xxx/support/index.html?
                        CD_Name=USA_CD&AREA=America&LANG=0409&MDL1=Kmmn
                </dm:execute>
            </dm:function>
            <dm:function>
                <dm:name xml:lang="en-US">Download (America)</dm:name>
                <dm:execute>
                    http://abc.xxx/download/index.html?
                        CD_Name=USA_CD&AREA=America&LANG=0409&MDL1=Kmmn
                </dm:execute>
            </dm:function>
        </dm:keywordInRegistry>
```

FIG.52

```
<dm:keywordInRegistry
    key="HKEY_LOCAL_MACHINE¥SOFTWARE¥ABC¥Device¥Kmmn¥LOC:FRA">
    <dm:function>
        <dm:name xml:lang="en-US">Support (France)</dm:name>
        <dm:execute>
            http://abc.xxx/support/index.html?
                CD_Name=EUR_CD&AREA=France&LANG=0409&MDL1=Kmmn
        </dm:execute>
    </dm:function>
    <dm:function>
        <dm:name xml:lang="en-US">Download (France)</dm:name>
        <dm:execute>
            http://abc.xxx/download/index.html?
                CD_Name=EUR_CD&AREA=France&LANG=0409&MDL1=Kmmn
        </dm:execute>
    </dm:function>
</dm:keywordInRegistry>
<dm:keywordInRegistry
    key="HKEY_LOCAL_MACHINE¥SOFTWARE¥ABC¥Device¥Kmmn¥LOC:KOR">
    <dm:function>
        <dm:name xml:lang="en-US">Support (Korea)</dm:name>
        <dm:execute>
            http://abc.xxx/support/index.html?
                CD_Name=ASIA_CD&AREA=Korea&LANG=0409&MDL1=Kmmn
        </dm:execute>
    </dm:function>
    <dm:function>
        <dm:name xml:lang="en-US">Download (Korea)</dm:name>
        <dm:execute>
            http://abc.xxx/download/index.html?
                CD_Name=ASIA_CD&AREA=Korea&LANG=0409&MDL1=Kmmn
        </dm:execute>
    </dm:function>
</dm:keywordInRegistry>
</dm:functions>
</dm:deviceManagement>
```

FIG.53

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions>
        <dm:keywordInRegistry invert="true"
            key="HKEY_LOCAL_MACHINE¥SOFTWARE¥ABC¥Device¥Kmmn"
            key="HKEY_LOCAL_MACHINE¥SOFTWARE¥ABC¥Device¥Deef"
            key="HKEY_LOCAL_MACHINE¥SOFTWARE¥ABC¥Device¥Oppq"
            key="HKEY_LOCAL_MACHINE¥SOFTWARE¥ABC¥Device¥Rsst">
        </dm:function>
            <dm:name xml:lang="en-US">Support</dm:name>
            <dm:execute>selectSupportArea2_0409</dm:execute>
        </dm:function>
        </dm:function>
            <dm:name xml:lang="en-US">Download</dm:name>
            <dm:execute>selectDownloadArea2_0409</dm:execute>
        </dm:function>
        </dm:keywordInRegistry>
    </dm:functions>
</dm:deviceManagement>
```

FIG.54

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions id="selectSupportArea2_0409">
        <dm:keywordInRegistry invert="true"
            key="HKEY_LOCAL_MACHINE¥SOFTWARE¥ABC¥Device¥Kmmn"
            key="HKEY_LOCAL_MACHINE¥SOFTWARE¥ABC¥Device¥Deef"
            key="HKEY_LOCAL_MACHINE¥SOFTWARE¥ABC¥Device¥Oppq"
            key="HKEY_LOCAL_MACHINE¥SOFTWARE¥ABC¥Device¥Rsst">
            <dm:function id="supportJapan_0409">
                <dm:name xml:lang="en-US">Japan</dm:name>
                <dm:execute>
                    http://abc.xxx/support/index.html?CD_Name=JPN_CD&AREA=Japan&LANG=0409
                </dm:execute>
            </dm:function>
            <dm:function id="supportAmerica_0409">
                <dm:name xml:lang="en-US">America</dm:name>
                <dm:execute>
                    http://abc.xxx/support/index.html?CD_Name=USA_CD&AREA=America&LANG=0409
                </dm:execute>
            </dm:function>
            <dm:function id="supportEurope_0409">
                <dm:name xml:lang="en-US">Europe</dm:name>
                <dm:execute>
                    http://abc.xxx/support/index.html?CD_Name=EUR_CD&AREA=Europe&LANG=0409
                </dm:execute>
            </dm:function>
            <dm:function id="supportAsia_0409">
                <dm:name xml:lang="en-US">Asia</dm:name>
                <dm:execute>
                    http://abc.xxx/support/index.html?CD_Name=ASIA_CD&AREA=Asia&LANG=0409
                </dm:execute>
            </dm:function>
        </dm:keywordInRegistry>
    </dm:functions>
</dm:deviceManagement>
```

FIG.55

```xml
<?xml version="1.0" encoding="utf-8"?>
<dm:deviceManagement xmlns:dm="http://abc.xxx/dm/control">
    <dm:manufacturer>ABC</dm:manufacturer>
    <dm:model>Kmmn</dm:model>
    <dm:model>Deef</dm:model>
    <dm:model>Oppq</dm:model>
    <dm:model>Rsst</dm:model>
    <dm:functions id="selectDownloadArea2_0409">
        <dm:keywordInRegistry invert="true"
            key="HKEY_LOCAL_MACHINE¥SOFTWARE¥ABC¥Device¥Kmmn"
            key="HKEY_LOCAL_MACHINE¥SOFTWARE¥ABC¥Device¥Deef"
            key="HKEY_LOCAL_MACHINE¥SOFTWARE¥ABC¥Device¥Oppq"
            key="HKEY_LOCAL_MACHINE¥SOFTWARE¥ABC¥Device¥Rsst">
            <dm:function id="downloadJapan_0409">
                <dm:name xml:lang="en-US">Japan</dm:name>
                <dm:execute>
                    http://abc.xxx/download/index.html?CD_Name=JPN_CD&AREA=Japan&LANG=0409
                </dm:execute>
            </dm:function>
            <dm:function id="downloadAmerica_0409">
                <dm:name xml:lang="en-US">America</dm:name>
                <dm:execute>
                    http://abc.xxx/download/index.html?CD_Name=USA_CD&AREA=America&LANG=0409
                </dm:execute>
            </dm:function>
            <dm:function id="downloadEurope_0409">
                <dm:name xml:lang="en-US">Europe</dm:name>
                <dm:execute>
                    http://abc.xxx/download/index.html?CD_Name=EUR_CD&AREA=Europe&LANG=0409
                </dm:execute>
            </dm:function>
            <dm:function id="downloadAsia_0409">
                <dm:name xml:lang="en-US">Asia</dm:name>
                <dm:execute>
                    http://abc.xxx/download/index.html?CD_Name=ASIA_CD&AREA=Asia&LANG=0409
                </dm:execute>
            </dm:function>
        </dm:keywordInRegistry>
    </dm:functions>
</dm:deviceManagement>
```

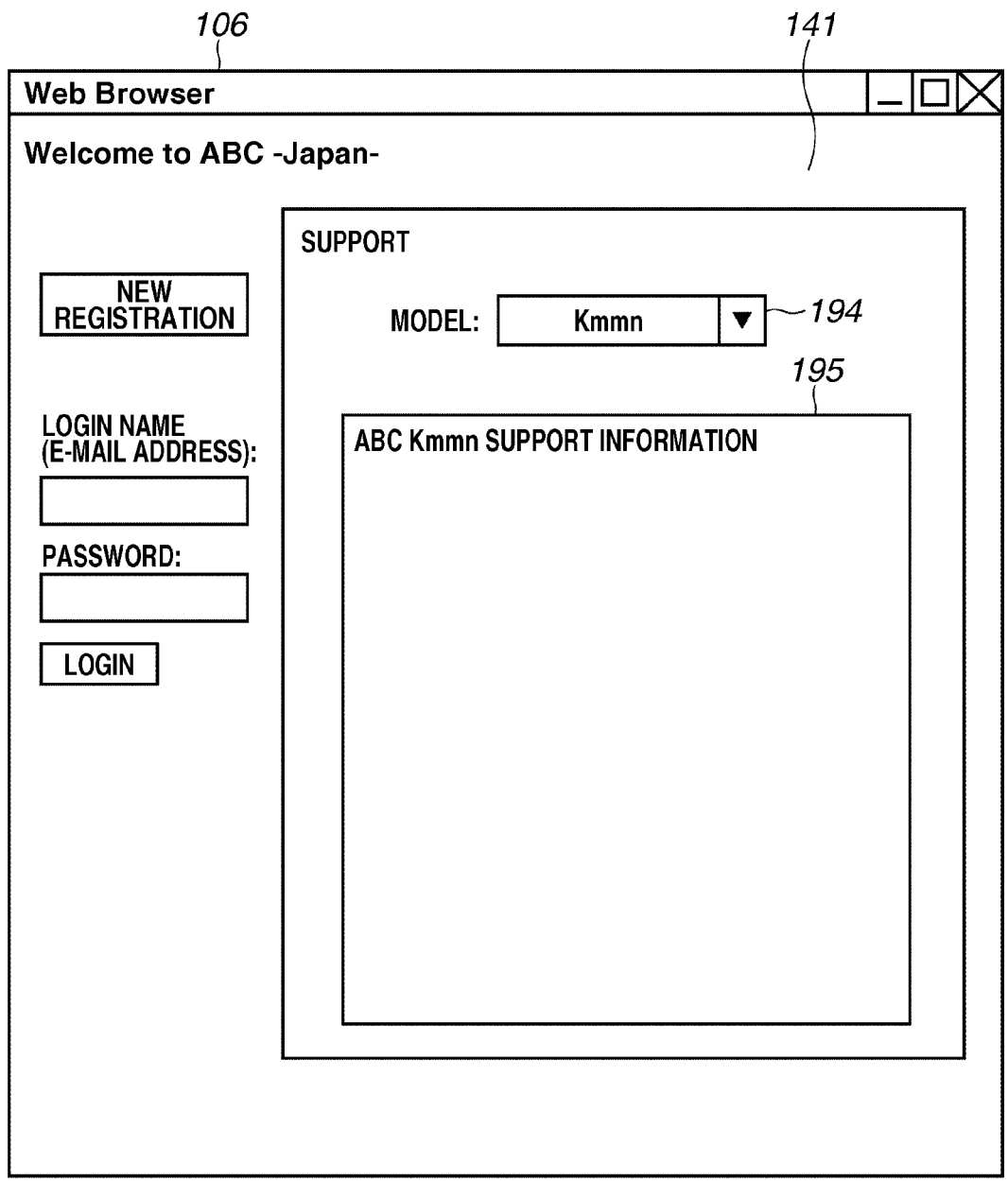

FIG.73A

MFG:ABC;MDL:Oppq;CLS:PRINTER;CMD:K4;DES:ABC Oppq;LOC:JPN;

FIG.73B

MFG:ABC;MDL:Rsst;CLS:PRINTER;CMD:K4;DES:ABC Rsst;LOC:USA;

FIG.73C

MFG:ABC;MDL:Deef;CLS:PRINTER;CMD:K4;DES:ABC Deef;LOC:FRA;

INFORMATION PROCESSING APPARATUS, METHOD THEREFOR, AND COMPUTER-READABLE STORAGE MEDIUM

BACKGROUND OF THE INVENTION

1. Field of the Invention

The present invention relates to control executed by an information processing apparatus when the information processing apparatus is connected to a device such as a printer.

2. Description of the Related Art

In recent years, in order to utilize a peripheral apparatus (hereinafter sometimes referred to as a "device"), an information processing apparatus is connected with a peripheral apparatus via various types of interfaces, such as universal serial bus (USB), Ethernet, or a wireless local area network (LAN). As an example of the peripheral apparatus, a printer, a copying machine, a facsimile apparatus, a scanner, a digital camera, and an apparatus having a combination of functions of such machines and apparatuses can be used. In this regard, a device management application can be used to control the operation of the peripheral apparatus. By utilizing the management application, a setting for a peripheral apparatus and a device driver that complies with each peripheral apparatus can be changed. In addition, by utilizing the management application, parts of the peripheral apparatus can be cleaned and maintenance of a peripheral apparatus, such as resetting of the setting set thereto, can be executed.

Meanwhile, with the recent widespread use of the Internet, various types of online services that utilize the Internet have been provided, which can be utilized by an information processing apparatus and a peripheral apparatus connected to the Internet. In this regard, for example, an online purchasing service that allows a user to buy an ink or toner cartridge used in a printer via the Internet has been provided.

In addition, a system has been provided that allows a user to buy a cartridge online via the Internet by accessing the purchasing service from the above-described management application. Furthermore, Japanese Patent Application Laid-Open No. 2007-011794 discusses a method for allowing a user to recognize and purchase an appropriate cartridge by displaying the model number of a cartridge when the ink in the cartridge of a printer has been fully consumed.

Furthermore, as a service provided via the Internet, an online service has been provided that allows a user to access and open an online user support page or an online software downloading page by a web browser.

The above-described online purchasing service for selling a cartridge via the Internet, for example, can be provided exclusively to a specific area or a country. In this regard, an online purchasing service for purchasing goods for a printer that is marketed in Japan may be provided exclusively in Japan and not in the United States or other areas or countries, for example.

In this case, in order to appropriately operate the above-described online cartridge purchasing system, a conventional method changes the specification of a management application itself for each destination of an operating system (OS) of the apparatus and provides the above-described service to a user. More specifically, in such a conventional method, a cartridge purchasing button and a function for purchasing a cartridge online are provided to a management application for Japan while a management application for the United States is not provided with such a button or a function. Thus, the conventional method does not allow a user to purchase a cartridge online by utilizing a management application whose destination is the USA.

Furthermore, if a management application is supplied with the OS of an information processing apparatus, a management application having an online cartridge purchasing function may be supplied only with an OS that supports Japanese language. However, if the specification of the management application to be supplied with an OS is changed for each destination of the OS, an American user who resides in Japan cannot use the online cartridge purchasing function if the American user uses an OS that supports English in Japan, for example.

If a Japanese user who resides in the United States uses an OS that supports Japanese language in the United States, the Japanese user may use the online cartridge purchasing function of the management application supplied with the OS to order a cartridge online. However, if a cartridge desired by the U.S. resident Japanese user is not marketed in the United States because the online cartridge purchasing function is intended for use within Japan, the U.S. resident Japanese user cannot actually purchase the desired cartridge.

In addition, with respect to an online service by which a user opens a user support page or a software downloading page online via the Internet, the display language and the service content thereof may differ for each area in which the device is marketed. More specifically, the content of the service that a printer supports may differ for each model type (model name).

Accordingly, if a user utilizes the above-described service by accessing the web site of the online service using the management application, the following problems may arise. That is, if a user who uses an OS that supports Japanese language in the United States opens an online user support page, for example, the user may reach a service web site for the Japanese market. In this case, the U.S. resident Japanese user cannot acquire information about a printer that is marketed exclusively in the United States.

Furthermore, even if a user can reach a service site of a desired area or country, if the user refers to information about a device of a model type (model name) that is different from the desired device, the user may operate the printer in a wrong manner or malfunction of the printer may occur.

SUMMARY OF THE INVENTION

The present invention is directed to a method for flexibly providing a function of a management application regardless of a display language that a user of a system sets by using the destination or model name of a peripheral apparatus that is actually used when different services are provided for each destination.

According to an aspect of the present invention, an information processing apparatus connected with a peripheral apparatus via a communication line is provided that includes an acquisition unit configured to acquire information about a destination of the peripheral apparatus, and a provision unit configured to provide functions for at least one of managing and controlling the peripheral apparatus according to the destination information acquired by the acquisition unit. The provision unit is configured to refer to information indicating a function to be provided according to the destination of the peripheral apparatus and to provide a function for at least one of managing and controlling the peripheral apparatus.

According to another aspect of the present invention, an information processing apparatus connected with a peripheral apparatus via a communication line is provided that includes an acquisition unit configured to acquire area information stored in a registry of the information processing apparatus during a setup of a driver of the peripheral apparatus as area information used in providing information about the peripheral apparatus, a display control unit configured to control a display for providing a plurality of functions for at least one of managing and controlling the peripheral apparatus, and a provision unit configured to provide a function according to the area information acquired by the acquisition unit in providing a specific function based on the display by the display control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4 illustrates an exemplary software configuration of the PC according to an exemplary embodiment of the present invention.

FIGS. 10A through 10D each illustrate a device identification (ID), which is information for uniquely identifying a printer according to the first exemplary embodiment of the present invention.

FIG. 11 illustrates an exemplary relationship between a destination and a device ID of a printer according to the first exemplary embodiment of the present invention.

FIG. 12 illustrates an example of the content of a control file according to the first exemplary embodiment of the present invention.

FIG. 13 is a flow chart illustrating exemplary processing executed by a PC when a device is connected according to an exemplary embodiment of the present invention.

FIG. 19 illustrates an example of the content of a control file according to the second exemplary embodiment of the present invention.

FIG. 23 illustrates an example of information described in the registry of the PC according to a third exemplary embodiment of the present invention.

FIG. 26 illustrates an example of the content of a control file according to the third exemplary embodiment of the present invention.

FIG. 35 illustrates an example of information described in the registry of a PC according to the third exemplary embodiment of the present invention.

FIG. 36 illustrates an example of the content of a control file according to the third exemplary embodiment of the present invention.

FIG. 37 illustrates an example of information described in the registry of a PC according to the third exemplary embodiment of the present invention.

FIG. 38 illustrates an example of the content of a control file according to the third exemplary embodiment of the present invention.

FIG. 46 illustrates an example of the content of a part of a control file used in managing and controlling a printer according to the fourth exemplary embodiment of the present invention.

FIG. 47 illustrates an example of the content of a part of a control file used in managing and controlling a printer according to the fourth exemplary embodiment of the present invention.

FIG. 48 illustrates an example of the content of a part of a control file used in managing and controlling a printer according to the fourth exemplary embodiment of the present invention.

FIG. 49 illustrates an example of the content of a part of a control file used in managing and controlling a printer according to the fourth exemplary embodiment of the present invention.

FIG. 50 illustrates an example of the content of a part of a control file used in managing and controlling a printer according to the fourth exemplary embodiment of the present invention.

FIG. 51 illustrates an example of the content of a part of a control file used in managing and controlling a printer according to the fourth exemplary embodiment of the present invention.

FIG. 52 illustrates an example of the content of a part of a control file used in managing and controlling a printer according to the fourth exemplary embodiment of the present invention.

FIG. 53 illustrates an example of the content of a part of a control file used in managing and controlling a printer according to the fourth exemplary embodiment of the present invention.

FIG. 54 illustrates an example of the content of a part of a control file used in managing and controlling a printer according to the fourth exemplary embodiment of the present invention.

FIG. 55 illustrates an example of the content of a part of a control file used in managing and controlling a printer according to the fourth exemplary embodiment of the present invention.

FIGS. 56A and 56B each illustrate an example of a user support page displayed on the display unit by using the web browser according to the fourth exemplary embodiment of the present invention.

FIGS. 73A through 73C each illustrate an example of a device ID according to the fourth exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
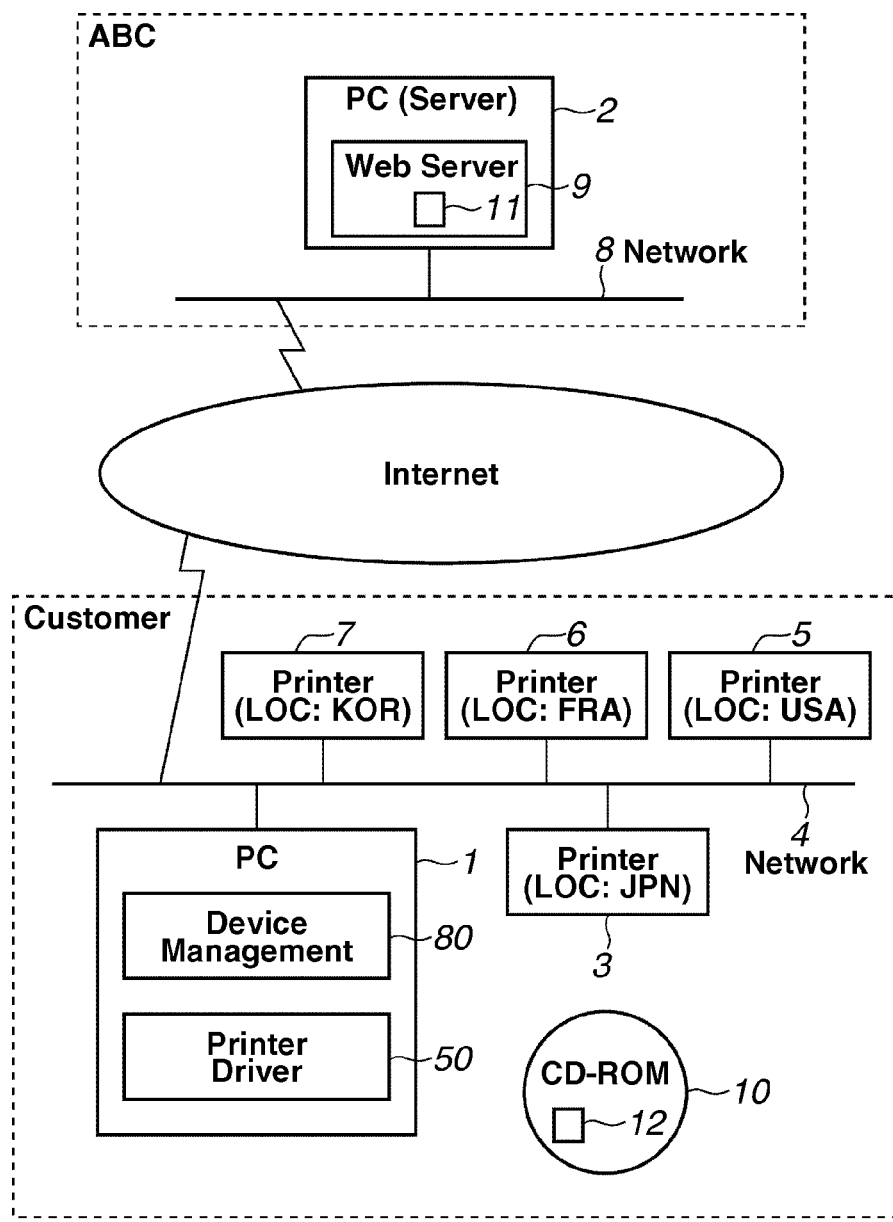
FIG. 1 illustrates an exemplary configuration of a system according to an exemplary embodiment of the present invention.

A first exemplary embodiment of the present invention will be described in detail below. FIG. 1 illustrates an exemplary configuration of a system including an information processing apparatus and a peripheral apparatus according to a first exemplary embodiment of the present invention.

Referring to the example shown in FIG. 1, each of information processing apparatuses 1 and 2 is a general-purpose PC. The PCs 1 and 2 each include hardware illustrated in FIG. 2, which will be described in detail later below. In addition, the PCs 1 and 2 are installed with an operating system (OS) such as for example Windows® Vista of Microsoft Corporation. Furthermore, the PCs 1 and 2 are connected to networks 4 and 8, which include, for example, Ethernet.

Each of inkjet printing type printers 3, 5, 6, and 7 is an example of a device, which is a peripheral apparatus according to an exemplary embodiment of the present invention. One or more of a printer and a multifunction peripheral (MFP) can be used as the peripheral apparatus.

The printer 3 is a printer having a model name "Kmmn", which is manufactured by ABC Corporation. A destination of the printer 3 is set to Japan ("JPN"). The printer 5 is a printer having a model name "Kmmn", which is manufactured by ABC Corporation. The destination of the printer 5 is set to the United States ("USA"). The printer 6 is a printer having a model name "Kmmn", which is manufactured by ABC Corporation. The destination of the printer 6 is set to France ("FRA"). The printer 7 is a printer having a model name "Kmmn", which is manufactured by ABC Corporation. The destination of the printer 7 is set to Korea ("KOR"). Each of the printers 3, 5, 6, and 7 includes hardware illustrated in FIG. 3, which will be described in detail later below. The printers 3, 5, 6, and 7 are connected with the PC 1 via a predetermined communication line (network 4). Thus, the printers 3, 5, 6, and 7 and the PC 1 can execute data communication among them.

A management application (Device Management) 80 manages a printer. The management application 80 includes a file ("*.EXE") compliant with Windows® OS.

The network 4 is a home network set up in the home of a user or a customer who uses the printers 3, 5, 6, and 7. The printers 3, 5, 6, and 7 are connected to the PC 1 via the network 4 within the customer environment. The printers 3, 5, 6, and 7 are sharedly used by a plurality of users.

A network 8 is a network set up in a business site of ABC Corporation. The PC 2, which is connected to the network 8, includes a web server 9 having a function as a web server. Thus, the PC 2 provides a web site of ABC Corporation via the Internet.

A compact disc-read only memory (CD-ROM) 10 can be inserted in the PC 1 and stores software and various data such as an electronic data file. Control files 11 and 12 are used in the management and control of a peripheral apparatus, which will be described in detail later below with reference to FIG. 12. The control file is transmitted via the web server 9 and the CD-ROM 10.

The control files 11 and 12 according to the present exemplary embodiment are described by Extensible Markup Language (XML) that does not include a script. Accordingly, the control files 11 and 12 are statically implemented. Therefore, it can be difficult for the control files 11 and 12 to execute dynamic control when executed as a general application or program does. If the control files 11 and 12 are modified, malfunction of a printer or software may occur. In order to prevent this, the control files 11 and 12 may be provided with a signature as general software is. Thus, malfunction of a printer or software that may occur by modifying the control files 11 and 12 can be prevented.

Meanwhile, a conventional application capable of executing management by using a program that can dynamically execute various processing according to an operation state of and a setting set to a peripheral apparatus has been used in a PC that manages a peripheral apparatus such as a printer. However, if a management application that utilizes the above-described program is used, the program may be overwritten with a malicious program. Accordingly, in this case, the data security may be threatened.

In order to prevent such a problem, in the management of the present invention, an application provided by the control files 11 and 12, which statically operate, executes processing according to exemplary embodiments of the present invention to implement high data security, instead of using a program that can execute dynamic control.

Figure 2:
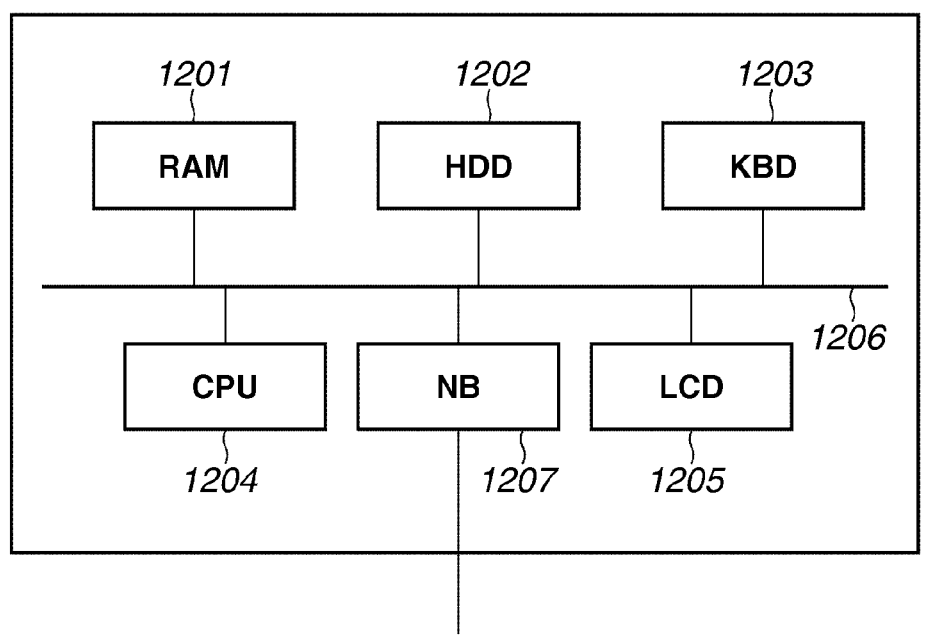
FIG. 2 illustrates an exemplary hardware configuration of a personal computer (PC) according to an exemplary embodiment of the present invention.

FIG. 2 illustrates an exemplary hardware configuration of the PCs 1 and 2 according to the present exemplary embodiment. The PCs 1 and 2 each include hardware illustrated in FIG. 2.

Referring to the example shown in FIG. 2, the PC 1 includes a random access memory (RAM) 1201, a hard disk drive (HDD) (storage unit) 1202, a keyboard unit (KBD) (input unit) 1203, and a central processing unit (CPU) (control unit) 1204. In addition, the PC 1 includes a display (display unit) (liquid crystal display (LCD)) 1205, a network board (NB) (communication control unit) 1207, and a bus 1206. The RAM 1201, the HDD 1202, the KBD 1203, the CPU 1204, the LCD 1205, and the NB 1207 are in communication with one another via the bus 1206. A removable CD-ROM or a built-in ROM can be used as the storage unit.

Figure 5:
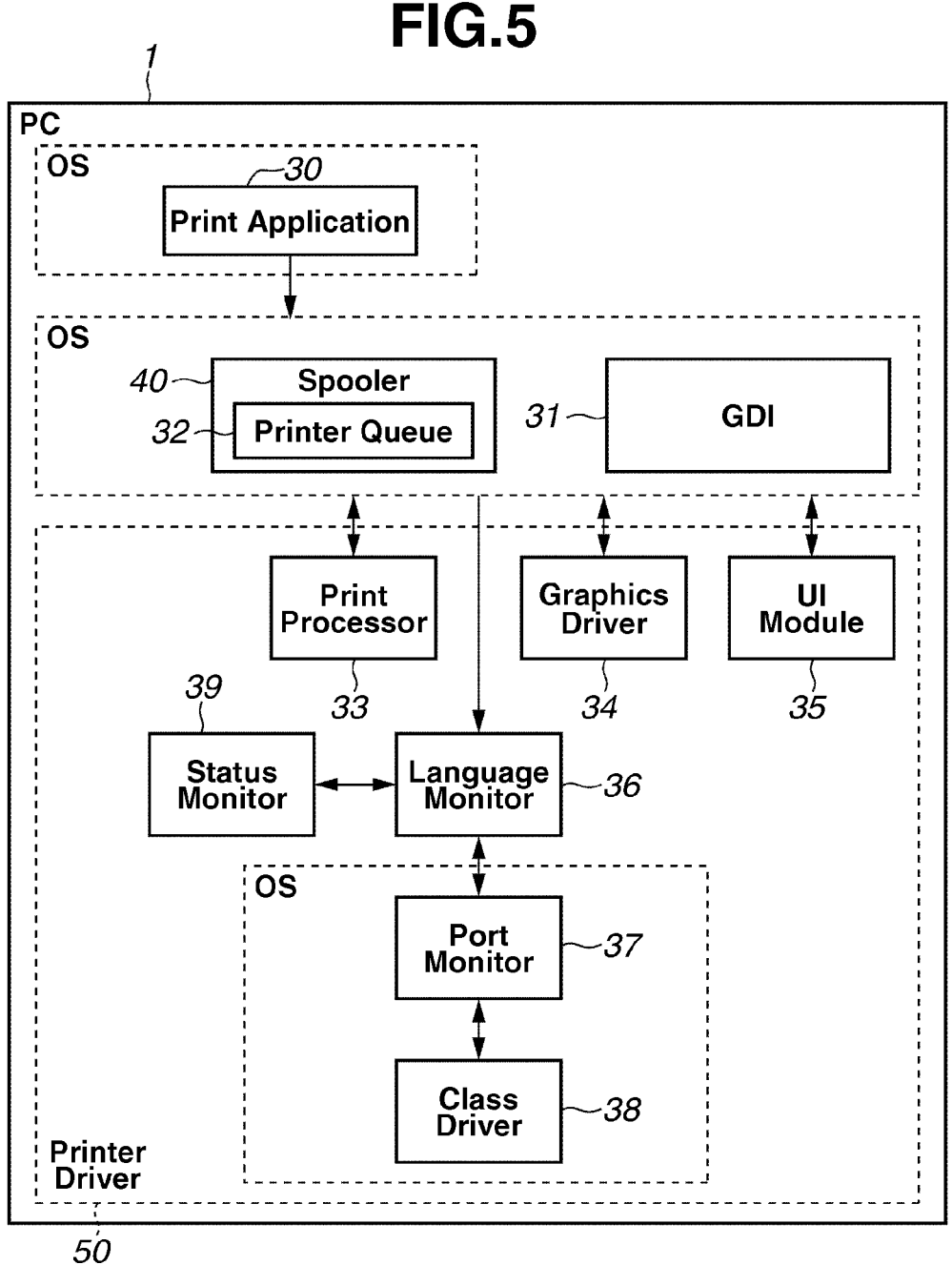
FIG. 5 illustrates an exemplary configuration of a printer driver of the PC according to an exemplary embodiment of the present invention.

Each module (software) illustrated in FIGS. 4 and 5 is stored on the HDD 1202. The CPU 1204 loads and executes the module from the HDD 1202 on the RAM 1201 as necessary. Thus, the CPU 1204 implements a function of each module illustrated in FIGS. 4 and 5.

Figure 3:
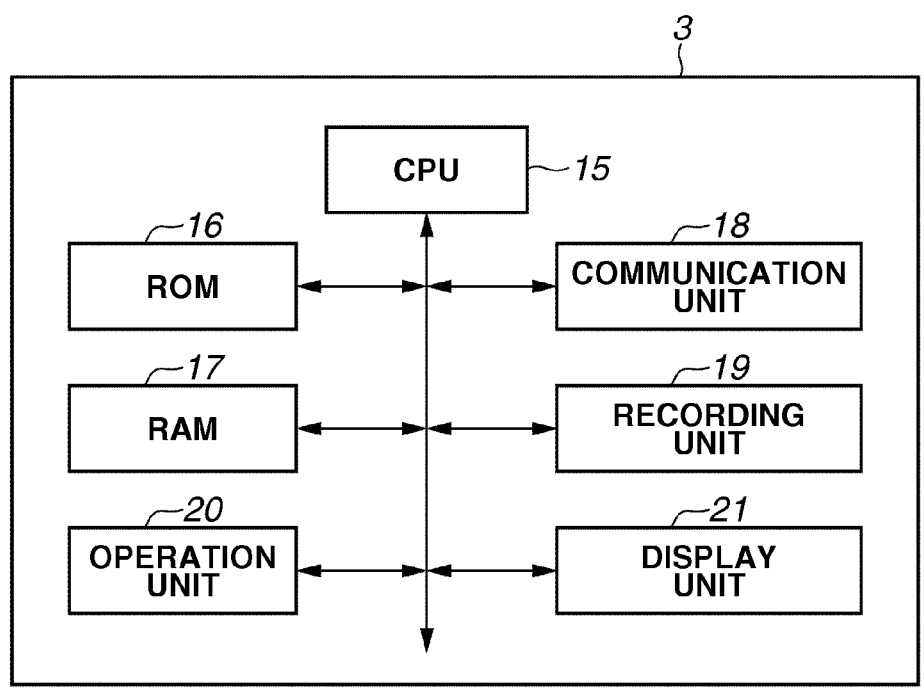
FIG. 3 illustrates an exemplary hardware configuration of a printer according to an exemplary embodiment of the present invention.

FIG. 3 illustrates an exemplary hardware configuration of the printer according to the present exemplary embodiment. The printers 3, 5, 6, and 7 have the hardware configuration illustrated in FIG. 3. Referring to FIG. 3, a CPU 15 includes a microprocessor. The CPU 15 controls the operation of a RAM 17, a communication unit 18, and a recording unit 19 according to a program stored on a ROM 16 as a central control unit of the printer 3.

The ROM 16 stores a program used by the printer to execute recording (printing) processing according to control by a printer driver 50, which will be described in detail later below. In addition, the ROM 16 stores a program for transmitting the state of the printer to the PC.

The RAM 17 primarily and temporarily stores print data transmitted from the PC and printed by the recording unit 19. The communication unit 18 includes a network connection port. The communication unit 18 controls Ethernet communication. The recording unit 19 includes a recording unit and an electric circuit. The recording unit includes an inkjet recording head, each color ink, a carriage, and a recording sheet conveyance mechanism. The electric circuit includes an application-specific integrated circuit (ASIC), which generates a printing pulse at the recording head according to print data.

The content of a file opened by an application is temporarily stored on the HDD of the PC as an Enhanced Metafile (EMF) spool file according to a print instruction from an application that can issue such a print instruction. The spool file is then converted into print data including a printer control command via the printer driver 50. Then, the print data is transmitted to the printer via the network 4. The print data that the printer has received is then converted into a printing pulse by the recording unit 19. Thus, the print data is printed on a recording sheet.

An operation unit 20 includes various buttons such as a power button and a reset button, which can be operated by a user to operate the printer. A display unit 21 includes a touch panel (LCD). The display unit 21 displays the operation state of the printer and various settings input by a user.

FIG. 4 illustrates an exemplary software configuration of the PC according to the present exemplary embodiment. Referring to the example shown in FIG. 4, an Ethernet control stack 92 controls Ethernet. An IP Network control stack 91 controls an IP Network. A device profile for web service (WSD) control stack 90 controls WSD.

An independent hardware vendor (IHV)—native protocol control stack 89 controls an IHV unique protocol. A network plug-and-play (N-PnP) control stack 88 controls an N-PnP device.

Meanwhile, Plug and Play Extensions (PnP-X) is a function supplied with Windows® Vista OS as a standard function as one of PnP extensions that provides a support of a network connected device. The present exemplary embodiment utilizes the N-PnP as a function similar to the PnP-X.

Device drivers (printer drivers) 85 include standard drivers 87, which are supplied with the OS as standard items, and IHV drivers 86, which are provided by an IHV. An application/DDI interface 84 includes an application program interface (API) and a device driver interface (DDI). Applications 82 include management applications 80, 81, 98, and 100, which manage the printer, and a print application 30. The management applications 80, 81, 98, and 100 execute a device management function, which is supplied with the OS as a standard function.

A print application 30 can input a print instruction from a user. The print application 30 will be described in detail later below with reference to FIG. 5.

The management application 80 can issue an instruction for displaying a printing preferences setting button 42, a maintenance button 43, and a cartridge purchasing button 44 on a display unit via the application/DDI interface 84. The printing preferences setting button 42, the maintenance button 43, and the cartridge purchasing button 44 will be described in detail later below with reference to FIG. 7.

Furthermore, the management application 81 can display a printing preferences setting button 45 and a maintenance button 46 on a display unit via the application/DDI interface 84. The printing preferences setting button 45 and the maintenance button 46 will be described in detail later below with reference to FIG. 8.

The management application 100 can display a power-on button 102 and a power-off button 103 on a display unit via the application/DDI interface 84. The power-on button 102 and the power-off button 103 will be described in detail later below with reference to FIG. 30.

FIG. 5 illustrates an exemplary configuration of a printer driver of the PC according to the present exemplary embodiment. Referring to the example shown in FIG. 5, the printer driver 50 is installed on the PC 1. The printer driver 50 includes a plurality of modules 33 through 39.

The print application 30 can input a print instruction from a user, as described above. The print application 30 is equivalent to a text editor, for example, which is supplied with the OS as a standard function. A graphic device interface (GDI) 31 is a part of the OS. A print queue 32 is a part of a spooler 40. The print queue 32 queues a print job that has been generated based on data generated by the print application 30. The queued print job is displayed as a printer queue folder.

A print processor 33 executes processing for changing a print layout and various processing on an image to be printed. A graphics driver 34 executes processing of an image to be printed according to a drawing command from the GDI 31 and generates a print control command as a core component for image processing by the printer driver 50.

A user interface (UI) module 35 provides and controls a UI of a printer driver displayed on the display unit 1205. A language monitor 36 controls data communication as a communication interface (I/F). A status monitor 39 executes control for displaying the remaining amount of ink used in the printer, a warning message, and status information such as error information.

A port monitor 37 transmits data received from the language monitor 36 to an appropriate port and receives data from the printer via a class driver 38. The class driver 38 is a low level module provided at a stage closest to the port of the above-described components. In the present exemplary embodiment, the class driver 38 is equivalent to a driver of a printer class of a unique protocol such as WSD or IHV. The class driver 38 controls the port (a network port, for example). The printer driver 50, which is manufactured by ABC Corporation (printer vendor), has the above-described module configuration.

Figure 6:
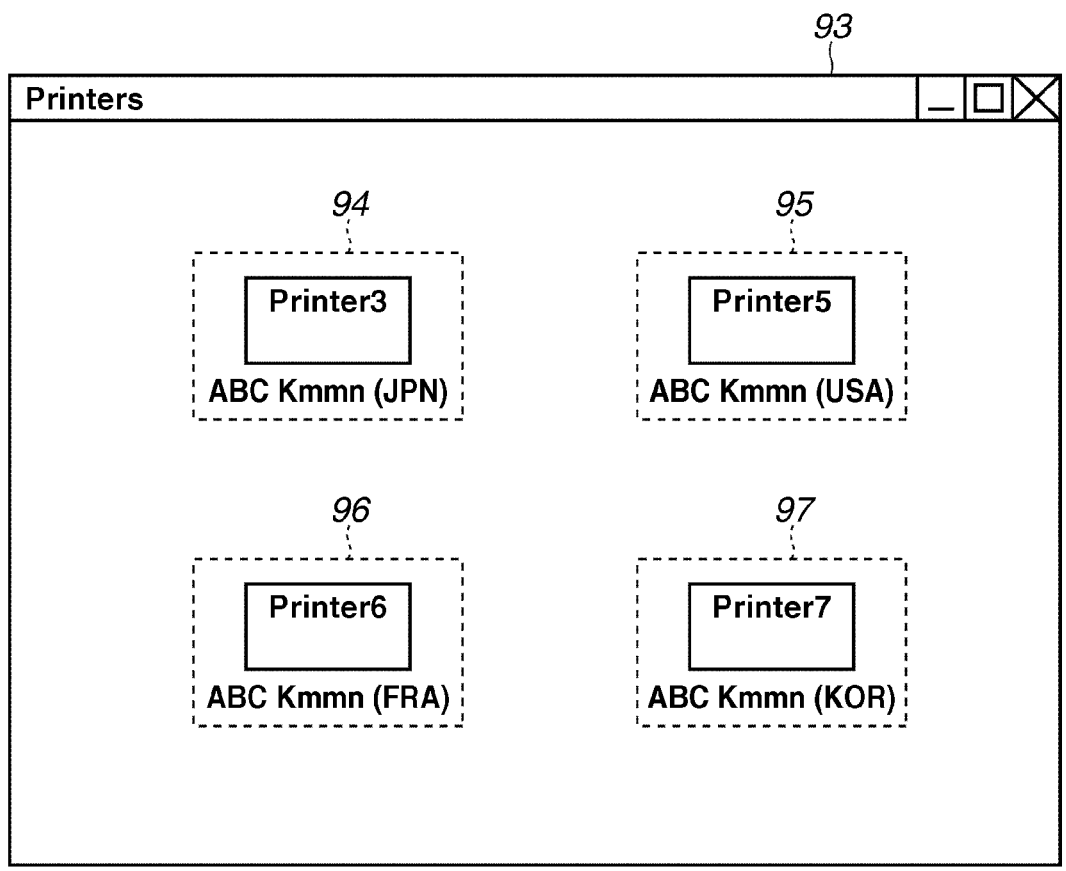
FIG. 6 illustrates an example of a printer folder displayed on a display unit according to an exemplary embodiment of the present invention.

FIG. 6 illustrates an example of a printer folder displayed on the display unit 1205 according to the present exemplary embodiment. Referring to the example shown in FIG. 6, a printer folder 93 is displayed on the PC 1. The printers that can be utilized by the PC 1 are displayed in the printer folder 93 as the content thereof. In the example illustrated in FIG. 6, it is indicated that the printers 3, 5, 6, and 7 can be utilized.

A printer icon 94 is an icon corresponding to the printer 3. A printer name "ABC Kmmn (JPN)", which uniquely identifies the printer 3, is indicated on the printer icon 94. A printer icon 95 is an icon corresponding to the printer 5. A printer name "ABC Kmmn (USA)", which uniquely identifies the printer 5, is indicated on the printer icon 95. A printer icon 96 is an icon corresponding to the printer 6. A printer name "ABC Kmmn (FRA)", which uniquely identifies the printer 6, is indicated on the printer icon 96. A printer icon 97 is an icon corresponding to the printer 7. A printer name "ABC Kmmn (KOR)", which uniquely identifies the printer 7, is indicated on the printer icon 97.

Figure 31:
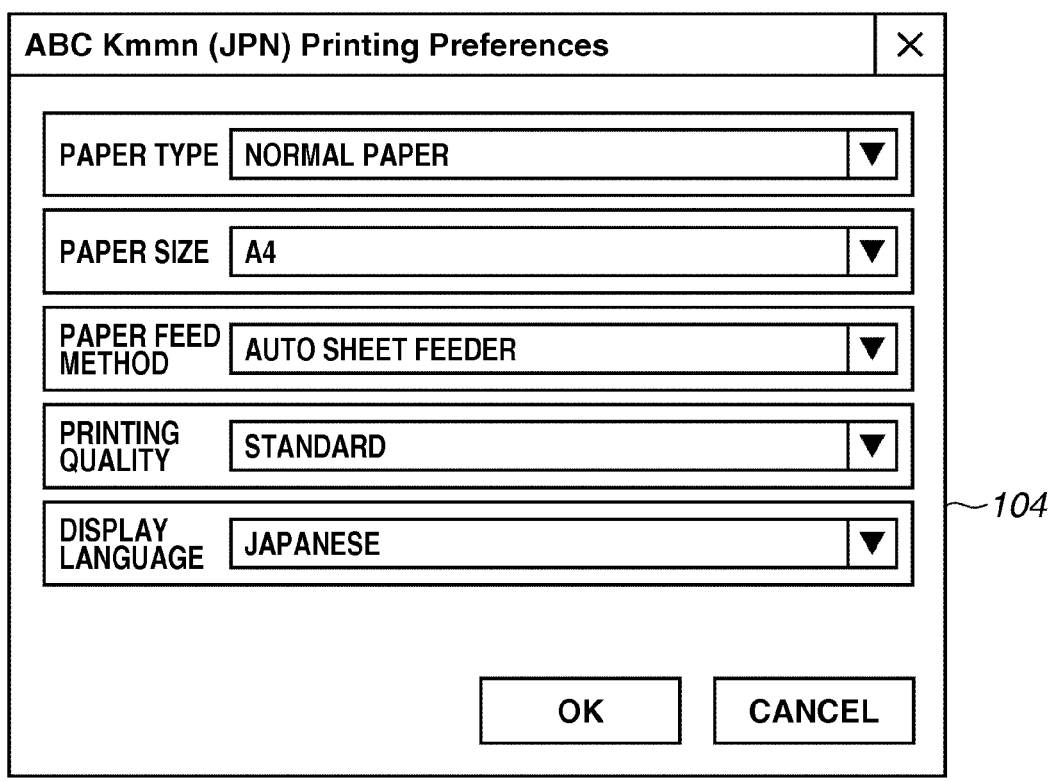
FIG. 31 illustrates an example of a printing preferences setting dialog displayed on the display unit according to an exemplary embodiment of the present invention.

FIG. 31 illustrates an example of a printing preferences setting dialog displayed on the display unit 1205 according to the present exemplary embodiment. A user can set a print setting necessary for executing printing with the printer 3 by selecting and inputting a value for each setting on a printing preferences setting dialog 104.

Figure 32:
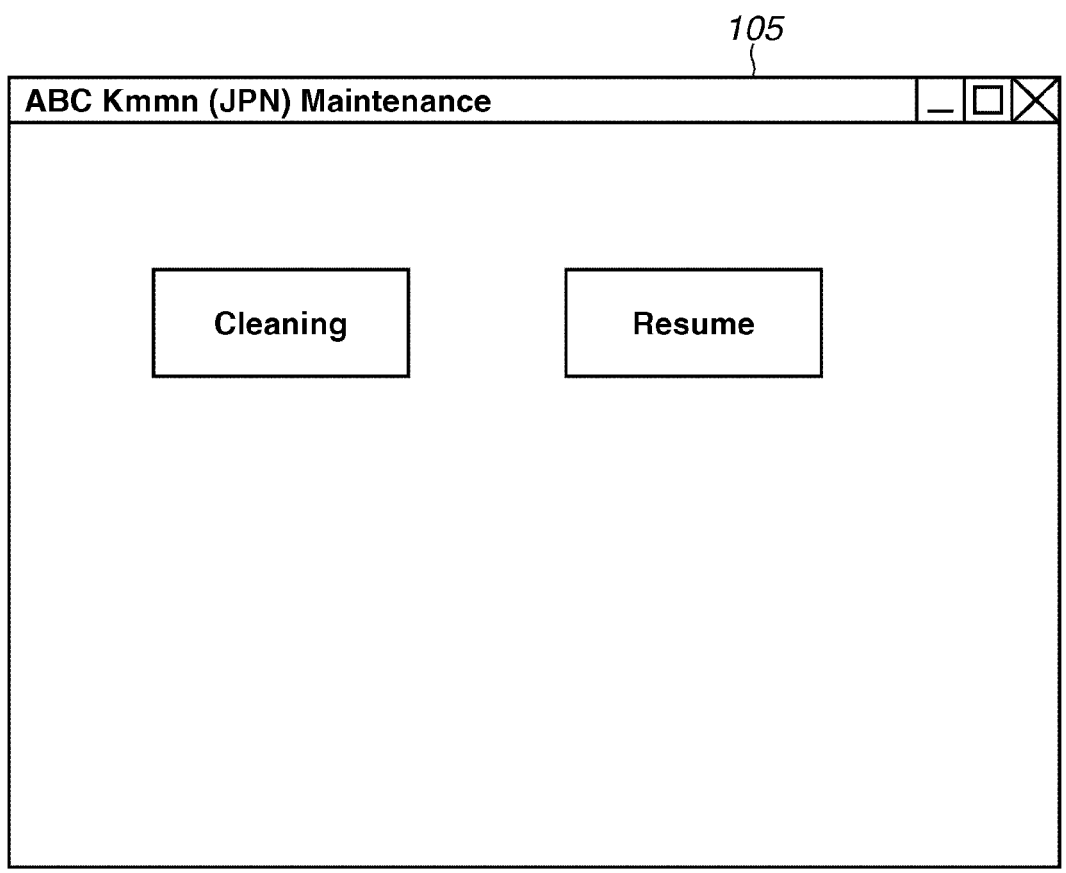
FIG. 32 illustrates an example of a maintenance dialog displayed on the display unit according to an exemplary embodiment of the present invention.

FIG. 32 illustrates an example of a maintenance dialog displayed on the display unit 1205 according to the present exemplary embodiment. A user can execute an operation for cleaning component parts of the printer 3 and maintenance such as resetting of the setting by pressing each button on a maintenance dialog 105.

Figure 33:
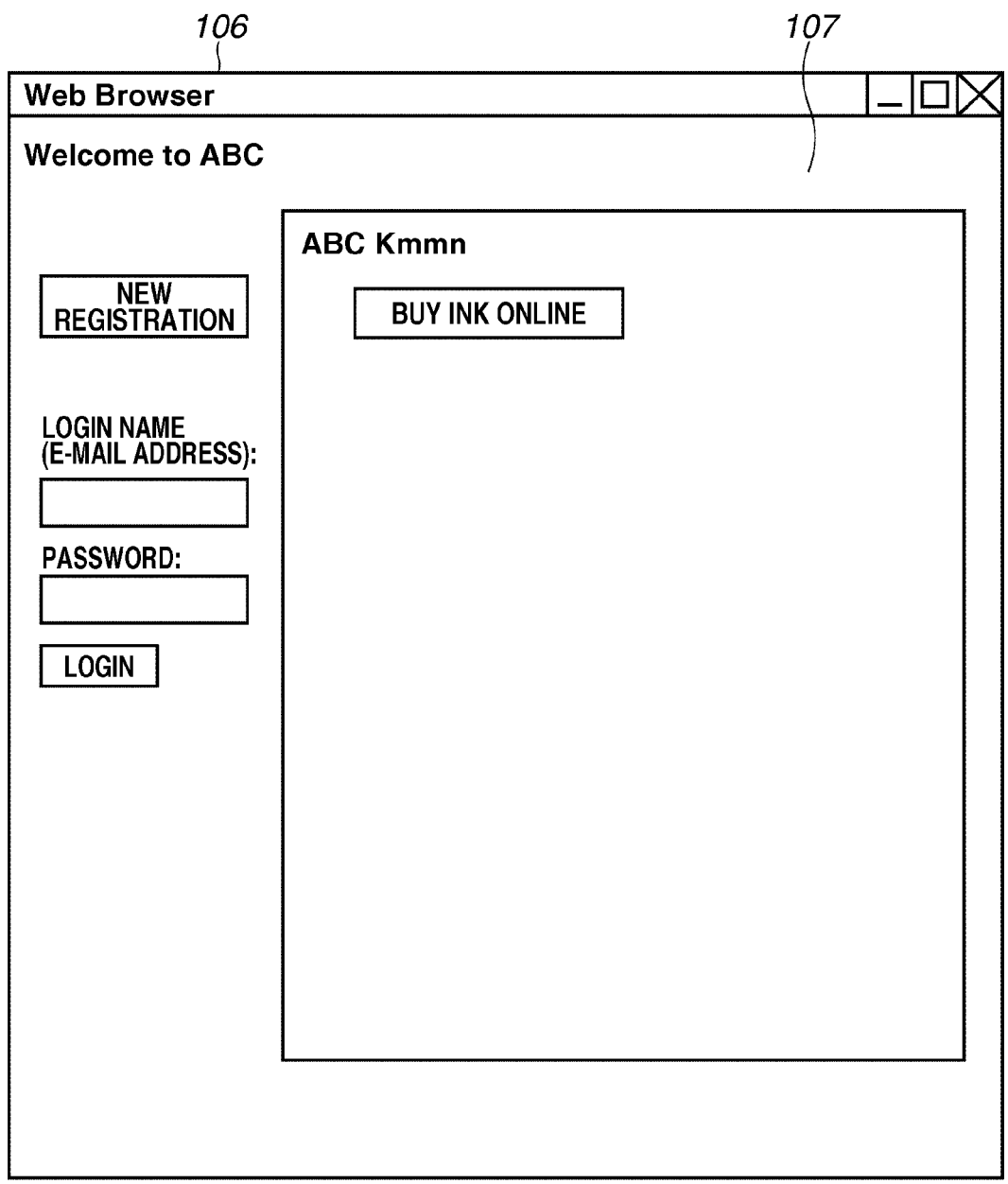
FIG. 33 illustrates an example of a cartridge purchasing page screen displayed on the display unit by using a web browser according to an exemplary embodiment of the present invention.

FIG. 33 illustrates an example of a cartridge purchasing page screen displayed on the display unit 1205 via a web browser according to the present exemplary embodiment. Referring to FIG. 33, a web browser 106 can display the content of a web site of ABC Corporation, which is provided on the web server 9. A user can purchase a cartridge conforming to each printer online via a cartridge purchasing page 107.

Figure 7:
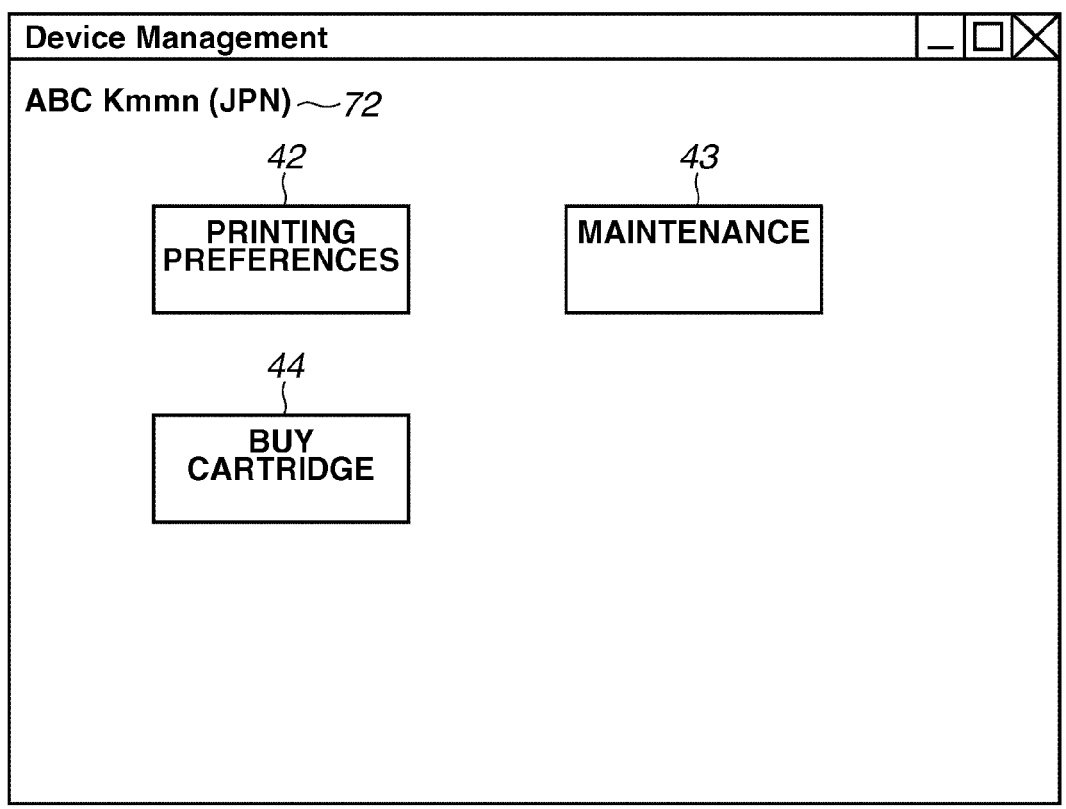
FIG. 7 illustrates an example of a screen displayed on a display unit as a function of a management application according to a first exemplary embodiment of the present invention.

FIG. 7 illustrates an example of a screen displayed on the display unit 1205 as a function of the management application according to the present exemplary embodiment. The user can input an instruction for utilizing the function of the management application 80 via the display screen to manage the operation of the printer 3.

Referring to the example shown in FIG. 7, a printer name display portion 72 displays the printer name indicated on the printer icon 94. When the user presses the printing preferences setting button 42, the printing preferences setting dialog 104 (FIG. 31), via which the user can perform each print setting necessary to execute printing with the printer 3, is displayed. When the user presses the maintenance button 43, the maintenance dialog 105 (FIG. 32), via which the user can perform each operation necessary for executing the maintenance of the printer 3, is displayed.

When the user presses the cartridge purchasing button 44, the web browser 106 (FIG. 33) is activated. Then, the cartridge purchasing page 107 of the web site, via which the user can purchase a cartridge for the printer 3 online, is displayed. A Japanese character string is displayed on each of the printing preferences setting button 42, the maintenance button 43, and the cartridge purchasing button 44 according to the destination of the printer 3.

Figure 8:
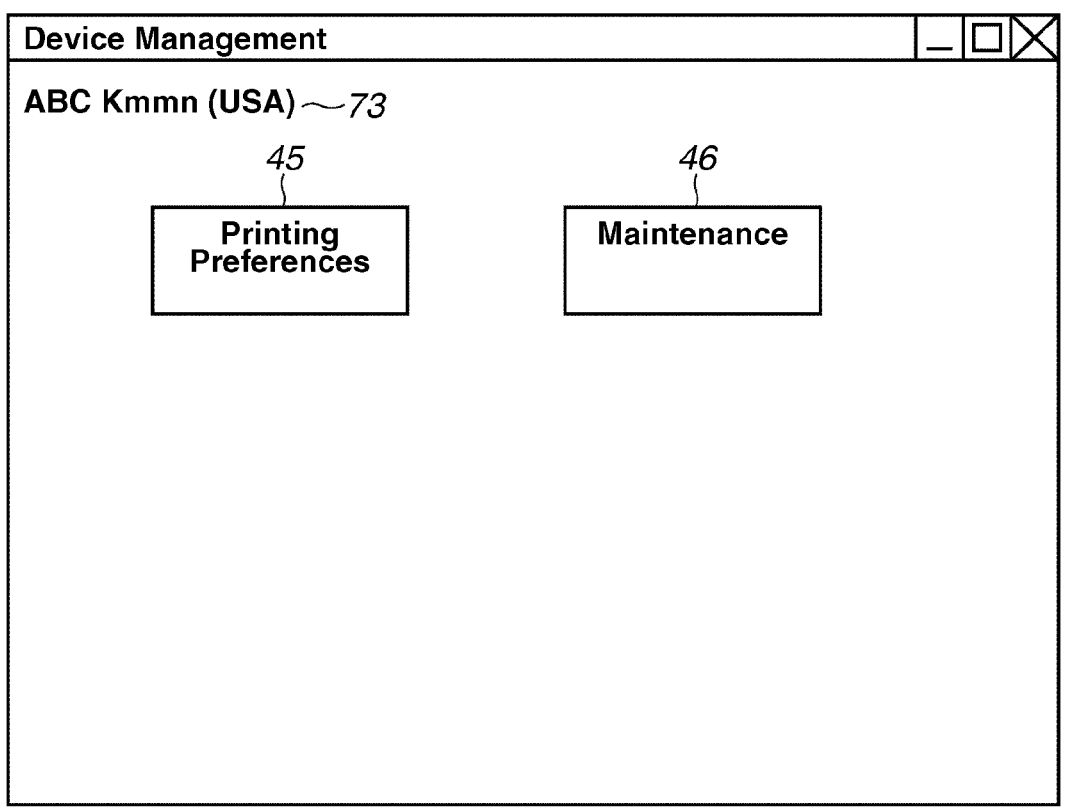
FIG. 8 illustrates an example of a screen displayed on a display unit as a function of a management application according to the first exemplary embodiment of the present invention.

FIG. 8 illustrates an example of a screen displayed on the display unit 1205 as a function of a management application according to the present exemplary embodiment. The user can input an instruction for utilizing the function of the management application 81 via the display screen to manage the operation of the printer 5.

Referring to the example shown in FIG. 8, a printer name display portion 73 displays the printer name indicated on the printer icon 95. When the user presses the printing preferences setting button 45, the printing preferences setting dialog, via which the user can perform each print setting necessary to execute printing with the printer 5, is displayed. When the user presses the maintenance button 46, the maintenance dialog, via which the user can perform each operation necessary for executing the maintenance of the printer 5, is displayed. An English character string is displayed on each of the maintenance buttons 45 and 46 according to the destination of the printer 5.

Figure 9:
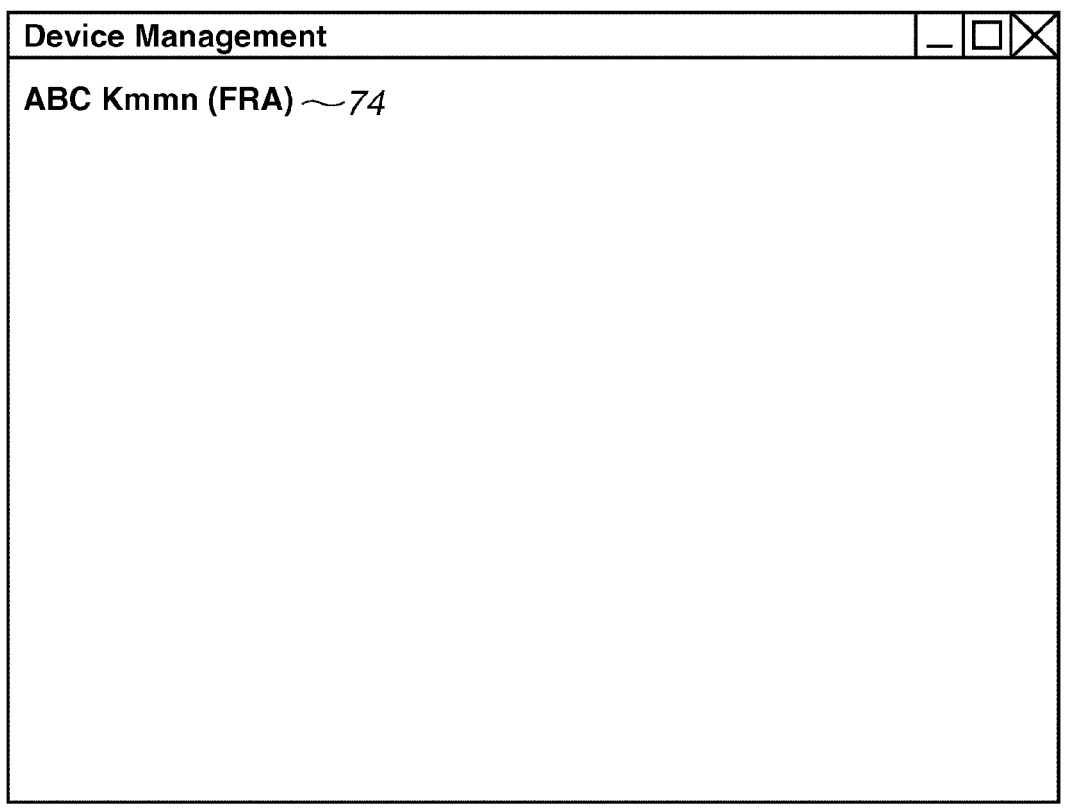
FIG. 9 illustrates an example of a screen displayed on a display unit as a function of a management application according to the first exemplary embodiment of the present invention.

FIG. 9 illustrates an example of a screen displayed on the display unit 1205 as a function of the management application according to the present exemplary embodiment. The user can input an instruction for utilizing the function of the management application 98 via the display screen to manage the operation of the printer 6.

Referring to the example shown in FIG. 9, a printer name display portion 74 displays the printer name indicated on the printer icon 96. The screen illustrated in FIG. 9 does not include a button that the user can operate. Accordingly, the user cannot perform a setting of the printer 6 via the display screen 98. However, the user can recognize that the printer 6 has been connected to the PC 1 because the management application 98 is in operation.

Figure 30:
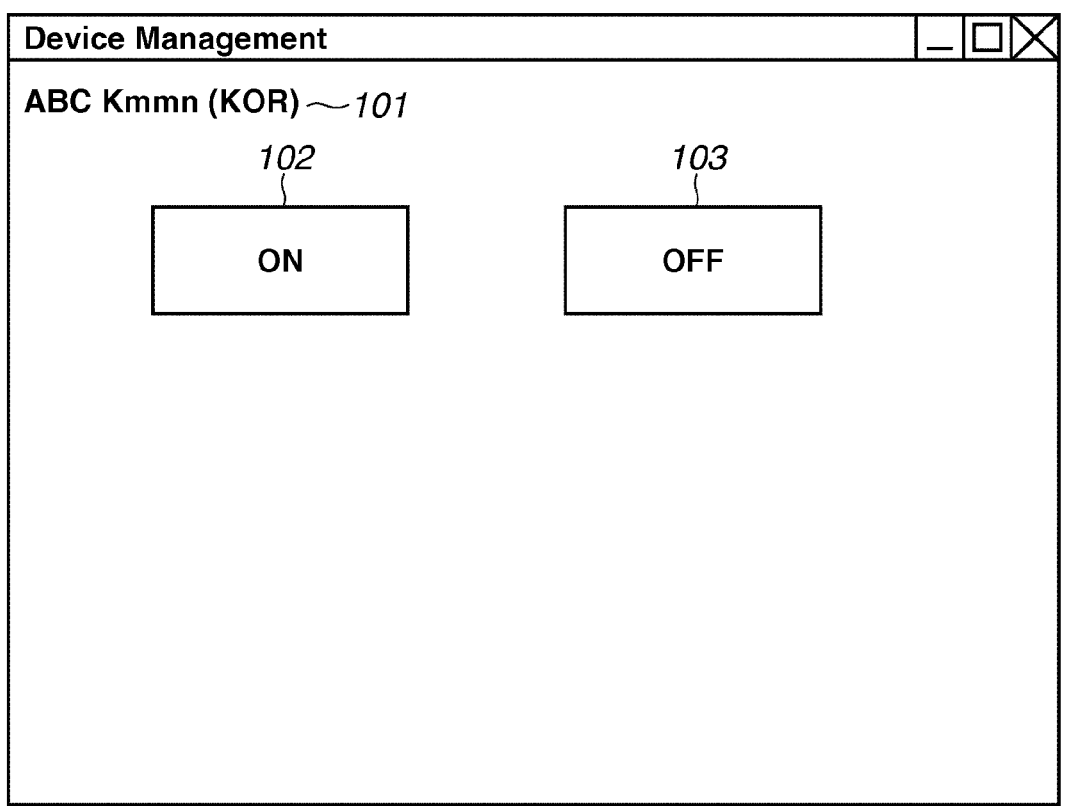
FIG. 30 illustrates an example of a screen displayed on a display unit as a function of a management application according to the first exemplary embodiment of the present invention.

FIG. 30 illustrates an example of a screen displayed on the display unit 1205 as a function of the management application according to the present exemplary embodiment. The user can input an instruction for utilizing the function of the management application 100 via the display screen to manage the operation of the printer 6.

Referring to the example shown in FIG. 30, a printer name display portion 101 displays the printer name indicated on the printer icon 97. The power-on button 102 can be pressed by the user to power on the printer 7. The power-off button 103 can be pressed by the user to power off the printer 7.

FIGS. 10A through 10D each illustrate examples of a device ID, which is information for uniquely identifying a printer according to the present exemplary embodiment. The device ID of the printer 3 (FIG. 10A) includes the following information.

| | |
|---|---|
| Manufacturer (MFG): | ABC |
| Model (MDL): | Kmmn |
| Class (CLS): | PRINTER |
| Command (CMD): | K4 (ABC Corporation's private print control command) |
| Description (DES): | ABC Kmmn |
| Destination (LOC): | JPN (Japan) |

The device ID of the printer 5 (FIG. 10B) includes the following information.

| | |
|---|---|
| Manufacturer (MFG): | ABC |
| Model (MDL): | Kmmn |
| Class (CLS): | PRINTER |
| Command (CMD): | K4 (ABC Corporation's private print control command) |
| Description (DES): | ABC Kmmn |
| Destination (LOC): | USA (the United States) |

The device ID of the printer 6 (FIG. 10C) includes the following information.

| | |
|---|---|
| Manufacturer (MFG): | ABC |
| Model (MDL): | Kmmn |
| Class (CLS): | PRINTER |
| Command (CMD): | K4 (ABC Corporation's private print control command) |
| Description (DES): | ABC Kmmn |
| Destination (LOC): | FRA (France) |

The device ID of the printer 7 (FIG. 10D) includes the following information.

| | |
|---|---|
| Manufacturer (MFG): | ABC |
| Model (MDL): | Kmmn |
| Class (CLS): | PRINTER |
| Command (CMD): | K4 (ABC Corporation's private print control command) |
| Description (DES): | ABC Kmmn |
| Destination (LOC): | KOR (Korea) |

FIG. 11 illustrates an exemplary relationship between the destination and the device ID of the printer according to the present exemplary embodiment. The destination of each printer can be recognized by referring to a value (character string) set for the parameter "LOC:" of the correspondence table, which indicates the destination included in the device ID illustrated in FIGS. 10A through 10D.

FIG. 12 illustrates an example of the content of a control file used in managing and controlling the printer according to the present exemplary embodiment. The control file includes information indicating the correspondence between the button displayed on the display unit 1205 as the function of the management application and the function of the button according to the value (character string) set for the parameter "LOC:" included in the device ID. Information illustrated in FIG. 12 is included in the control files 11 and 12 as a part thereof.

Referring to the example of FIG. 12, the name of the manufacturer ("ABC Corporation") of the device (the printers 3, 5, 6, and 7) is set to an element "<dm:manufacturer>". The model name ("Kmmn") of the device (the printers 3, 5, 6, and 7) is set to an element "<dm:model>".

Furthermore, an element "<dm:keywordInDeviceId string="LOC:JPN">" describes information to be displayed on the display screen by the management application 80, which is activated when the printer 3 whose destination is Japan is connected to the PC 1. More specifically, three elements "<dm:function>", which indicate a button and a function of each of the printing preferences setting button 42 (FIG. 7), the maintenance button 43 (FIG. 7), and the cartridge purchasing button 44 (FIG. 7), are included in the element "<dm:keywordInDeviceId string="LOC:JPN">".

In this regard, for example, a Japanese character string corresponding to "PRINTING PREFERENCES", which is displayed on the printing preferences setting button 42, is set to an element "<dm:namexml:lang="ja">PRINTING PREFERENCES/dm:name>" described immediately below a first "<dm:function>" element.

Furthermore, code "printingPreferences", which indicates a function for displaying the printing preferences setting dialog, is set to a subsequent element "<dm:execute>printingPreferences</dm:execute>".

In addition, a Japanese character string corresponding to "MAINTENANCE", which is displayed on the maintenance button 43, is set to an element "<dm:namexml:lang="ja">MAINTENANCE</dm:name>" described immediately below a second "<dm:function>" element.

Furthermore, code "printerMaintenance", which indicates a function for displaying the maintenance dialog is set to a subsequent element "<dm:execute>"printerMaintenance"</dm:execute>".

In addition, a Japanese character string corresponding to "BUY CARTRIDGE", which is displayed on the cartridge purchasing button 44 is set to an element "<dm:namexml:lang="ja">BUY CARTRIDGE</dm:name>" described immediately below a third "<dm:function>" element. Furthermore, a uniform resource locator (URL) of a cartridge purchasing page of the web site where the user can buy a cartridge for the printer 3 is set to a subsequent element "<dm:execute>http://abc.xxx/buyink/index.html</dm:execute>"

Furthermore, in the example illustrated in FIG. 12, an element "<dm:keywordInDeviceId string="LOC:USA">" describes information to be displayed on the display screen by the management application 81, which is activated when the printer 5 whose destination is the United States is connected to the PC 1. More specifically, two "<dm:function>" elements, which indicate a button and a function of each of the printing preferences setting button 45 (FIG. 8) and the maintenance button 46 (FIG. 8), are included in the element "<dm:keywordInDeviceId string="LOC:USA">".

In this regard, for example, an English character string "Printing Preferences", which is displayed on the printing preferences setting button 45, is set to an element "<dm:namexml:lang="en-US">Printing Preferences</dm:name>" described immediately below a first "<dm:function>" element.

In addition, code "printingPreferences", which indicates a function for displaying the printing preferences setting dialog, is set to a subsequent element "<dm:execute>printingPreferences</dm:execute>".

Furthermore, an English character string "Maintenance", which is displayed on the maintenance button 46, is set to an element "<dm:namexml:lang="en-US">Maintenance</dm:name>" displayed immediately below a second "<dm:function>" element. In addition, code "printerMaintenance", which indicates a function for displaying the maintenance dialog is set to a subsequent element "<dm:execute>printerMaintenance</dm:execute>". Here, an element "<dm:keywordInDeviceId string="LOC:FRA">" is a null element and does not include any "<dm:function>" element.

Thus, the display that does not include a button that can be operated by the user as illustrated in FIG. 9 is executed on the display screen displayed by the management application 98, which is activated when the printer 6, whose destination is France, is connected to the PC 1.

The content of the control file illustrated in FIG. 12 does not include any element such as "<dm:keywordInDeviceId string="LOC:KOR">" for the printer 7, whose destination is Korea. Accordingly, when the printer 7 is connected to the PC 1, the management application that is common to all devices is activated. Thus, the display screen illustrated in FIG. 30 is displayed on the display unit 1205.

FIG. 13 is a flow chart illustrating exemplary processing executed by the PC when the printer is connected thereto according to the present exemplary embodiment.

Referring to FIG. 13, in step S1301, the printer 3 is connected to the PC 1 via the network 4. In step S1302, the OS acquires the device ID of the printer 3 connected to the PC 1.

In step S1303, the OS determines whether a device driver compliant with the printer 3 connected to the PC 1 (the printer driver 50 in this case) has been already installed on the PC 1. If it is determined that the printer driver 50 has been already installed on the PC 1 (YES in step S1303), then the processing advances to step S1305. On the other hand, if it is determined that the printer driver 50 has not been installed on the PC 1 yet (NO in step S1303), then the processing advances to step S1304. In step S1304, the printer driver 50 is installed. The device driver can be installed from an external apparatus such as a printer via a network.

In step S1305, the OS loads the printer driver 50. In step S1306, the OS determines whether a control file compliant with the printer connected to the PC 1 has been already installed on a storage unit of the PC 1. If it is determined that a control file compliant with the printer connected to the PC 1 has been already installed on a storage unit of the PC 1 (YES in step S1306), then the processing advances to step S1309. On the other hand, if it is determined that no control file compliant with the printer connected to the PC 1 has been installed on a storage unit of the PC 1 (NO in step S1306), then the processing advances to step S1307. In step S1307, the OS installs the control file on the PC 1. The processing in step S1307 will be described in detail later below with reference to FIG. 14.

In step S1308, the OS determines whether the control file (FIG. 12) has been stored on the storage unit of the PC. If it is determined that the control file (FIG. 12) has been stored on the storage unit of the PC (YES in step S1308), then the processing advances to step S1309. On the other hand, if it is determined that no control file has been stored on the storage unit of the PC (NO in step S1308), then the processing advances to step S1310. In step S1310, the processing executed when the printer is connected to the PC 1 ends.

In step S1309, the OS executes processing for activating the management application. The processing in step S1309 will be described in detail later below with reference to FIG. 15. In step S1310, the processing executed when the printer is connected to the PC 1 ends.

Figure 14:
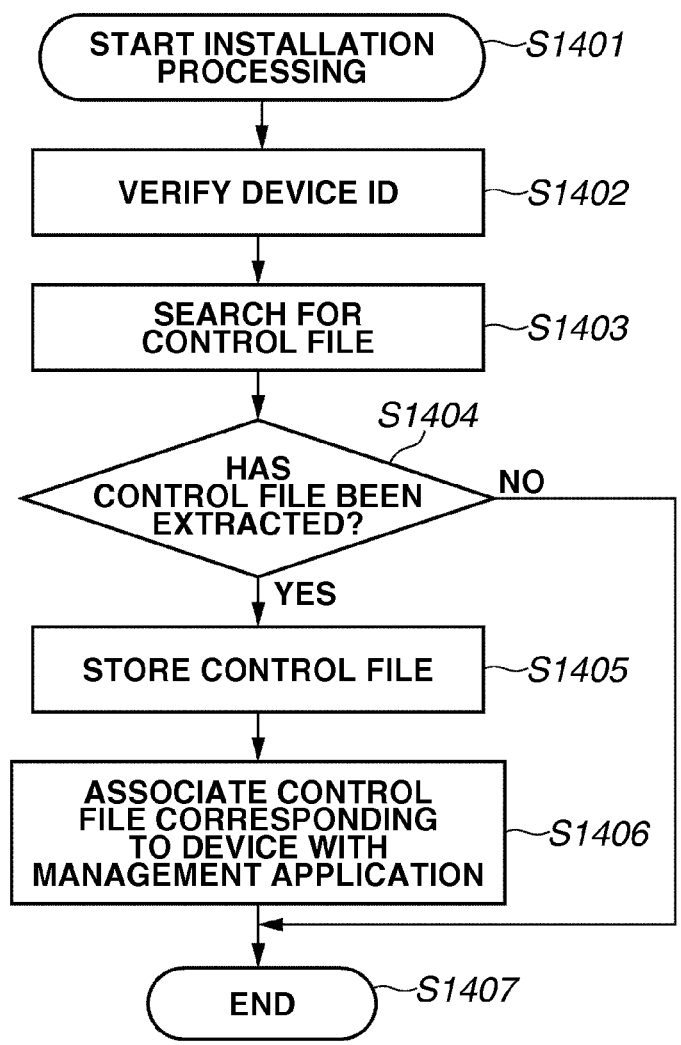
FIG. 14 is a flow chart illustrating exemplary processing for installing the management application executed by the PC according to an exemplary embodiment of the present invention.

FIG. 14 is a flow chart illustrating exemplary processing for installing the management application executed by the OS of the PC according to the present exemplary embodiment. Referring to FIG. 14, after the processing in step S1307 (FIG. 13), the OS installs the control file in step S1401.

In step S1402, the OS refers to and verify information on the manufacturer ("MFG:") and the model ("MDL:") included in the device ID of the printer 3 connected to the PC 1 via the network 4.

In step S1403, the OS searches the control files on the web server 9 or those stored on the CD-ROM 10 inserted in the PC 1 for the control file 11 or the control file 12 for the printer 3. In step S1404, the OS determines whether any control file 11 or control file 12 has been extracted. If any control file 11 or 12 has been extracted (YES in step S1404), then the processing advances to step S1405. In step S1405, the OS stores the extracted control file on the HDD 1202 of the PC 1.

In step S1406, the OS associates the control file for the printer 3 with the management application (installation processing). In step S1407, the installation processing ends.

On the other hand, if no control file 11 or 12 has been extracted (NO in step S1404), then the processing advances to step S1407. In step S1407, the processing ends.

Figure 15:
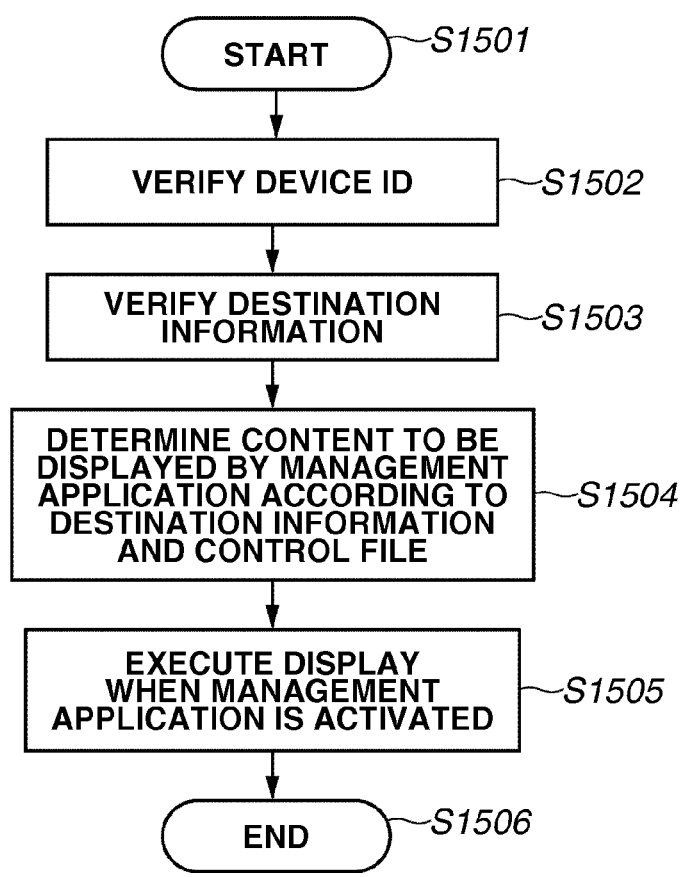
FIG. 15 is a flow chart illustrating exemplary processing for activating the management application according to the first exemplary embodiment of the present invention.

FIG. 15 is a flow chart illustrating exemplary processing for activating the management application executed by the OS of the PC according to the present exemplary embodiment. After the OS has issued an instruction for activating the management application in step S1309 (FIG. 13), then the processing illustrated in FIG. 15 starts. Referring to FIG. 15, in step S1501, the OS activates the management application to start the processing.

In step S1502, the management application refers to the device ID of the printer 3 connected to the PC 1 via the network 4. In step S1503, the management application refers to information about the destination ("LOC:") included in the device ID.

In step S1504, the OS determines the content to be displayed by the management application according to the information about the destination ("LOC:") acquired in step S1503 and the content of the control file stored in step S1405 (FIG. 14). In step S1505, the OS executes control for displaying the display content determined in step S1504 on the display unit 1205 as the display executed when the management application 80 is activated. In step S1506, the management application activation processing ends.

Now, a second exemplary embodiment of the present invention will be described in detail below with reference to FIGS. 16 through 22.

Figure 16:
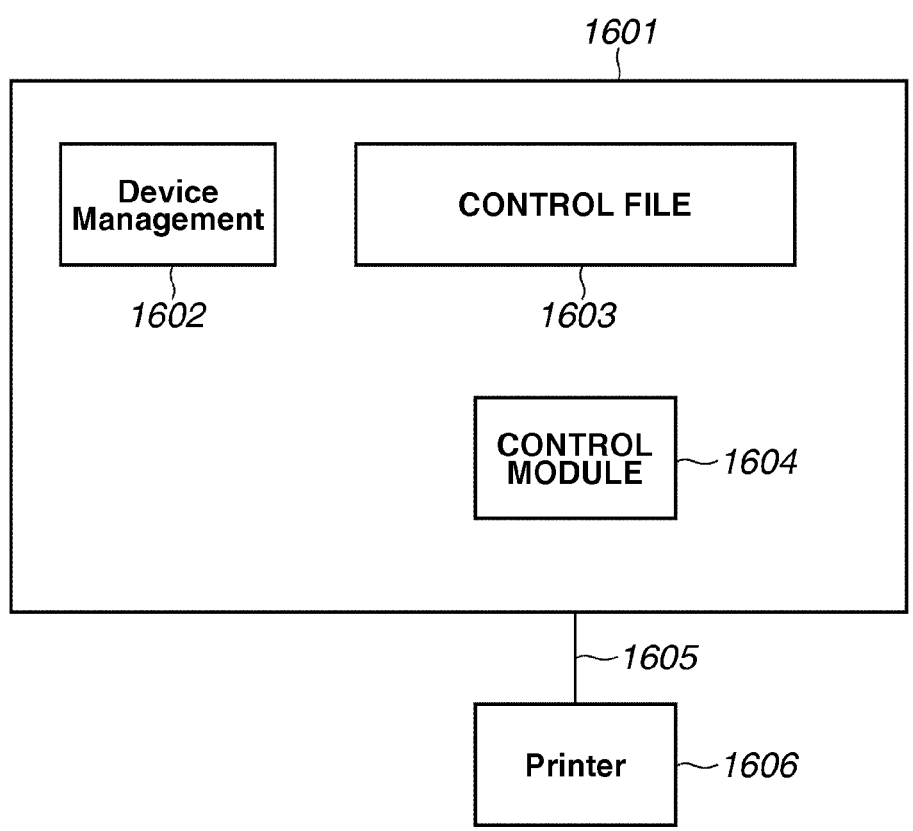
FIG. 16 illustrates an exemplary software configuration of a system according to a second exemplary embodiment of the present invention.

FIG. 16 illustrates an exemplary software configuration of a system according to the second exemplary embodiment of the present invention. Referring to FIG. 16, a printer 1606 is connected to a PC 1601 via an interface 1605. An appropriate arbitrary interface such as USB or Ethernet can be used as the interface 1605.

A management application ("Device Management" in FIG. 16) 1602 is equivalent to the application described above with reference to FIGS. 7 through 9 in the first exemplary embodiment. A control file 1603 is read by the management application 1602 and is used for determining the display content.

A control module 1604 is accessed by the management application 1602 in determining the display content. The control module 1604 accesses the printer 1606 to acquire information about the printer (the device ID thereof or the like). Furthermore, the control module 1604 executes processing according to the acquired information about the printer. The processing executed by the control module 1604 will be described in detail later below.

The control module can be provided on the web server 9 or via the CD-ROM 10 as the control file can be.

Figure 17:
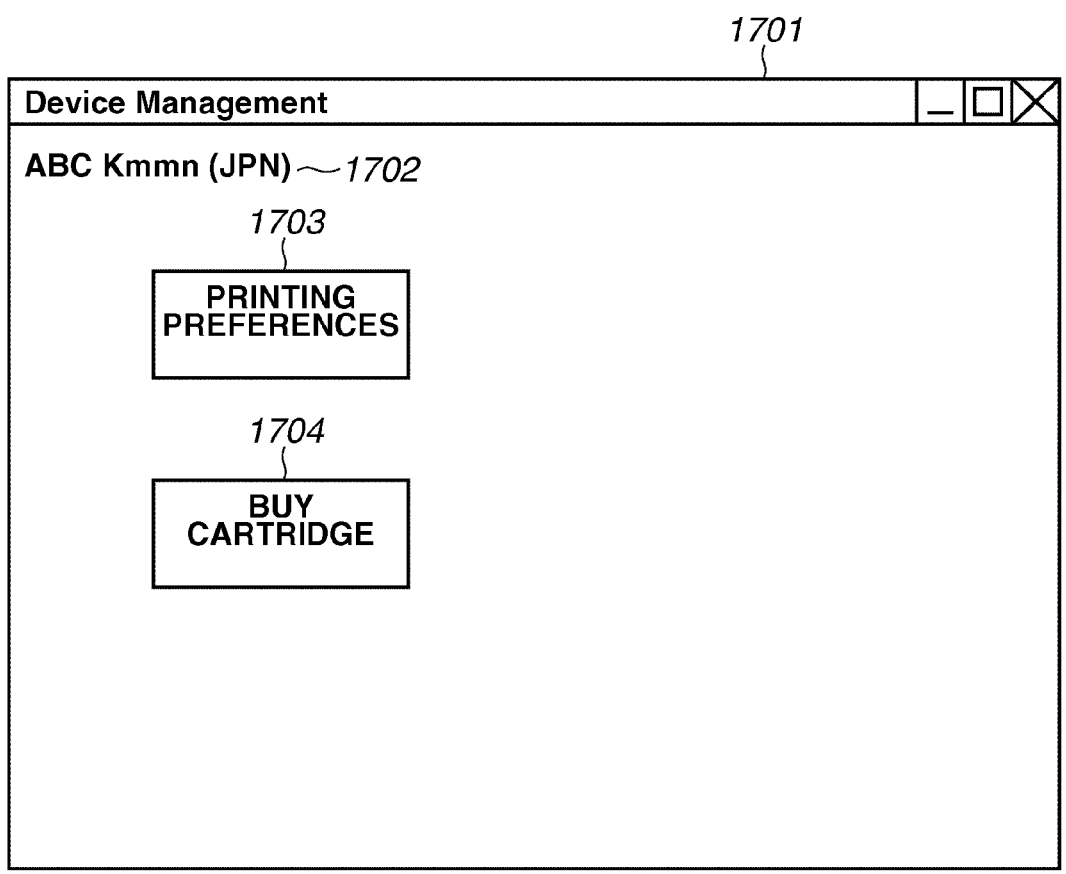
FIG. 17 illustrates an example of a screen displayed on a display unit as a function of a management application according to the second exemplary embodiment of the present invention.

FIG. 17 illustrates an example of a display screen 1701 displayed by the management application when the destination of the printer is Japan. Referring to FIG. 17, the display screen 1701 includes a display field 1702 indicating the printer name or the like. On a printing preferences setting button 1703, the display name thereof "PRINTING REFERENCES" is displayed in a Japanese character string. When the user presses the printing preferences setting button 1703, a printing preferences setting dialog box for performing a setting necessary for printing is displayed.

On a cartridge purchasing button 1704, the display name thereof "BUY CARTRIDGE" is displayed in a Japanese character string. When the user presses the cartridge purchasing button 1704, the web browser is activated and a web site via which the user can buy an ink cartridge is displayed via the web browser. Here, the web site is a service provided exclusively within Japan.

Figure 18:
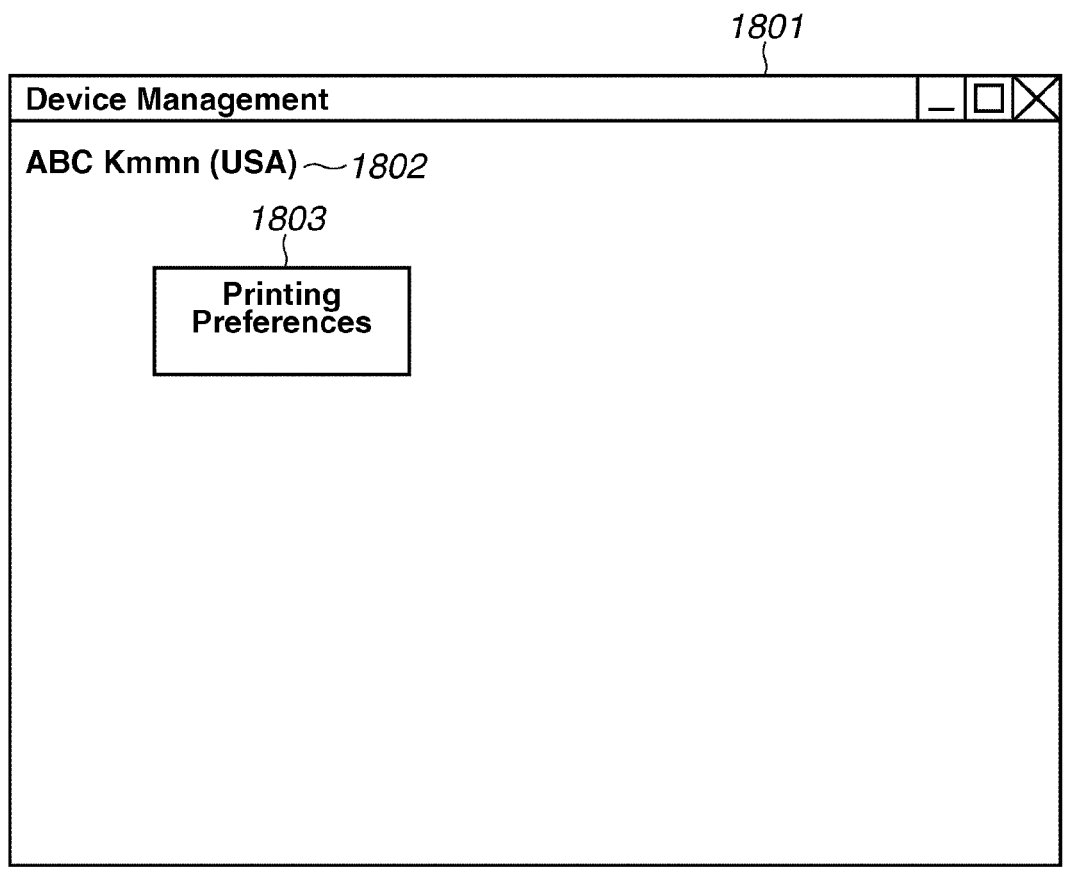
FIG. 18 illustrates an example of a screen displayed on a display unit as a function of a management application according to the second exemplary embodiment of the present invention.

FIG. 18 illustrates an example of a display screen 1801 displayed by the management application when the destination of the printer is the United States (USA) according to the present exemplary embodiment. Referring to FIG. 18, a display field 1802 displays the printer name. On a printing preferences setting button 1803, the display name thereof "Printing Preferences" is displayed in an English character string.

When the user presses the printing preferences setting button 1803, a printing preferences setting dialog box via which the user can perform a setting necessary for printing is displayed. In the example illustrated in FIG. 18, no cartridge purchasing button such as the button 1704 (FIG. 17) is displayed.

FIG. 19 illustrates an example of the content of a part of the control file according to the present exemplary embodiment. The control file includes information indicating the correspondence between the button displayed on the display unit 1205 as the function of the management application and the function of the button. The information indicated in FIG. 19 is stored as a part of the control files 11 and 12.

Referring to FIG. 19, the corporate name ("ABC Corporation") of the manufacturer of the device (the printers 3, 5, 6, and 7) is set to an element "<dm:manufacturer>". The model name ("Kmmn") of the device (the printers 3, 5, 6, and 7) is set to an element "<dm:model>". In an element "<dm:functions>", the button displayed by the management application and the function of the button are described.

In the example illustrated in FIG. 19, an element "<dm:function nameDLL="vendor.dll"name="10">" includes a description about the printing preferences setting button. The description such as "nameDLL="vendor.dll"" indicates that the name of the control module including the character string displayed on the button is "vendor.dll".

Furthermore, the description "name="10"" describes an ID of the character string. In the example illustrated in FIG. 19, the ID is "10".

In addition, code "printingPreferences", which indicates a function for displaying the printing preferences setting dialog is set to an element "<dm:execute>printingPreferences</dm:execute>". Furthermore, an element "<dm:getKeywordDLL="vendor.dll"keywordName="LOC">" describes code for acquiring a value of a keyword "LOC" (destination information) by accessing the control module "vendor.dll". An element "<dm:keywordFound keywordName="LOC"keywordValue="JPN">" includes a description about the button displayed when the value for the keyword "LOC" is "JPN" and the function of the button.

An element "<dm:function nameDLL="vendor.dll"name="20">" includes a description about the cartridge purchasing button. An element "nameDLL="vendor.dll"" describes the name of the control file including the character string displayed on the button. In the example illustrated in FIG. 19, the control module name is "vendor.dll".

An element "name="20"" describes an ID of the character string. The character string ID is "20" In the example illustrated in FIG. 19. A URL ("http://abc.xxx/buyink/index.html") of the web site where the user can buy a cartridge is set to an element "<dm:execute>http://abc.xxx/buyink/index.html</dm:execute>"

If the value for the keyword "LOC" is a value other than "JPN", the cartridge purchasing button is not displayed.

Figure 20:
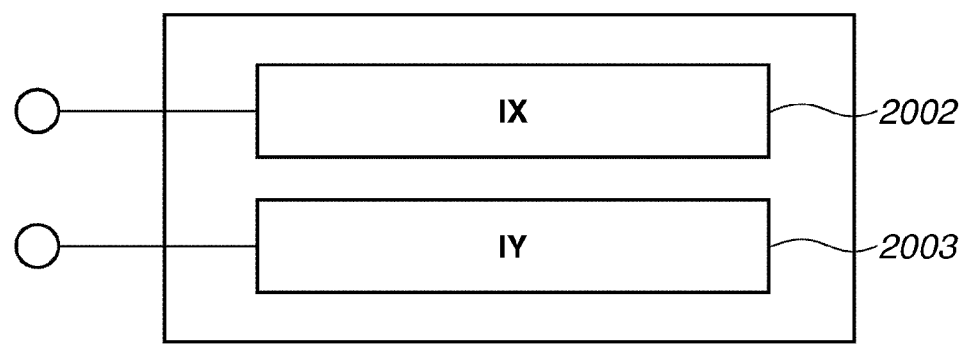
FIG. 20 illustrates an example of an interface that a control module supports according to the second exemplary embodiment of the present invention.

FIG. 20 illustrates an example of an interface that the control module 1604 supports according to the present exemplary embodiment. Referring to FIG. 20, the management application that manages the device accesses an IX interface 2002 and thus can acquire the character string displayed on the button as described above. When a character string ID is set to the IX interface 2002 as a parameter, the management application can acquire a character string corresponding to the ID. More specifically, if a parameter value "10" is set to the character string ID (FIG. 19), the management application can acquire the character string "printing Preferences".

In addition, the management application can access an IY interface 2003 and acquire a value of an arbitrary keyword. More specifically, when a keyword ("LOC", for example) is set to the IY interface 2003 as a parameter, the management application can acquire the value of the keyword ("JPN", for example). A keyword value of the destination information can be acquired from the printer connected to the PC 1. Here, the "interface" refers to an interface between components of a computer program, such as a function exported from a dynamic link library (DLL) or a component object model (COM) interface.

Now, an example of processing for determining a character string on a screen displayed as a function of the management application ("Device Management" in FIG. 21) on the PC according to the present exemplary embodiment will be described in detail below with reference to a flow chart in FIG. 21.

Figure 21:
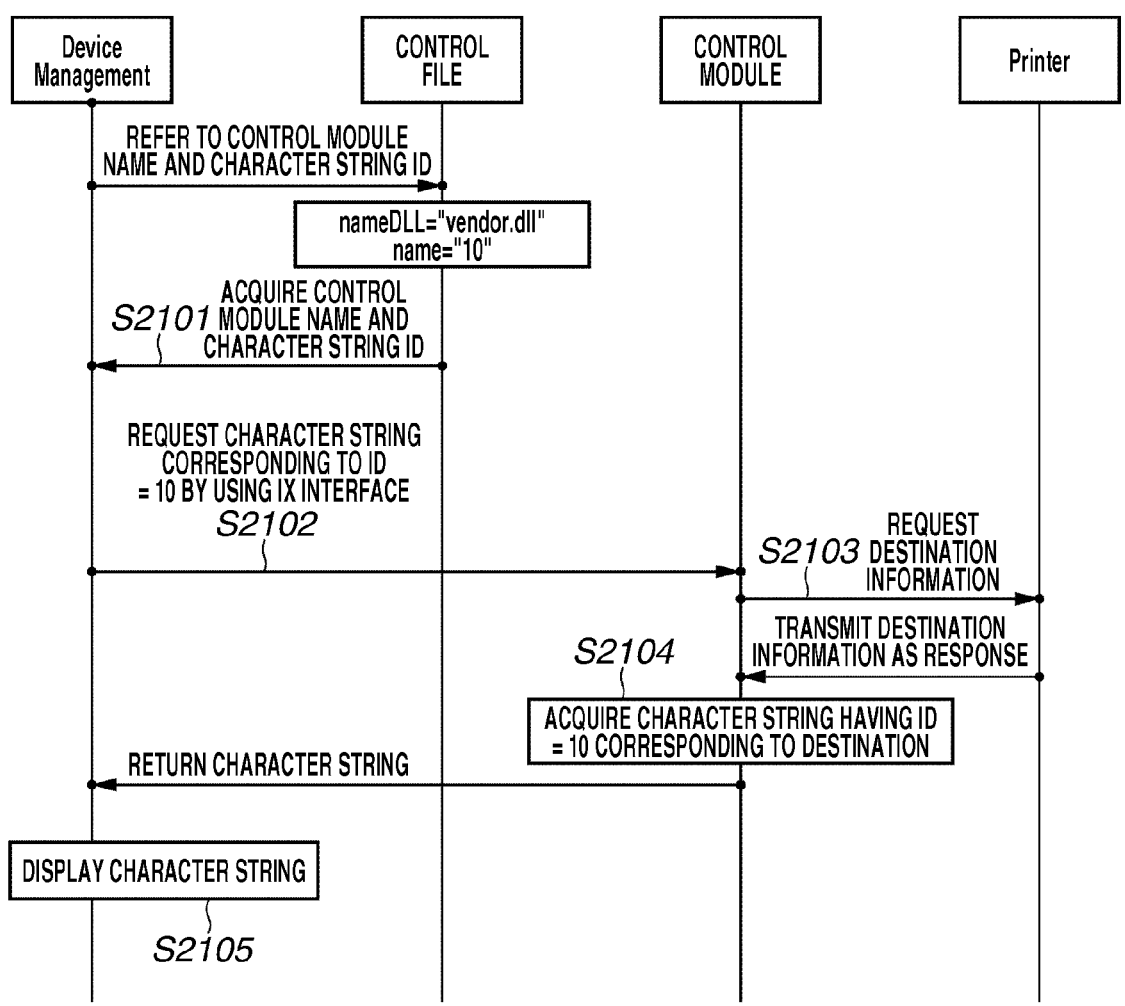
FIG. 21 is a flow chart illustrating exemplary processing for determining a character string displayed by the management application according to the second exemplary embodiment of the present invention.

Referring to the examples shown in FIG. 21, in step S2101, the management application refers to the control file and acquires the control module name and the character string ID. Here, the control file includes a description "<dm:function nameDLL="vendor.dll"name="10">", for example. Accordingly, the control module name is "vendor.dll" and the character string ID is "10".

In step S2102, the device management application requests the control module of transmitting a character string corresponding to the character string ID "10" by using the IX interface. In step S2103, the control module requests the destination information to the printer connected to the PC 1. The control module acquires the destination information transmitted from the printer as a response to the request.

In step S2104, the management application acquires the character string having the character string ID corresponding to the destination information. The processing for acquiring the character string having the character string ID corresponding to the destination information will be described in detail later below with reference to FIG. 28.

In step S2105, the management application executes control for displaying the character string received from the control module on the display unit 1205.

Figure 28:
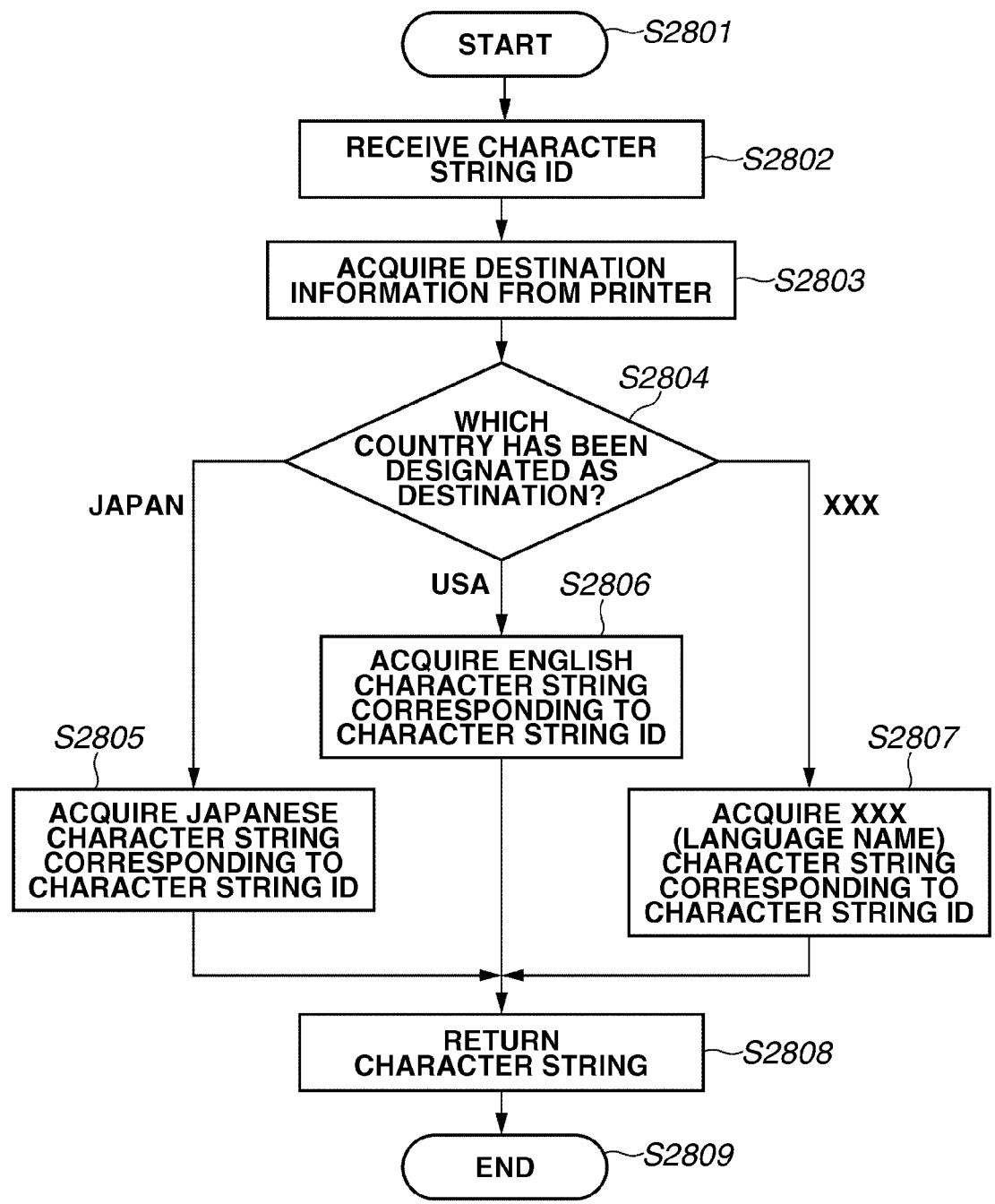
FIG. 28 is a flow chart illustrating exemplary processing executed by a control module for determining a character string according to the second exemplary embodiment of the present invention.

FIG. 28 is a flow chart illustrating exemplary processing executed by the control module for determining the character string according to the present exemplary embodiment. Referring to the example shown in FIG. 28, in step S2801, the processing starts. In step S2802, the control module receives the character string ID from the management application via the IX interface as a parameter.

In step S2803, the control module acquires the destination information from the printer connected to the PC 1. In steps S2804 through S2807, the control module executes processing for acquiring the character string of the character string ID corresponding to the acquired destination information.

In step S2804, the control module determines the value designated in the acquired destination information. If Japan ("JPN") has been designated as the destination of the printer (JAPAN in step S2804), then the processing advances to step S2805. In step S2805, the control module acquires a Japanese character string. In this regard, more specifically, if the character string ID is "10" and thus the acquired information indicates that the destination of the printer is Japan, the control module acquires a Japanese character string corresponding to "PRINTING PREFERENCES".

On the other hand, if the United States ("USA") has been designated as the destination of the printer (USA in step S2804), then the processing advances to step S2806. In step S2806, the control module acquires an English character string. In this regard, more specifically, if the character string ID is "10" and thus the acquired information indicates that the destination of the printer is the United States, then the control module acquires an English character string "Printing Preferences".

On the other hand, if "xxx" (a country or an area) has been designated as the destination of the printer (XXX in step S2804), then the processing advances to step S2807. In step S2807, the control module acquires a character string of xxx's language.

In step S2808, the control module transmits the acquired character string ("Printing Preferences" or the like) to the management application via the IX interface. In step S2809, the processing ends.

Now, an example of processing for determining a button on the screen displayed as a function of the management application ("Device Management" in FIG. 22) of the PC according to the present exemplary embodiment will be described in detail below with reference to FIG. 22.

Figure 22:
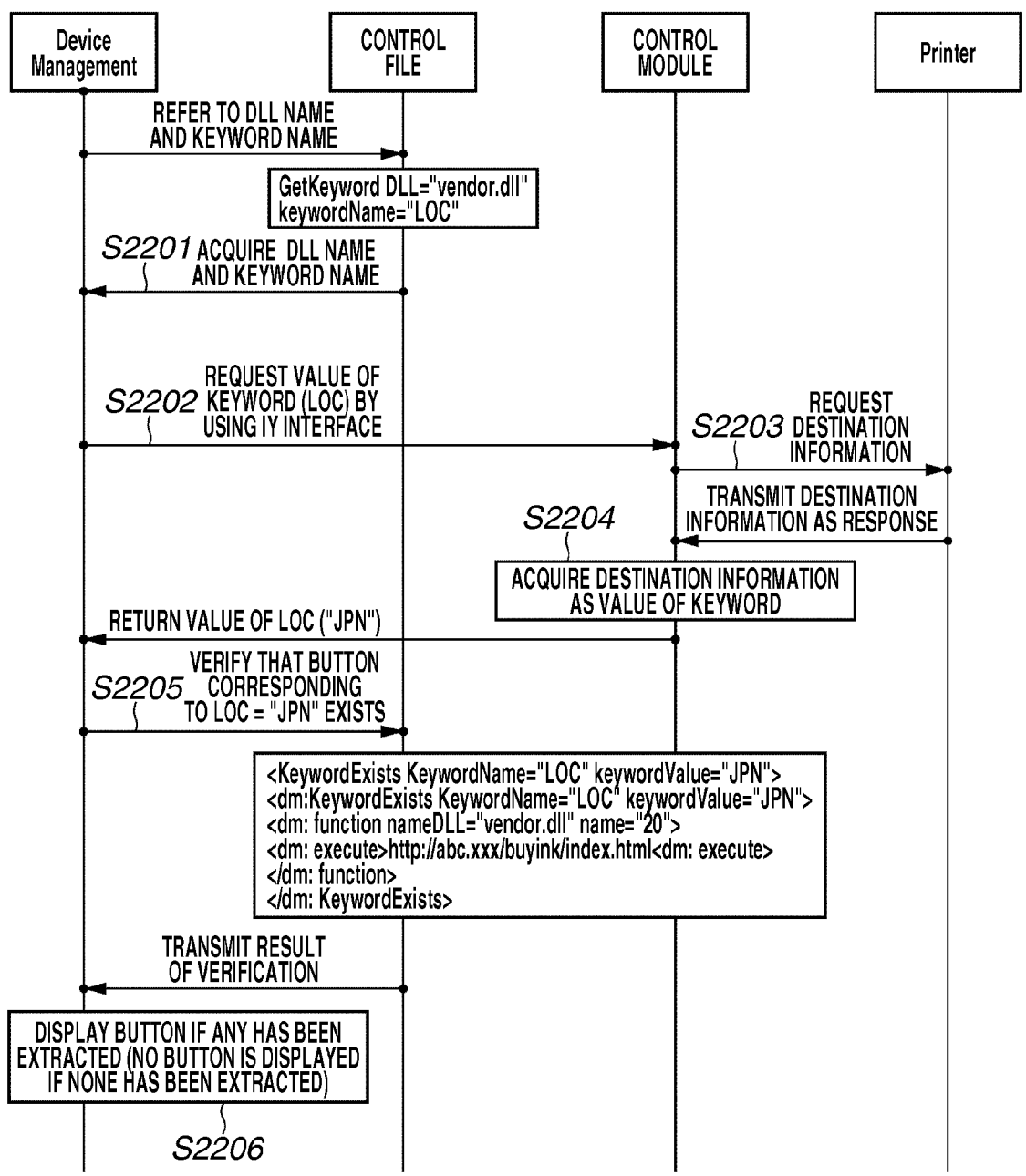
FIG. 22 is a flow chart illustrating exemplary processing for determining a button displayed by the management application according to the second exemplary embodiment of the present invention.

Referring to FIG. 22, in step S2201, the management application refers to the control file and acquires the control module name and the keyword. In the example illustrated in FIG. 22, the control file includes a description "<dm:getKeywordDLL="vendor.dll"keywordName="LOC">", for example. Accordingly, the control module name is "vendor.dll" and the keyword name is "LOC".

In step S2202, the device management application uses the IY interface to request the control module of transmitting a value of the keyword name "LOC".

In step S2203, the control module requests the printer corresponding to the PC 1 of transmitting the destination information. When the printer transmits a response to the request to the control module, the control module acquires the destination information.

In step S2204, the control module acquires the destination information as the keyword value. The processing for acquiring the destination information as the keyword value will be described in detail later below with reference to FIG. 29.

In step S2205, the management application refers to the control file and determines whether a button corresponding to the keyword value ("JPN") transmitted from the control module as the response exists. In this regard, more specifically, if the value of the keyword "LOC" is "JPN" when the following description is included in the control file, then the management application can determine that a cartridge purchasing button exists.

```
"<dm:keywordFound keywordName="LOC"keywordValue="JPN">"
"<dm:function nameDLL="vendor.dll"name="20">"
"<dm:execute>http://abc.xxx/buyink/index.html</dm:execute>"
"</dm:function>"
"</dm:keywordFound>".
```

If it is determined that a button exists in step S2205, then the management application executes control for displaying the button in step S2206. On the other hand, if it is determined that no button exists in step S2205, then the management application does not execute control for displaying the button in step S2206.

In the present exemplary embodiment, if the destination of the printer is "JPN" as the keyword value, then the cartridge purchasing button is displayed as illustrated in FIG. 17. On the other hand, if the destination of the printer is "USA", then no cartridge purchasing button is displayed as illustrated in FIG. 18.

Figure 29:
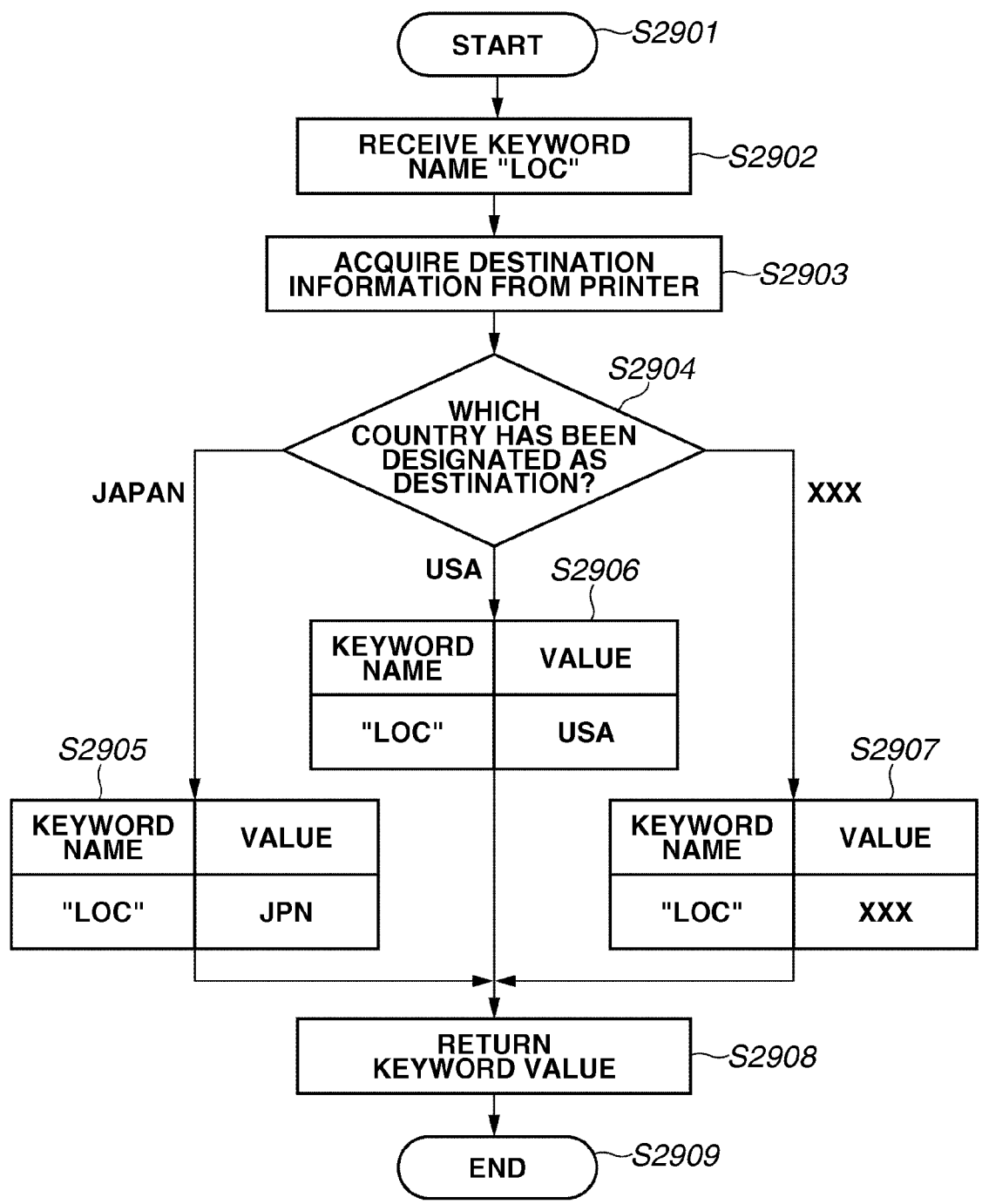
FIG. 29 is a flow chart illustrating exemplary processing executed by a control module for determining a value of a keyword according to the second exemplary embodiment of the present invention.

FIG. 29 is a flow chart illustrating exemplary processing executed by the control module for determining a value of a keyword according to the present exemplary embodiment.

Referring to FIG. 29, in step S2901, the processing starts. In step S2902, the control module receives the keyword "LOC" as a parameter from the management application via the IY interface.

In step S2903, the control module acquires the destination information from the printer connected to the PC 1.

In steps S2904 through S2907, the control module acquires and sets the keyword value corresponding to the acquired destination information.

In step S2904, the control module determines the value designated in the acquired destination information. If Japan ("JPN") has been designated as the destination of the printer (JAPAN in step S2904), then the processing advances to step S2905. In step S2905, the control module sets the keyword value "JPN". If the United States (USA) has been designated as the destination of the printer (USA in step S2904), then the processing advances to step S2906. In step S2906, the control module sets the keyword value "USA". If the "xxx" (a country or an area) has been designated as the destination of the printer (XXX in step S2904), then the processing advances to step S2907. In step S2907, the control module sets the keyword value "xxx".

In step S2908, the control module transmits the acquired keyword value to the management application via the IY interface.

Now, a third exemplary embodiment of the present invention will be described in detail below with reference to FIGS. 23 through 27 and FIGS. 35 through 39.

FIG. 23 illustrates an example of information described in the registry of the PC 1 according to the present exemplary embodiment. Referring to FIG. 23, a registry editor window 2301 includes a display field 2302, which indicates the tree structure of the registry. In the example illustrated in FIG. 23, a registry key "My Computer¥HKEY_LOCAL_MACHINE¥SOFTWARE¥ABC¥ABC Kmmn(JPN)" has been selected. A display field 2303 indicates a value described in the registry key selected in the field 2302.

In this example, a name of the value "LOC" 2304 is used. The value "LOC" 2304 indicates that the type of the data is "REG_SZ" 2305 and that data having the value "JPN" 2306 is stored. The information in the registry is described by a module other than the management application. That is, the information in the registry can be described by a printer driver as information about the printer compliant with the PC 1 when generating a printer icon. Furthermore, the information about the printer in the registry can be described by a dedicated application other than a printer driver.

Figure 24:
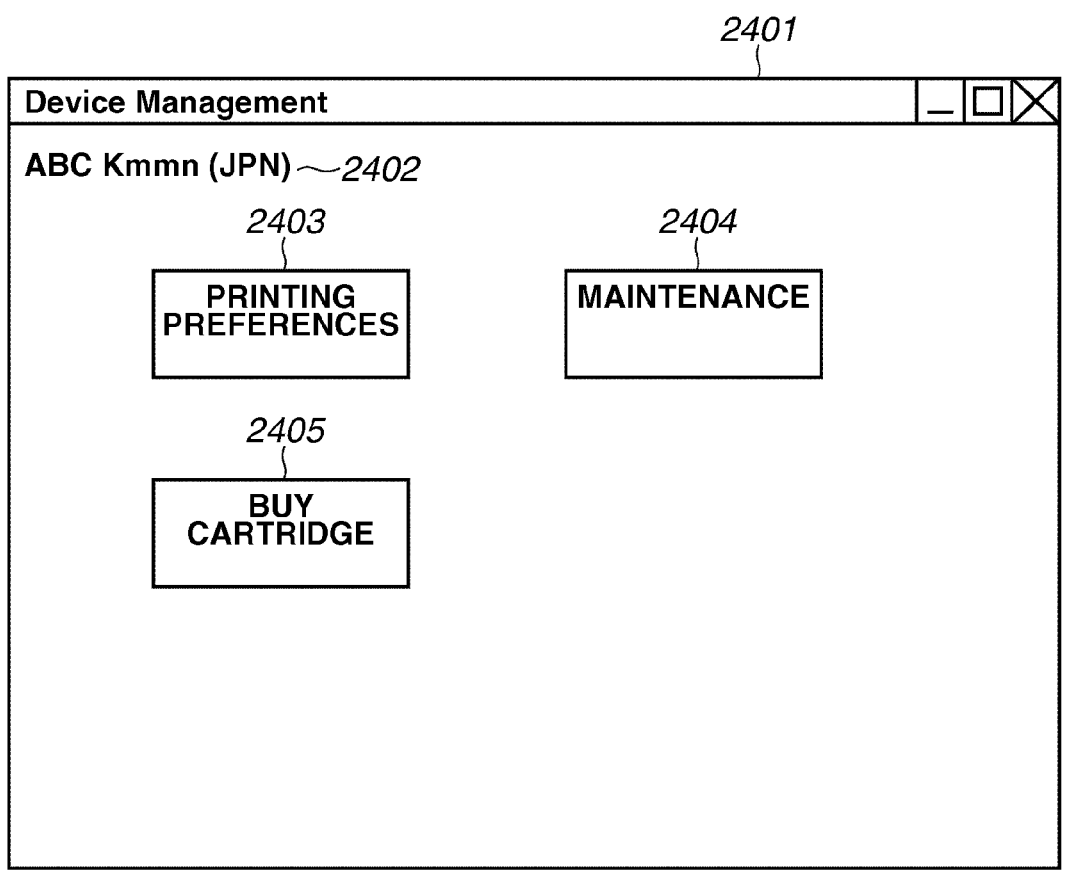
FIG. 24 illustrates an example of a screen displayed on a display unit as a function of a management application according to the third exemplary embodiment of the present invention.

FIG. 24 illustrates an example of a screen 2401 displayed on the display unit 1205 as a function of the management application according to the present exemplary embodiment. As illustrated in FIG. 24, the present exemplary embodiment can also manage the printer by using the management application.

Referring to FIG. 24, a printer name display portion 2402 displays the printer name corresponding to the printer for the printer icon 94. When the user presses a printing preferences setting button 2403, a printing preferences setting dialog, via which the user can perform each print setting necessary to execute printing with the printer 3, is displayed. On the printing preferences setting button 2403, a Japanese character string corresponding to "PRINTING PREFERENCES" is displayed according to the destination of the printer 3.

When the user presses a maintenance button 2404, a maintenance dialog, via which the user can perform each operation necessary for executing the maintenance of the printer 3, is displayed. On the maintenance button 2404, a Japanese character string corresponding to "MAINTENANCE" is displayed according to the destination of the printer 3.

When the user presses a cartridge purchasing button 2405, the web browser is activated. Then, a cartridge purchasing page of the web site, via which the user can purchase a cartridge for the printer 3 online, is displayed. A Japanese character string corresponding to "BUY CARTRIDGE" is displayed on the cartridge purchasing button 2405 according to the destination of the printer 3.

Figure 25:
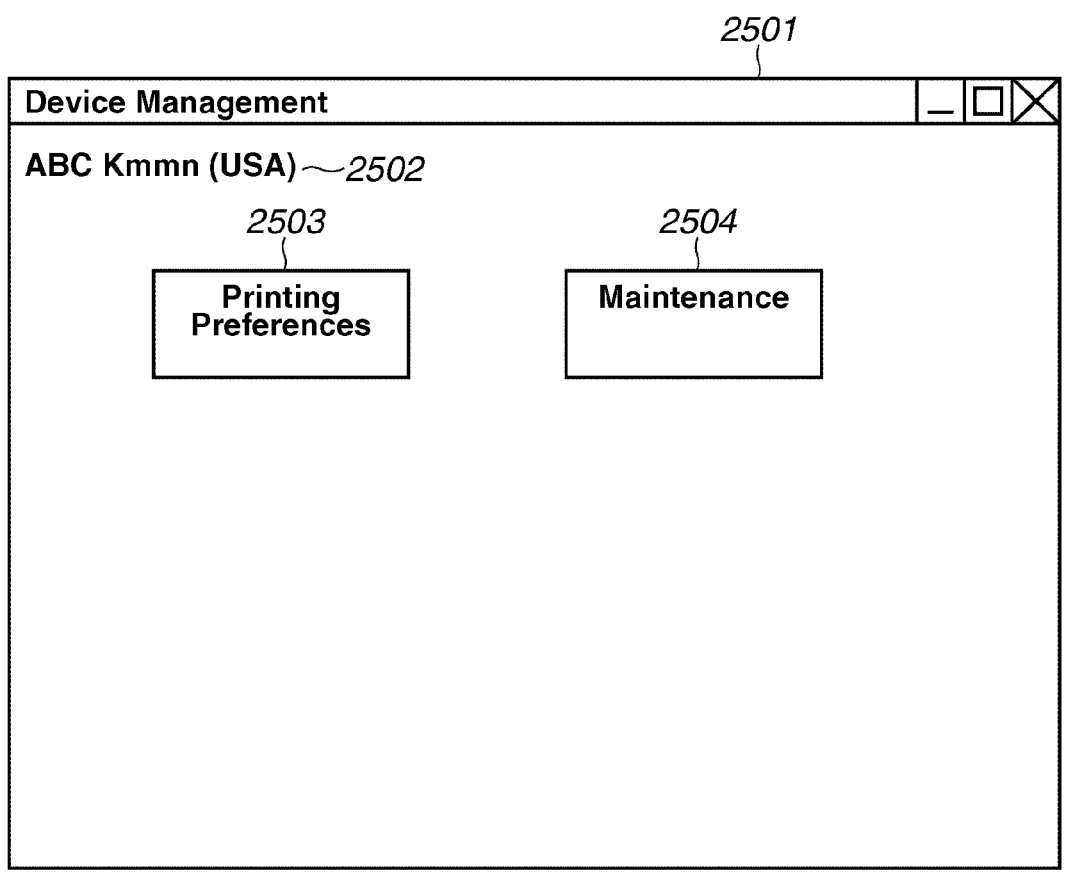
FIG. 25 illustrates an example of a screen displayed on a display unit as a function of a management application according to the third exemplary embodiment of the present invention.

FIG. 25 illustrates an example of a screen displayed on the display unit 1205 as a function of the management application according to the present exemplary embodiment. Referring to FIG. 25, a screen 2501, which is displayed as the function of the management application, includes a printer name display field 2502. The printer name display field 2502 displays the name of the printer corresponding to the printer icon 95.

When the user presses a printing preferences setting button 2503, a printing preferences setting dialog, via which the user can perform each print setting necessary to execute printing with the printer 5, is displayed. On the printing preferences setting button 2503, an English character string "Printing Preferences" is displayed according to the destination of the printer 5.

When the user presses a maintenance button 2504, a maintenance dialog, via which the user can perform each operation necessary for executing the maintenance of the printer 5, is displayed. On the maintenance button 2504, an English character string "Maintenance" is displayed according to the destination of the printer 5.

FIG. 26 illustrates an example of the content of a part of the control file according to the present exemplary embodiment. The control file includes information indicating the correspondence between the button displayed on the display unit 1205 as the function of the management application and the function of the button according to the value set for the parameter "LOC" included in the registry of the PC 1. Information illustrated in FIG. 26 is included in the control files 11 and 12.

Referring to the example shown in FIG. 26, the name of the manufacturer ("ABC Corporation") of the device (the printers 3, 5, 6, and 7) is set to an element "<dm:manufacturer>". In addition, an element "<dm:keywordInRegistry key= "HKEY_LOCAL_MACHINE¥stepSOFTWARE¥ABC¥ ABC Kmmn(JPN) "value="LOC:JPN">" includes a description about the management application activated when the printer 3, whose destination is Japan, is connected to the PC 1.

More specifically, three elements "<dm:function>", which indicate a button and a function of each of the printing preferences setting button 2403 (FIG. 24), the maintenance button 2404 (FIG. 24), and the cartridge purchasing button 2405 (FIG. 24), are included in the element "<dm:keywordInRegistry key="HKEY_LOCAL_ MACHINE¥stepSOFTWARE¥ABC¥ABC Kmmn(JPN) "value="LOC:JPN">".

In this regard, for example, a Japanese character string corresponding to "PRINTING PREFERENCES", which is displayed on the printing preferences setting button 2403, is set to an element "<dm:namexml:lang="ja">PRINTING PREFERENCES</dm:name>" described immediately below a first "<dm:function>" element.

Furthermore, code "printingPreferences", which indicates a function for displaying the printing preferences setting dialog, is set to a subsequent element "<dm:execute>printingPreferences</dm:execute>".

In addition, a Japanese character string corresponding to "MAINTENANCE", which is displayed on the maintenance button 2404, is set to an element "<dm:namexml: lang="ja">MAINTENANCE</dm:name>" described immediately below a second "<dm:function>" element.

Furthermore, code "printerMaintenance", which indicates a function for displaying the maintenance dialog is set to a subsequent element "<dm:execute>"printerMaintenance"</ dm:execute>".

In addition, a Japanese character string corresponding to "BUY CARTRIDGE", which is displayed on the cartridge purchasing button 2405 is set to an element "<dm:namexml: lang="ja">BUY CARTRIDGE/dm:name>" described immediately below a third "<dm:function>" element. Furthermore, a uniform resource locator (URL) of a cartridge purchasing page of the web site provided in Japan ("JPN"), where the user can buy an ink for the printer is set to a subsequent element "<dm:execute>http://abc.xxx/buyink/ index.html?LOC=JPN</dm:e xecute>".

Furthermore, an element "<dm:keywordInRegistry key="HKEY_LOCAL_MACHINE¥SOFTWARE¥ABC¥ ABC Kmmn(USA)"value="LOC"string="USA">" includes a description about the management application activated when the printer 5 whose destination is the United States is connected to the PC 1. More specifically, two "<dm:function>" elements, which indicate a button and a function of each of the printing preferences setting button 2503 (FIG. 25) and the maintenance button 2504 (FIG. 25) are included in the element "<dm:keywordInRegistry key="HKEY_LOCAL_ MACHINE¥SOFTWARE¥ABC¥ABC Kmmn (USA) "value="LOC"string="USA">".

In this regard, for example, an English character string "PrintingPreferences", which is displayed on the printing preferences setting button 2503, is set to an element "<dm: namexml:lang="en-US">Printing Preferences</dm:name>" described immediately below a first "<dm:function>" element.

In addition, code "printingPreferences", which indicates a function for displaying the printing preferences setting dialog, is set to a subsequent element "<dm:namexml:lang="en-US">Printing Preferences</dm:name>".

Furthermore, an English character string "Maintenance", which is displayed on the maintenance button 2504, is set to an element "<dm:namexml:lang="en-US">Maintenance</ dm:name>" displayed immediately below a second "<dm: function>" element. In addition, code "printerMaintenance", which indicates a function for displaying the maintenance dialog is set to a subsequent element "<dm: execute>printerMaintenance</dm:execute>".

With the above-described configuration, the present exemplary embodiment can control the display and the function of the cartridge purchasing button according to the information described in the registry and the control file. However, the present exemplary embodiment is not limited to this. That is, it is also useful if a switch for enabling and disabling the online cartridge purchasing function is described as registry information and if it is automatically set whether to display the cartridge purchasing button according to the registry information. In this case, the present exemplary embodiment executes control for displaying a cartridge purchasing button only when the information indicating that the online cartridge purchasing function has been enabled is described in the registry.

In addition, it is also useful if the present exemplary embodiment executes display control for automatically enabling or disabling the display of the printing preferences setting button 2503 according to registry information including a description about whether a driver or other software has been installed. Furthermore, it is also useful if the present exemplary embodiment executes control for automatically enabling or disabling the display of the printing preferences setting button 2503 according to a result of a determination as to whether a driver and other software module have been installed as well as according to the registry information described above.

Figure 27:
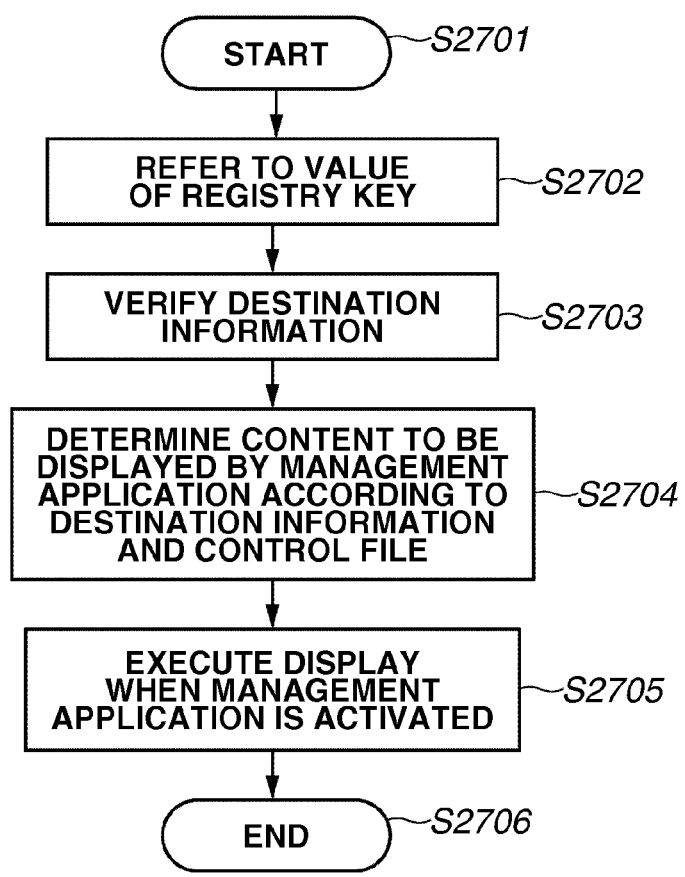
FIG. 27 is a flow chart illustrating exemplary processing for activating the management application according to the third exemplary embodiment of the present invention.

FIG. 27 is a flow chart illustrating exemplary processing for activating the management application on the PC 1 according to the present exemplary embodiment. Referring to the example shown in FIG. 27, in step S2701, the OS issues an instruction for activating the management application. Then, the management application activation processing starts.

In step S2702, the management application activated in step S2701 refers to the value of the registry key. More specifically, the management application refers to the registry key described in the key of the element "<dm:keywordInRegistry>" described in the control file.

In step S2703, the management application refers to the value set to the key "LOC" described in the registry key, which has been referred to in step S2702 as the destination information.

In step S2704, the OS determines the content to be displayed by the management application according to the information about the destination ("LOC:") acquired in step S2703 and the content of the control file (FIG. 26). In step S2705, the OS executes control for displaying the display content determined in step S2704 on the display unit 1205 as the display executed when the management application is activated. In step S2706, the management application activation processing ends.

The management application activation processing illustrated in the example shown in FIG. 27 differs from the processing illustrated in the example shown in FIG. 15 with respect to the location that the management application refers to in order to acquire the information about the destination of the printer.

Now, the method implemented when the description in the registry differs from the above-described form of the description in the registry according to the present exemplary embodiment will be described in detail below.

FIG. 35 illustrates an example of information described in the registry of the PC 1 according to the present exemplary embodiment. Referring to the example shown in FIG. 35, a registry editor display window 3501 includes a display field 3502, which indicates the tree structure of the registry. In the example illustrated in FIG. 35, a registry key "My Computer¥HKEY_LOCAL_MACHINE¥SOFTWARE¥ABC¥ABC Kmmn(USA)" has been selected. A display field 3503 indicates a value described in the registry key selected in the field 3502.

In this example, a name of the value "LOC" 3504 is used. The value "LOC" 3504 indicates that the type of the data is "REG_SZ" 3505 and that data having the value "US-English" 3506 is stored. If a value of the data "US-English" is described in the registry, the control file may include a description "US-English".

However, it is necessary to describe a plurality of settings in the control file if it is desired to execute the same processing as that executed in the case of the value "US-English" even when a value "US-Spanish" is described in the registry. In order to prevent such a complicated operation, the control file can include the following description.

FIG. 36 illustrates an example of the content of a part of the control file according to a modification of the present exemplary embodiment. The control file includes information indicating the correspondence between the button displayed on the display unit 1205 as the function of the management application and the function of the button according to the value set for the parameter "LOC" included in the registry of the PC 1. Information illustrated in FIG. 36 is included in the control files 11 and 12.

Referring to the example shown in FIG. 36, an element "<dm:keywordInRegistry path="HKEY_LOCAL_MACHINE¥SOFTWARE¥ABC¥ABC Kmmn (USA)>" includes a description about the management application activated when the printer 5 is connected to the PC 1.

In addition, an element "<dm:KeywordInRegistryValue type="REG_SZ"name="LOC"value="US"search="part">" includes a description describing that the data type is "REG_SZ" and that the name of the data is "LOC". Furthermore, the element "<dm:KeywordInRegistryValuetype="REG_SZ" name="LOC" value="US" search="part">" includes a description describing that the value of the data is "US" and a condition "search="part"" for matching the above-described value and an actually described value. The description "search="part"" indicates that it has been designated to determine whether the value of the control file "US" has been at least partially included in the value described in the registry. In the example illustrated in FIG. 36, if the value "US" has not been included, then no cartridge purchasing button is to be displayed.

Figure 39:
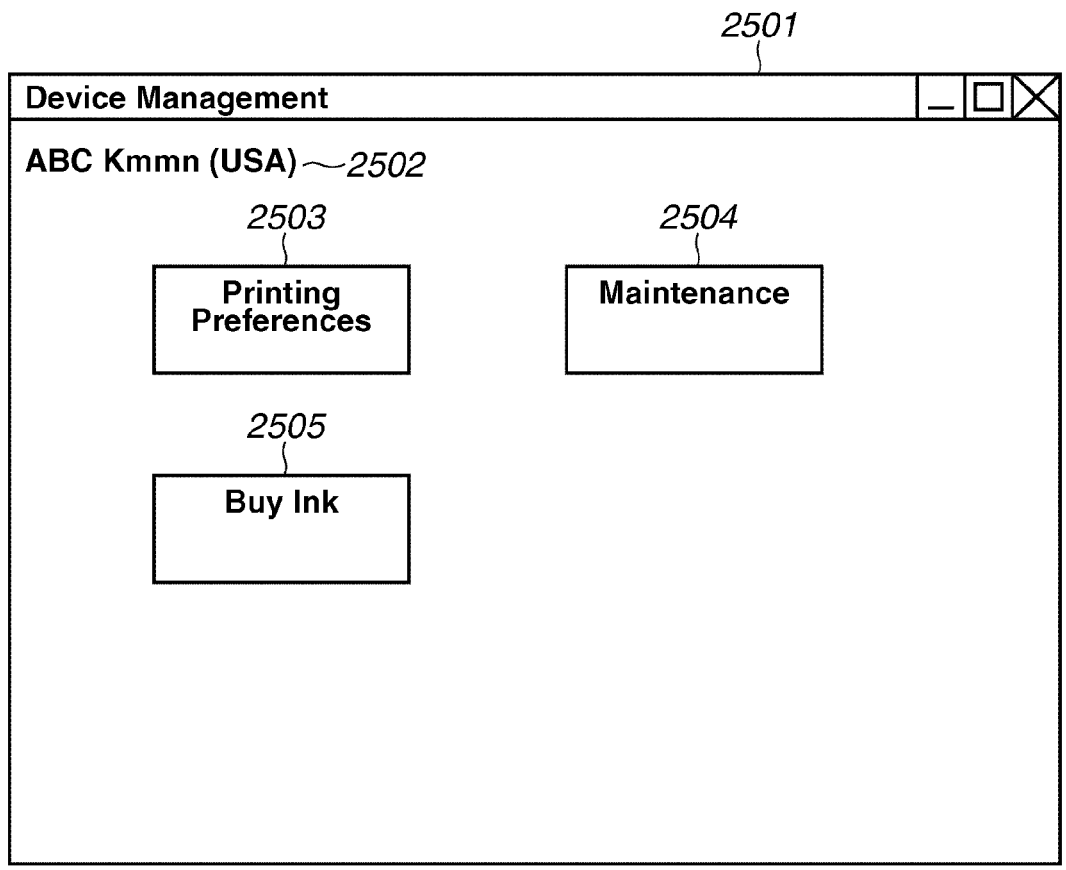
FIG. 39 illustrates an example of a screen displayed on a display unit as a function of a management application according to the third exemplary embodiment of the present invention.

Here, the screen 2501, the printer name display field 2502, the printing preferences setting button 2503, and the maintenance button 2504 illustrated in FIG. 39 are the same as those illustrated in FIG. 25. In the example illustrated in FIG. 39, a cartridge purchasing button ("Buy Ink") 2505 is displayed if the value "US" is included in the registry. It is also useful if a condition such as prefix search or suffix search is described as an attribute value of a "search" attribute.

Example of Determining Matching Status of 5 Characters or Less from First Character:

search="part_5_from_left"

Example of Determining Matching Status of 8 Characters or Less from Last Character:

search="part_8_from_right"

Now, a method executed when the data of the registry is described in Double Word (DWORD) format will be described in detail below as a second modification of the third exemplary embodiment.

FIG. 37 illustrates an example of information according to a modification of the present exemplary embodiment. Referring to FIG. 37, a registry editor window 3701 includes a display field 3702, which indicates the tree structure of the registry. In the example illustrated in FIG. 37, a registry key "My Computer¥HKEY_LOCAL_MACHINE¥SOFTWARE¥ABC¥ABC Kmmn (USA)" has been selected. A display field 3703 indicates a value described in the registry key selected in the field 3702.

In the example illustrated in FIG. 37, the display field 3703 includes a value name "INKREMAIN" 3704. The value "INKREMAIN" 3704 indicates that the data type is "REG_DWORD" 3705 and that the data having a value "10" 3706 has been stored. If the value of the data in the registry is smaller than "20", then the control file can include the following description for uniformly enabling a specific function.

FIG. 38 illustrates an example of the content of a part of the control file according to a modification of the present exemplary embodiment. Referring to FIG. 38, the control file includes information indicating the correspondence between the button displayed on the display unit 1205 as the function of the management application and the function of the button according to the value set for and stored as the parameter "INKREMAIN" included in the registry of the PC 1. Information illustrated in FIG. 38 is included in the control files 11 and 12.

Referring to the example shown in FIG. 38, an element "<dm:keywordInRegistry path="HKEY_LOCAL_MACHINE¥SOFTWARE¥ABC¥ABC Kmmn (USA)>" includes a description about the management application activated when the printer 5 is connected to the PC 1.

In addition, an element "<dm:KeywordInRegistryValue type="REG_DWORD" name="INKREMAIN" value="20" search="smaller">" includes a description describing that the data type is "REG_DWORD" and that the name of the data is "INKREMAIN". Furthermore, the element "<dm:KeywordInRegistryValue type="REG_DWORD" name="INKREMAIN" value="20" search="smaller">" includes a description describing that the value of the data is "20" and a condition "search="smaller"" for matching the above-described value and an actually described value. The description "search="smaller"" indicates that it has been designated to determine whether the value described in the registry is smaller than the value described in the control file. In the example illustrated in FIG. 38, if the value described in the registry is "20" or greater, then no cartridge purchasing button is to be displayed. On the other hand, in the example illustrated in FIG. 39, if the value described in the registry is less than "20", then the cartridge purchasing button is to be displayed.

It is also useful if a condition such as whether the value described in the registry is greater than the value in the control file, whether the values match each other, or whether they match each other as a bit flag as an attribute value of a "search" attribute.

Example of The Case of Determining Whether The Value Described in The Registry Is Greater than The Value in The Control File:
search="larger"

Example of The Case of Determining Whether The Value Described in The Registry And The Value in The Control File Match Each Other as A Bit Flag:
search="equal"

Example of The Case of Determining Whether The Value Described in The Registry And The Value in The Control File Match Each Other:
search="bit_compare"

In the present exemplary embodiment, the data type "REG_SZ" and "REG_DWORD" are used as the data type of the data in the registry. However, the present exemplary embodiment is not limited to this. That is, the above-described control can be implemented if the data type of the data described in the registry is "REG_BINARY".

Now, a fourth exemplary embodiment of the present invention will be described in detail below. In the above-described first through third exemplary embodiments of the present invention, the management of the device is implemented by utilizing the control file dedicated to the device (printer) "Kmmn" of ABC Corporation. In the present exemplary embodiment, one or a pair of control file(s) for a plurality of devices is provided and utilized by the management application to manage a plurality of devices.

Particularly, in the present exemplary embodiment, the management application controls the display and executes other processing on a link button to a user support page and a link button to a software downloading page of a web site. The present exemplary embodiment is useful especially in centrally managing a plurality of general-purpose devices by utilizing one or a pair of control file(s) to manage a plurality of devices.

More specifically, the present exemplary embodiment can improve the efficiency in developing a system as well as reduce the development costs. Furthermore, the present exemplary embodiment can implement a uniform user operation regardless of the model type of the device. Thus, the present exemplary embodiment can improve user operability.

Figure 69:
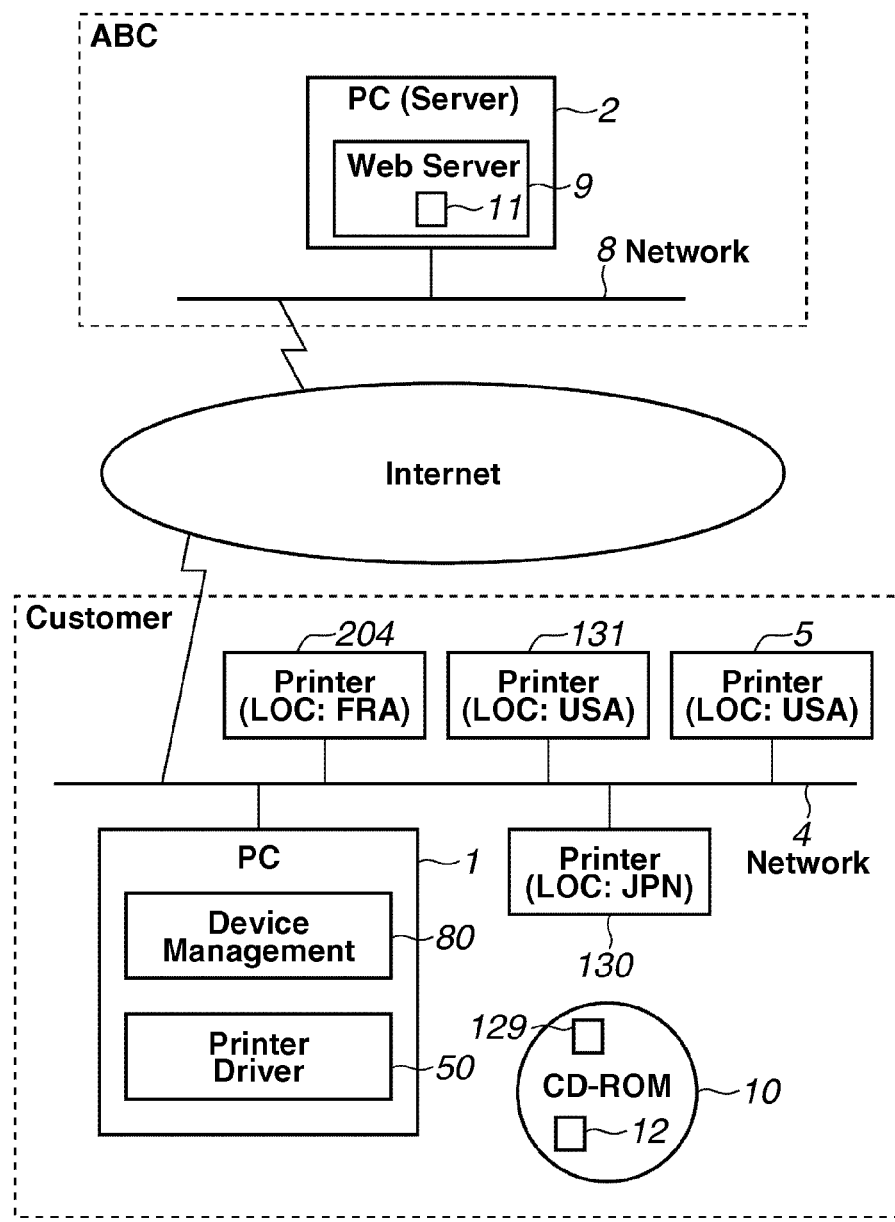
FIG. 69 illustrates an exemplary configuration of a system including an information processing apparatus and a peripheral apparatus according to the fourth exemplary embodiment of the present invention.

FIG. 69 illustrates an exemplary configuration of a system including an information processing apparatus and a peripheral apparatus according to the present exemplary embodiment. The components and units similar to those described above with reference to FIG. 1 in the first exemplary embodiment are provided with the same reference numerals and symbols. Accordingly, the detailed description thereof will not be repeated here.

Referring to the example shown in FIG. 69, each of color inkjet printers 130, 131, and 204 is an example of the peripheral apparatus of the present exemplary embodiment. The printer 130 is a printer having a model name "Oppq", which is manufactured by ABC Corporation. The destination of the printer 130 is set to Japan ("JPN"). The printer 131 is a printer having a model name "Rsst", which is manufactured by ABC Corporation. The destination of the printer 131 is set to the United States ("USA"). The printer 204 is a printer having a model name "Deef", which is manufactured by ABC Corporation. The destination of the printer 204 is set to France ("FRA").

A setup application 129 is stored on the CD-ROM 10. A printer driver is set up on the PC by executing the setup application 129.

Figure 40:
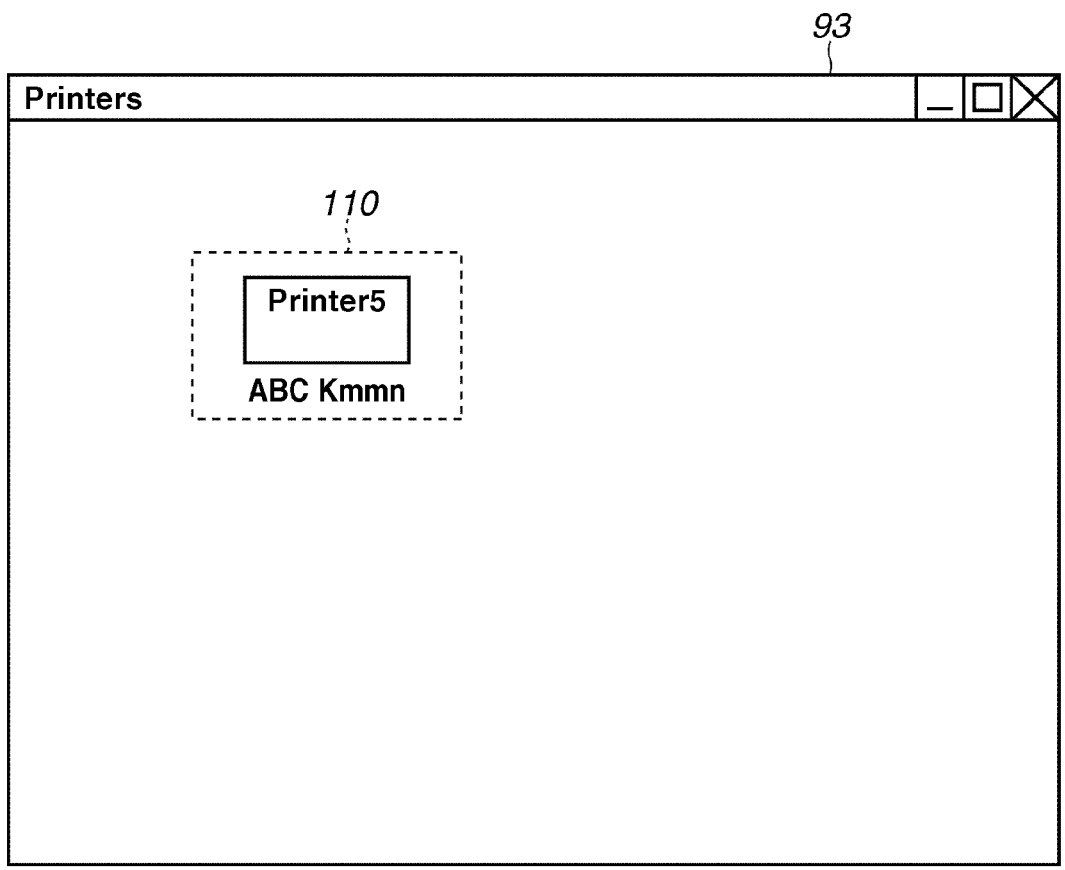
FIG. 40 illustrates an example of a printer folder displayed on a display unit according to a fourth exemplary embodiment of the present invention.

FIG. 40 illustrates an example of a printer folder displayed on the display unit 1205 according to the present exemplary embodiment. Referring to FIG. 40, a printer icon 110 corresponds to the printer 5, whose destination is the United States. Although the destination of the printer 5 is the United States, the printer icon 110 displays the printer name "ABC Kmmn" because the printer driver 50 is provided as a printer driver for all destinations.

Figure 41:
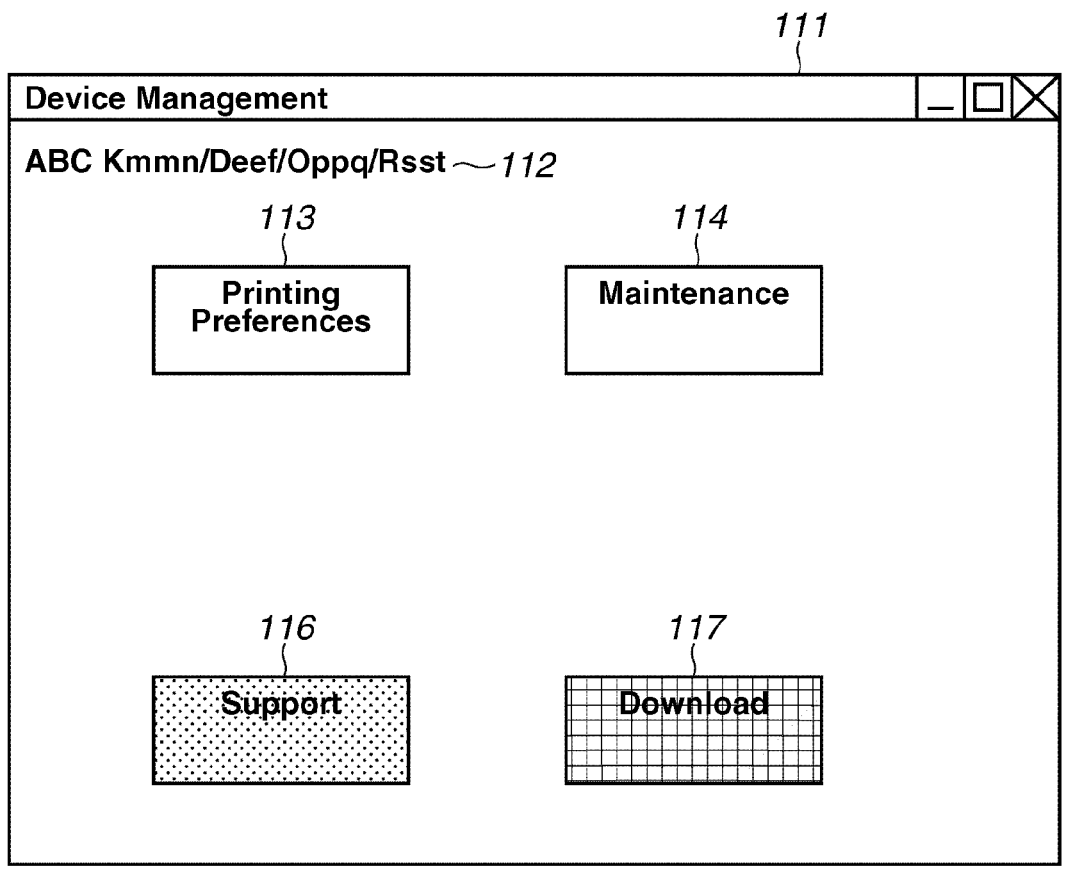
FIG. 41 illustrates an example of a screen displayed on a display unit as a function of a management application according to the fourth exemplary embodiment of the present invention.

FIG. 41 illustrates an example of a screen displayed on the display unit 1205 as a function of the management application according to the present exemplary embodiment. The user can input an instruction for utilizing the function of the management application via a display screen 111 provided by the management application 80 to manage the printer.

The screen 111 includes a printer name display field 112. Here, the example illustrated in FIG. 41 illustrates an example of the display executed when the concerned printer has not been identified or extracted. Accordingly, the printer name display field 112 indicates the name of all models of the printer that the management application supports.

When the user presses a printing preferences setting button 113, a printing preferences setting dialog, via which the user can perform each print setting necessary for printing by the printer, is displayed. When the user presses a maintenance button 114, a maintenance dialog, via which the user can perform each operation necessary for the maintenance of the printer, is displayed.

A support button 116 can be operated by the user to enter an instruction for shifting to a screen that provides the user support. A download button 117 can be operated by the user to enter an instruction for shifting to a software downloading screen. The support button 116 and the download button 117 are displayed as icons of different color or shape that allow the user to easily recognize the corresponding service. Processing to be executed when the user presses the support button 116 and the download button 117 will be described in detail later below.

Figure 42:
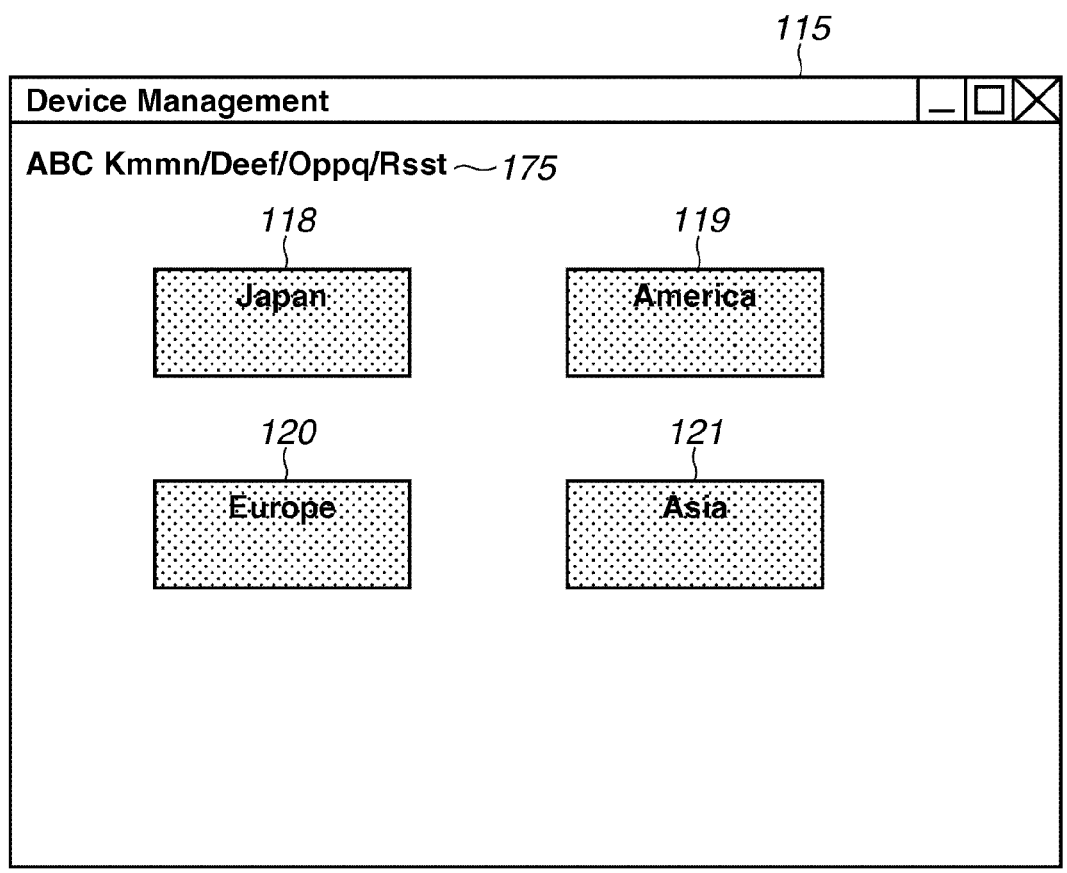
FIG. 42 illustrates an example of a screen displayed on a display unit as a function of a management application according to the fourth exemplary embodiment of the present invention.

FIG. 42 illustrates an example of a screen displayed on the display unit 1205 as a function of the management application according to the present exemplary embodiment. When the user presses the support button 116 (FIG. 41), a display screen 115 is displayed. The display screen 115 includes a printer name display field 175. In addition, the display screen 115 includes a support button for Japan 118. When the user presses the support button for Japan 118, Japan is set as the destination (area information). Furthermore, a user support page 179 (FIG. 70) of the web site for the Japanese market is displayed by the web browser 106, which runs on the PC.

In addition, the display screen 115 includes a support button for the United States 119. Similarly, when the user presses the support button for the United States 119, a user support page 152 (FIG. 59) of the web site for the U.S. market is displayed by the web browser 106. Furthermore, the display screen 115 includes a support button for European market 120 and a support button for Asian market 121. When the user presses the support button for European market 120 or the support button for Asian market 121, a user support page of the web site for the market of the corresponding area is displayed by the web browser 106.

Each of the support buttons 118 through 121 can be displayed in the same color or shape as that of the support button 116. Thus, the present exemplary embodiment can allow the user to visually and easily recognize that when the user presses any of the support buttons 118 through 121, the user can access the user support page of the web site of the designated country or area.

Figure 43:
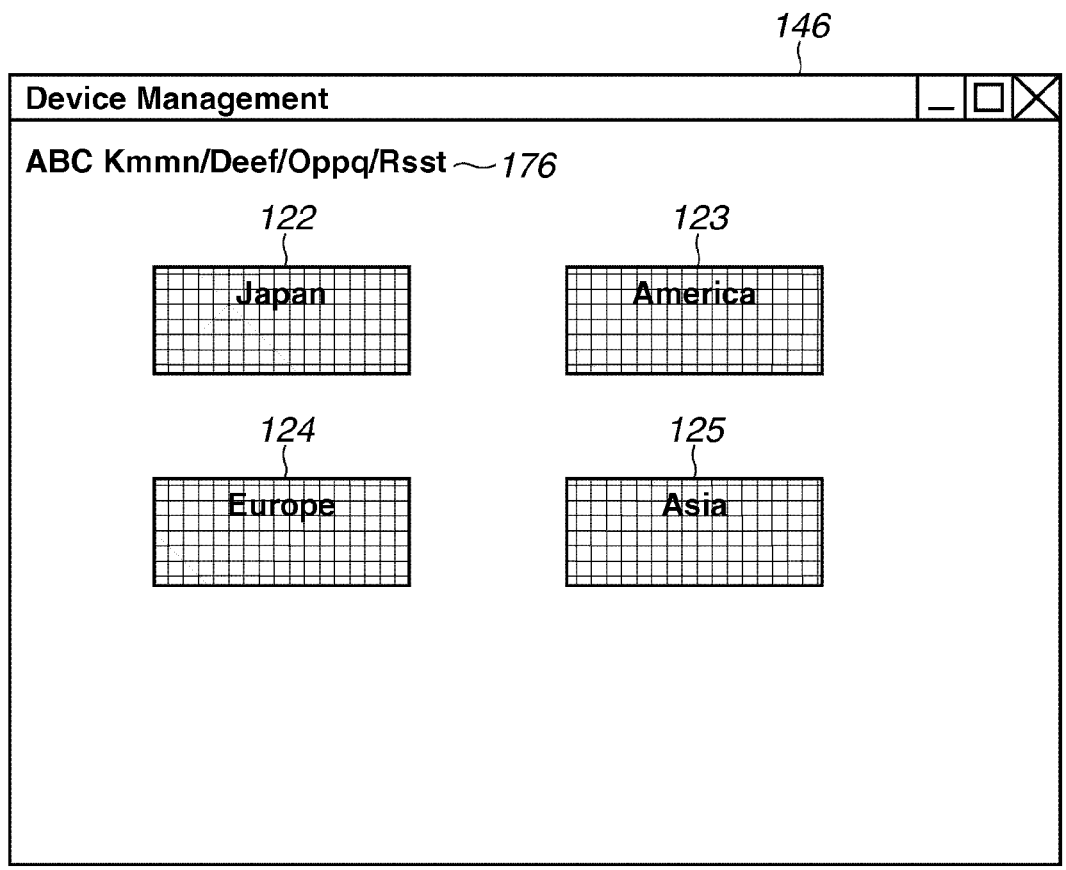
FIG. 43 illustrates an example of a screen displayed on a display unit as a function of a management application according to the fourth exemplary embodiment of the present invention.

FIG. 43 illustrates an example of a screen displayed on the display unit 1205 as a function of the management application according to the present exemplary embodiment. When the user presses the download button 117 (FIG. 41), a display screen 146 is displayed. The display screen 146 includes a printer name display field 176. When the user presses a download button for Japan 122, Japan is set as the destination (area information). Then, the software downloading page of the web site for the Japanese market is displayed by the web browser 106, which runs on the PC.

Similarly, when the user presses any of a download button for the United States 123, a download button for European market 124, and a download button for Asian market 125, the software downloading page of the web site for the market of the corresponding country or area is displayed by the web browser 106.

Each of the download buttons 122 through 125 can be displayed in the same color or shape as that of the download button 117. Thus, the present exemplary embodiment can allow the user to visually and easily recognize that when the user presses any of the download buttons 122 through 125, the user can access the software downloading page of the web site of the designated country or area.

Figure 44:
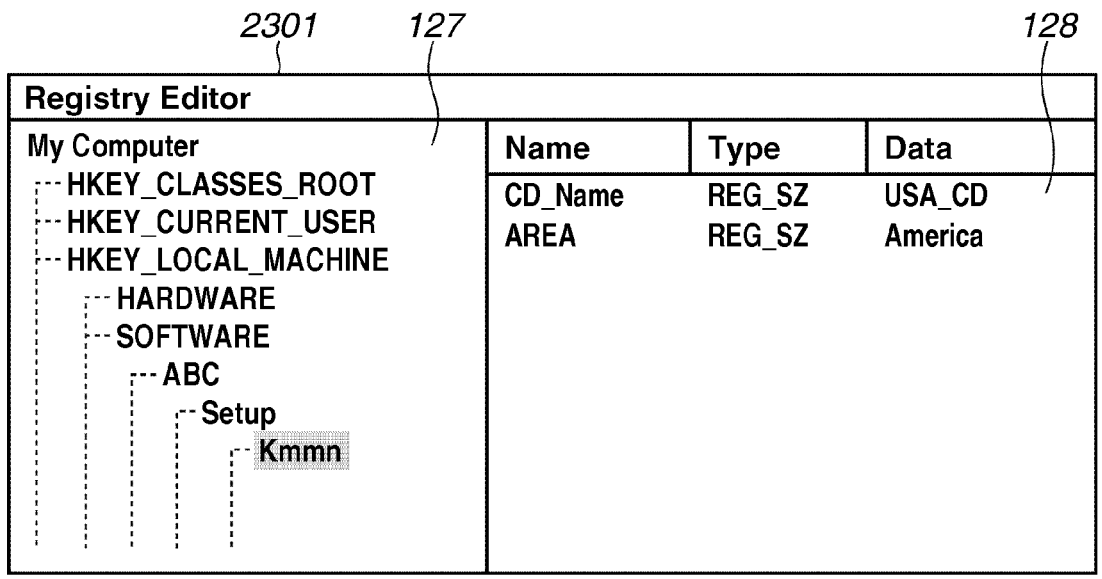
FIG. 44 illustrates an example of information described in the registry of a PC according to the fourth exemplary embodiment of the present invention.

FIG. 44 illustrates an example of information 2301 described in the registry of the PC 1 according to the present exemplary embodiment. Referring to FIG. 44, a display field 127 indicates the tree structure of the registry. In the example illustrated in FIG. 44, a registry key "My Computer¥HKEY_LOCAL_MACHINE¥SOFT-WARE¥ABC¥Setup¥Kmmn" has been selected. A display field 128 indicates a value described in the registry key selected in the field 127. In the example illustrated in FIG. 44, the name of the CD-ROM 10 is "CD_Name". Furthermore, the data "USA_CD" whose data type is "REG_SZ" has been stored on the CD-ROM 10. In addition, the data name "AREA" indicates the name of the area. Furthermore, it is indicated that information "America" whose data type is "REG_SZ" has been stored.

The registry key and the registry information are described by the setup application 129 for setting up the printer when it is executed, for example. Here, the setup application 129 is an application other than the management application. The setup application 129 is generally supplied with the printer.

In the present exemplary embodiment, a CD-ROM and a setup application are provided to a plurality of areas or countries including Japan, the United States, Europe, or Asia. The following registry information can be described by the setup application for each area or country during the setup operation.

| Japan: | | |
|---|---|---|
| CD_Name | REG_SZ | JPN_CD |
| AREA | REG_SZ | Japan |
| The U.S.: | | |
| CD_Name | REG_SZ | USA_CD |
| AREA | REG_SZ | America |
| Europe: | | |
| CD_Name | REG_SZ | EUR_CD |
| AREA | REG_SZ | Europe |
| Asia: | | |
| CD_Name | REG_SZ | ASIA_CD |
| AREA | REG_SZ | Asia |

The registry key generated by the setup application 129 includes the model name of the printer such as "Kmmn". Accordingly, the model name of the device and the area/country information can be acquired from the registry key and the registry information.

In the present exemplary embodiment, an initial value set when the setup application for each area/country is executed on the OS for the corresponding area/country is set as the information set as the "AREA". However, the present exemplary embodiment is not limited to this. That is, it is also useful if a function for displaying a screen for allowing the user to designate the area when the setup application is activated is provided to the setup application and if the name of the area designated by the user via the screen is set as the "AREA".

In this case, the name of the area desired and designated by the user is set as the information of the "AREA". Accordingly, the information desired by the user can be set in the registry. Thus, by preferentially utilizing the information desired and designated by the user, the present exemplary embodiment can implement the method for managing the device that can appropriately apply the information desired by the user and improve user operability.

Now, the method according to the present exemplary embodiment executed when an initial value is set as the information to be set as the "AREA" will be described in detail below.

Figure 45:
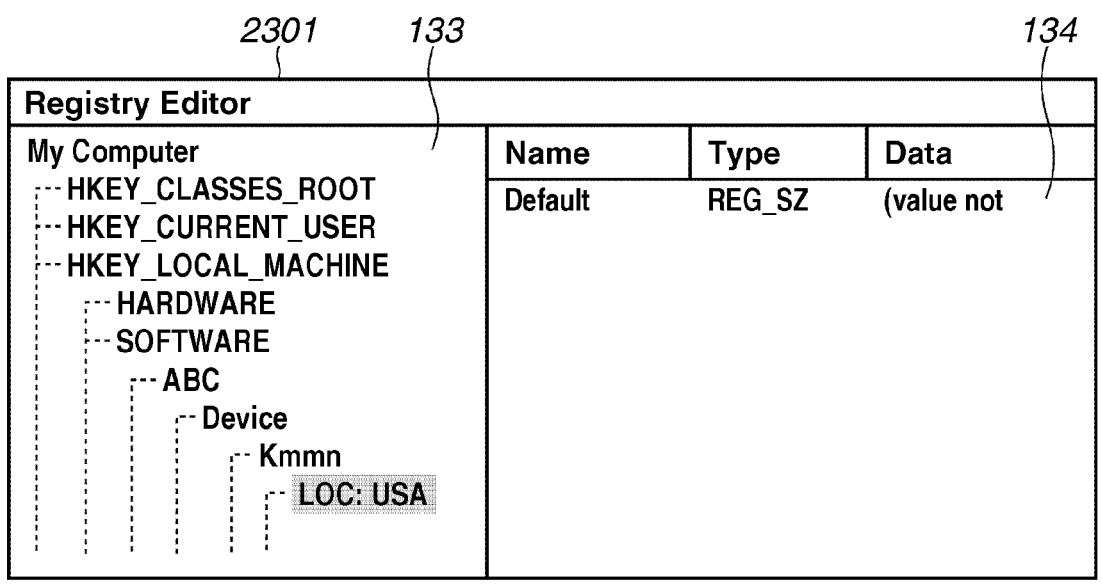
FIG. 45 illustrates an example of information described in the registry of a PC according to the fourth exemplary embodiment of the present invention.

FIG. 45 illustrates an example of information described in the registry of the PC 1 according to the present exemplary embodiment. Referring to FIG. 45, a display field 133 indicates the tree structure of the registry. In the example illustrated in FIG. 45, a registry key "My Computer¥HKEY_LOCAL_MACHINE¥SOFT-WARE¥ABC¥Device¥Kmmn¥LOC:US A" has been selected. The display field 133 includes a display field 134. The display field 134 indicates the value described in the registry key selected in the display field 133.

In this example, the default registry information generated when the registry key is generated only is described. The registry key can be generated by the following processing. That is, the language monitor 36 acquires the device ID illustrated in FIGS. 10A through 10D from the printer 5 when the printer driver 50 is activated and operated. Then, the information to be described in the registry key is generated according to the information and the generated information is described in the registry.

The generated registry key includes the model name of the device and the destination information of the device acquired according to the device ID. Area information can be used as the destination information. Accordingly, the model name and the destination information of the device can be acquired from the registry key.

However, the present exemplary embodiment is not limited to this. That is, a different another arbitrary method that can implement the same effect can be used, such as a method for generating a similar registry key according to information about the device acquired by the printer driver 50 by using a component other than that described above.

The registry information described above with reference to the examples shown in FIGS. 44 and 45 may differ according to the installation method executed by the user. In the present exemplary embodiment, it is supposed that a registry key is generated when installation using the setup application 129 is executed, when installation by PnP is executed, or information (device ID) is acquired from the printer by utilizing the function of the driver.

In this regard, the following four cases may arise with respect to the information in the registry key generated by either of the above-described methods.

Case 1: Both the model name and the area information are not available (described in detail later below with reference to FIG. 48).

Case 2: The model name has been identified but the area information is not available.

Case 3: The model name is not available but the area information has been identified (described in detail later below with reference to FIG. 66).

Case 4: Both the model name and the area information have been identified (described in detail later below with reference to FIGS. 51 and 52).

As described above, the cases 2 and 3 where either the model name or the area information is not available are to be described herein because the setup application 129 may not always be provided with a function for describing the area information in the registry information or the printer may not always include a function for adding the destination information to the device ID.

The above-described cases may occur as a characteristic when the device management is implemented that is capable of managing a plurality of printers by using one or a pair of control file(s).

The content of the description continuously illustrated in the examples shown in FIGS. 46 and 47 indicates the content of a part of the control file used in managing and controlling the printer. The information illustrated in FIGS. 46 and 47 is stored in the control files 11 and 12 as a part thereof. More specifically, the information includes information indicating the correspondence between the button displayed on the display unit as the function of the management application according to the registry information and the function of the button. The control file complies with an environment in which an OS based on the language of American English.

Referring to the examples shown in FIGS. 46 and 47, an element "<dm:model>" describes the model names of a plurality of devices (printers) that can be managed by using the control file, namely, "Kmmn", "Deef", "Oppq", and "Rsst".

The first element "<dm:keywordInRegistry>" includes a description of control executed when the setup application 129 has set the following registry key and registry information, which corresponds to the above-described case 4.

Figure 56A:
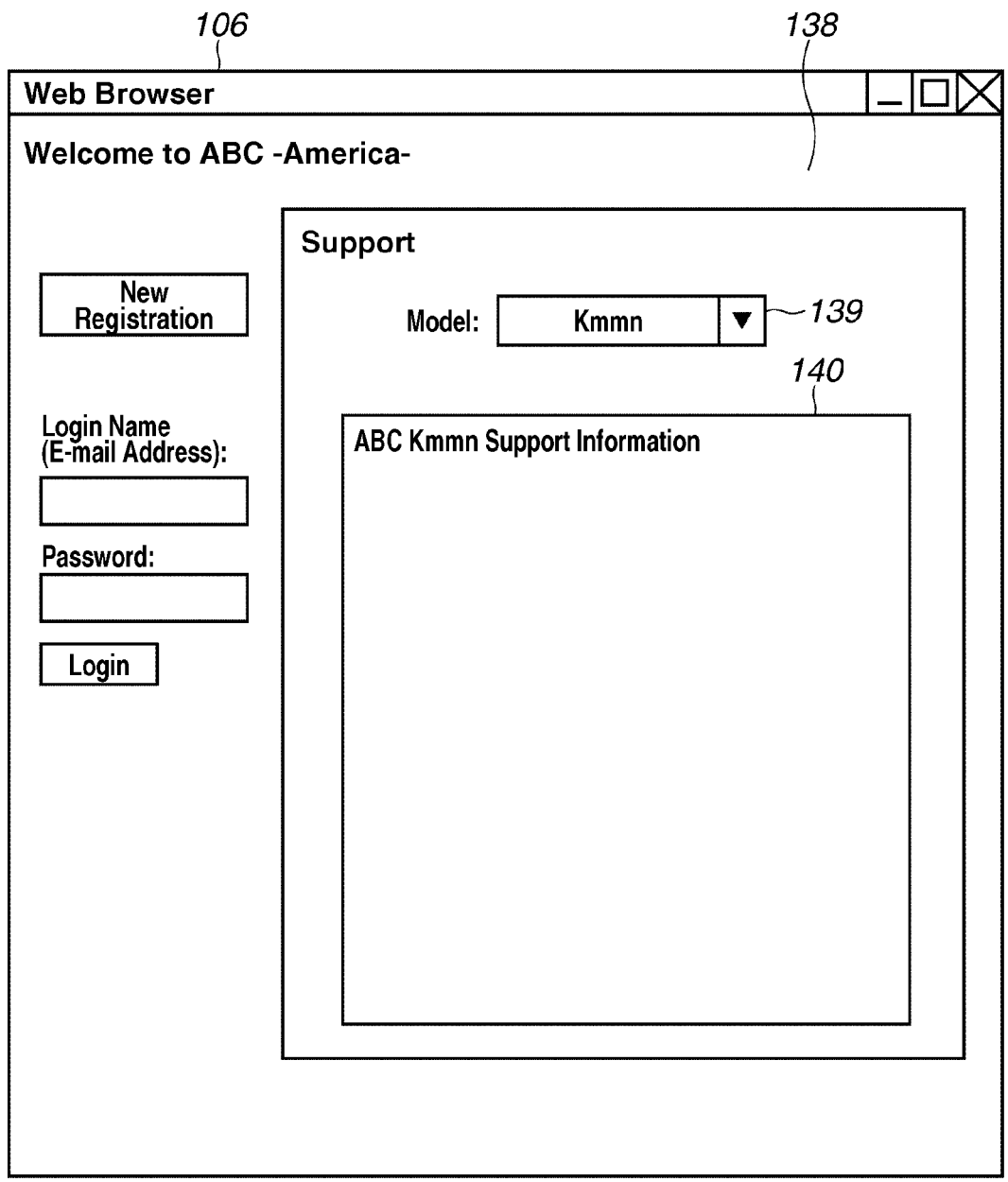

(Registry Key):
HKEY_LOCAL_MACHINE¥SOFTWARE¥ABC¥Setup¥Kmmn
(Registry Information):
CD_Name REG_SZ JPN_CD The above-described registry key and registry information include a description instructing displaying a support button for Japan 136 (FIG. 68A) and a download button for Japan 137 (FIG. 68A) on the screen provided by the management application when the model name is "Kmmn" and the "CD_Name" is "JPN_CD". In addition, the registry key and the registry information include a description about a function for linking to a Japanese user support page 141 for Kmmn (FIG. 56B) and a function for linking to a software downloading page for Japan 145 for Kmmn (FIG. 57B).

Here, an American English language ID "LANG=0409" is set as a parameter of a linking target URL because the control file is dedicated for an OS using American English. In this regard, if the control file is dedicated to a Japanese OS, a Japanese language ID "LANG=0411" is set.

Meanwhile, a user support page and a software downloading page of a web site operated within Japan may be generally provided in two different languages, namely, Japanese and English (American English), for example. In this regard, the present exemplary embodiment displays an appropriate page by displaying an English page if the language ID "0409" is set while displaying a Japanese page if the language ID "0411" is set.

If only a Japanese page is provided in a web site operated within Japan and if the language ID "0409" has been set, the web server 9 disregards the language ID. Accordingly, the page provided in compliance with Japanese (language ID "0411") is displayed.

The second element "<dm: keywordInRegistry>" includes a description of control executed when the setup application 129 sets the following registry key and registry information, which corresponds to the above-described case 4.

(Registry Key):
HKEY_LOCAL_MACHINE¥SOFTWARE¥ABC¥Setup¥Kmmn
(Registry Information):
CD_Name REG_SZ USA_CD The above-described registry key and registry information includes a description for displaying a support button for the United States 150 (FIG. 58) and a download button for the United States 151 (FIG. 58) on a screen provided by the management application when the model name is "Kmmn" and "CD_Name" is "USA_CD".

Figure 57A:
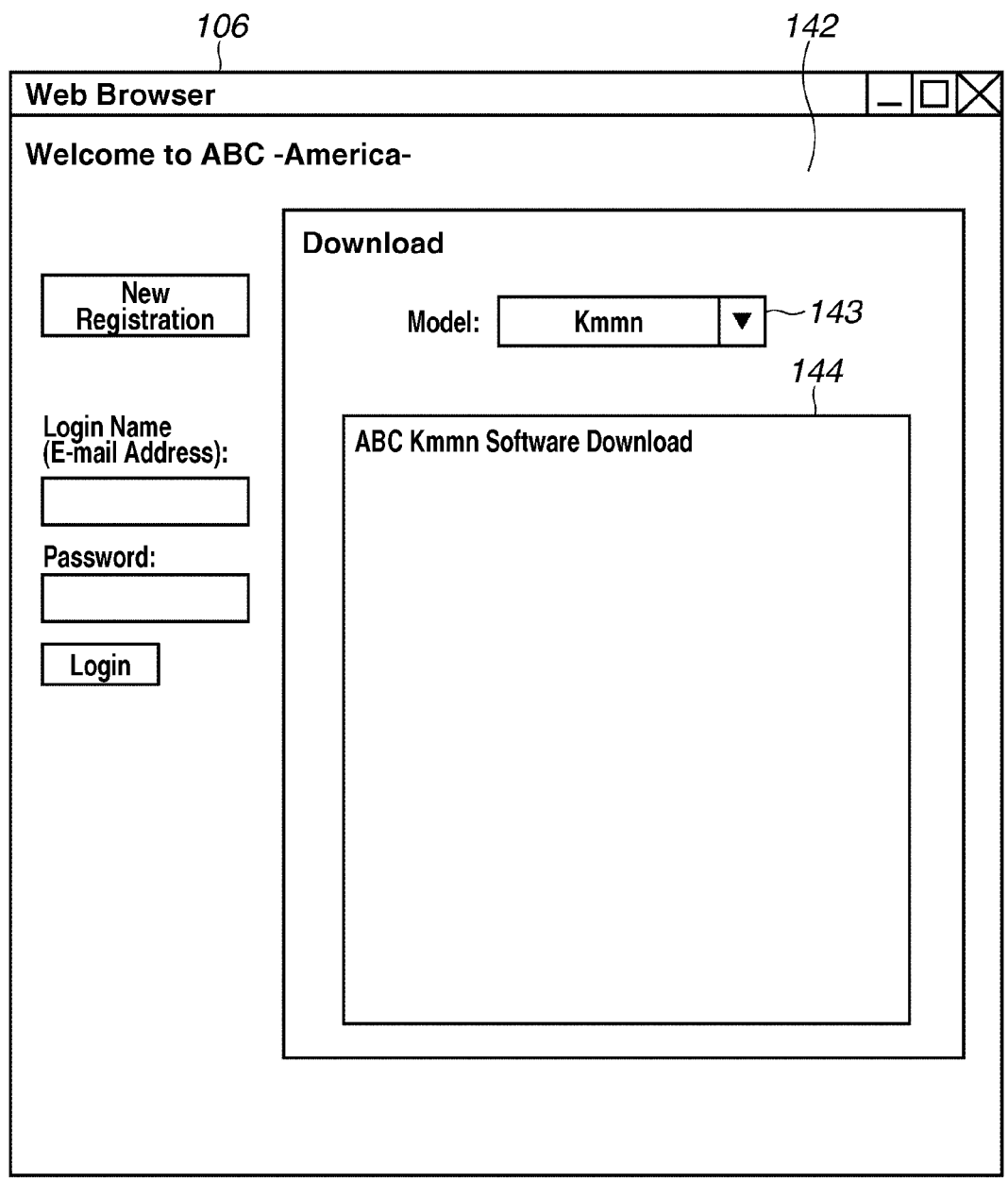
FIGS. 57A and 57B each illustrate an example of a software downloading page displayed on the display unit by using the web browser according to the fourth exemplary embodiment of the present invention.
Figure 57B:
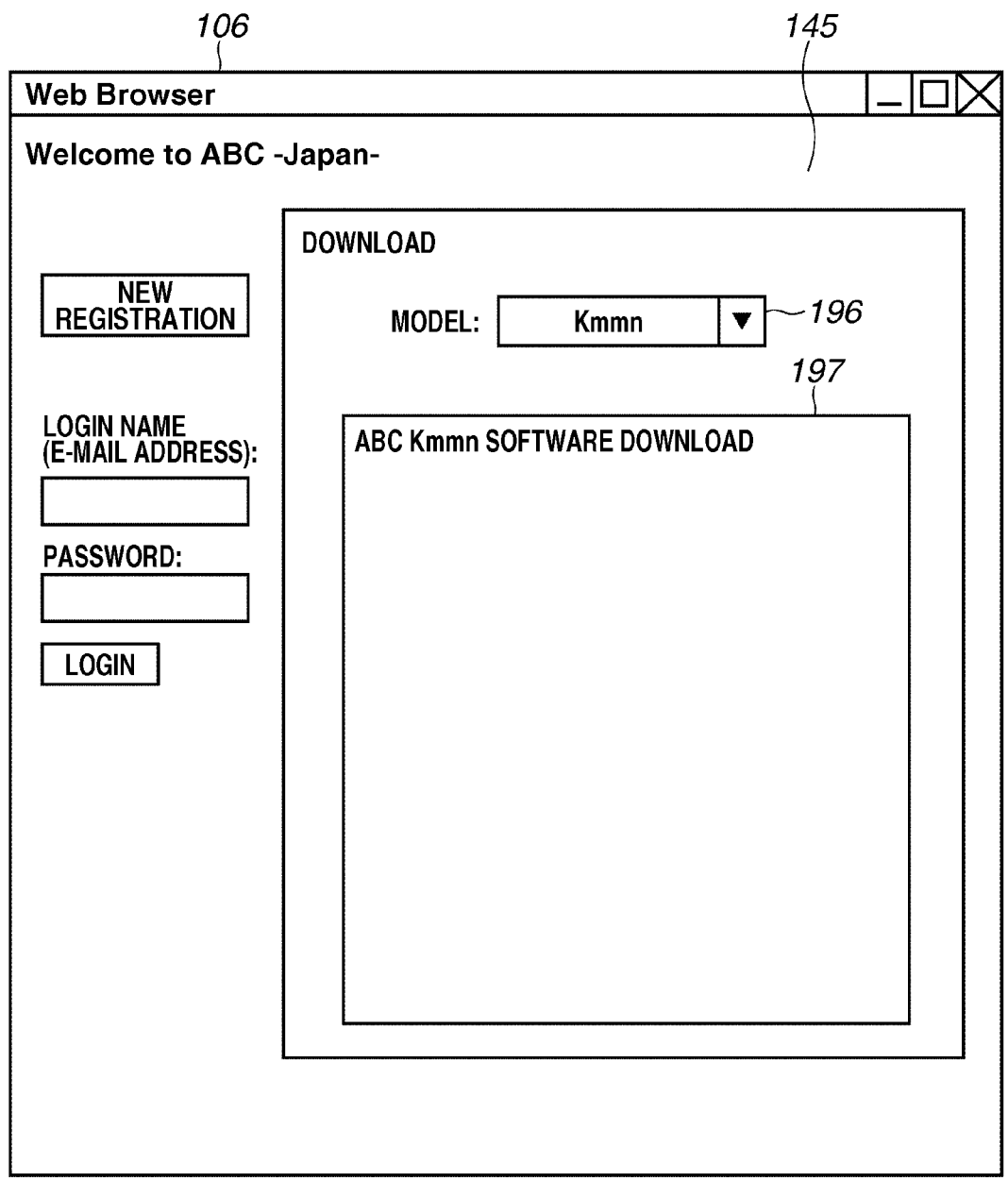

In addition, the above-described registry key and registry information includes a description about a function for linking to an American user support page 138 for Kmmn (FIG. 56A) and a function for linking to a software downloading page for American market 142 for Kmmn (FIG. 57A).

Similarly, the third and fourth elements "<dm:keywordInRegistry>" include a description about control executed when the setup application 129 has set the following registry key and registry information, which corresponds to the above-described case 4. More specifically, in such a case, the description describes control for verifying the model name and the "CD_Name" and displaying a support button 149 or 165 and a download button 163 or 168 for a corresponding country or area on a screen provided by the management application, which buttons are illustrated in FIGS. 68B and 68C, respectively. Furthermore, the description includes a function for linking to a user support page for each country or area for Kmmn (not illustrated) and a software downloading page for each country or area for Kmmn (not illustrated).

FIG. 48 illustrates an example of the content of a part of the control files 11 and 12 used in managing and controlling the printer according to the present exemplary embodiment. The control file includes information indicating the correspondence between the button displayed on the display unit 1205 as the function of the management application and the function of the button. The control file complies with an environment in which an American English OS is used.

Referring to the example shown in FIG. 48, an element "<dm:model>" describes the model names of a plurality of devices (printers) that can be managed by using the control file, namely, "Kmmn", "Deef", "Oppq", and "Rsst".

A negative flag "invert="true"" is set to a "<dm:keywordInRegistry>" element. The "<dm:keywordInRegistry>" element describes control executed in the above-described case 1, in which the registry key described by the setup application 129 includes none of the following registry keys.

---

(Registry key):

HKEY_LOCAL_MACHINE¥SOFTWARE¥ABC¥Setup¥Kmmn
HKEY_LOCAL_MACHINE¥SOFTWARE¥ABC¥Setup¥Deef
HKEY_LOCAL_MACHINE¥SOFTWARE¥ABC¥Setup¥Oppq
HKEY_LOCAL_MACHINE¥SOFTWARE¥ABC¥Setup¥Rsst

---

The registry keys include control for displaying each button defined in "selectSupportArea1_0409" (FIG. 49) and "selectDownloadArea1_0409" (FIG. 50) on a screen provided by the management application. Furthermore, the registry keys include a description about a function for linking to each page of the web site by a URL illustrated in FIG. 49 or FIG. 50.

The first element "<dm:function>" describes a function for displaying the support button 116 (FIG. 41) on the screen provided by the management application and changing the screen to a display screen of the management application illustrated in the example shown in FIG. 42. Similarly, the second element "<dm:function>" describes a function for displaying the download button 117 (FIG. 41) and the display and the function illustrated in the example shown in FIG. 43.

FIG. 49 illustrates an example of the content of a part of the control file according to the present exemplary embodiment. The control file includes information about the correspondence between the display executed according to the registry key and the function corresponding to the display. The control file complies with an environment in which an American English OS is used.

A "<dm:model>" element includes the model names of a plurality of devices (printers) that can be managed, namely, "Kmmn", "Deef", "Oppq", and "Rsst". A negative flag "invert="true"" is set to a "<dm:keywordInRegistry>" element. The elements describe control executed by the above-described case 1, in which none of the following registry keys is described by the setup application 129.

---

(Registry key):

HKEY_LOCAL_MACHINE¥SOFTWARE¥ABC¥Setup¥Kmmn
HKEY_LOCAL_MACHINE¥SOFTWARE¥ABC¥Setup¥Deef
HKEY_LOCAL_MACHINE¥SOFTWARE¥ABC¥Setup¥Oppq
HKEY_LOCAL_MACHINE¥SOFTWARE¥ABC¥Setup¥Rsst

---

Figure 70:
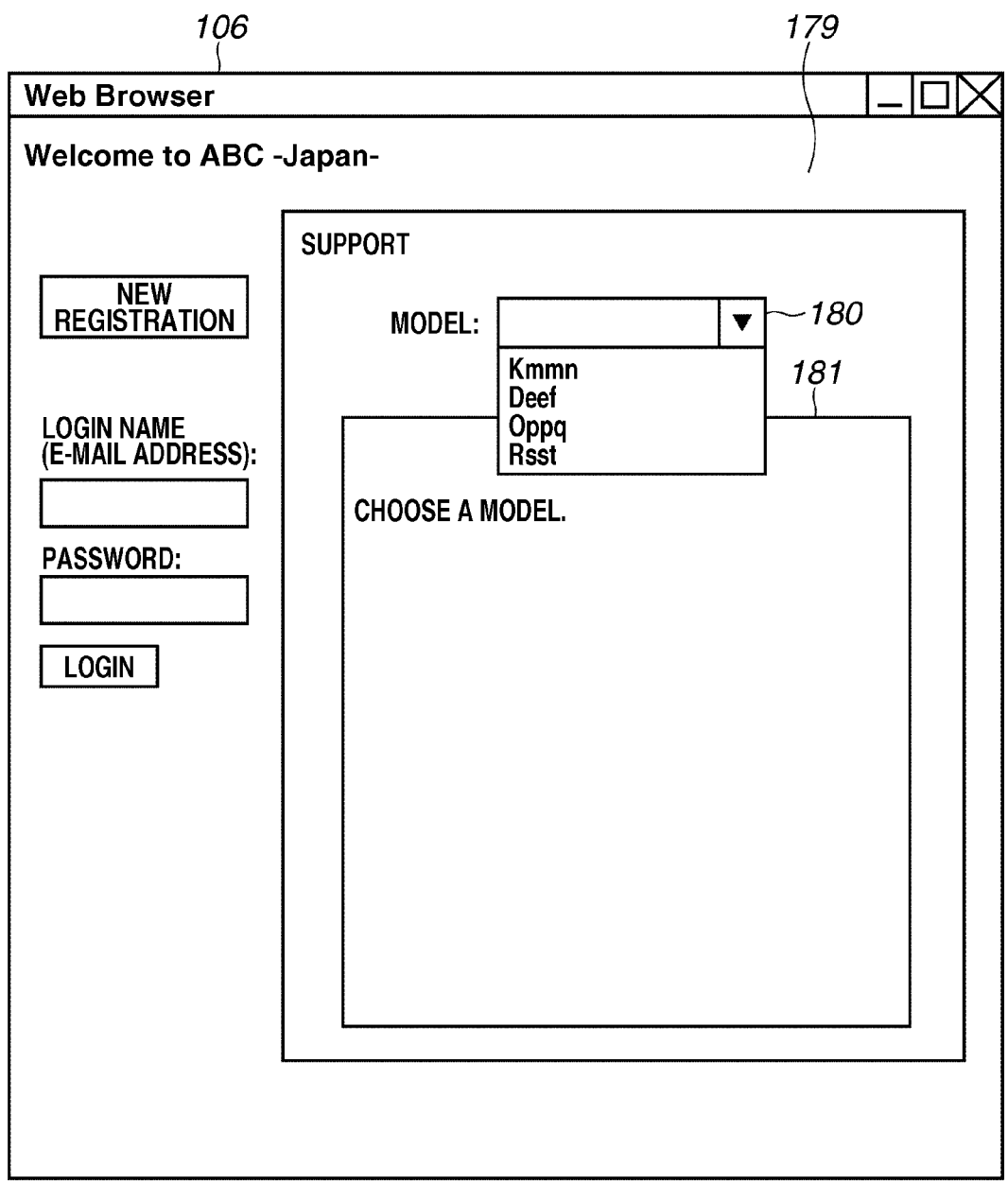
FIG. 70 illustrates an example of a user support page displayed on the display unit by using the web browser according to the fourth exemplary embodiment of the present invention.

The first element "<dm:function>" includes a description about a function for linking to the Japanese user support page 179 illustrated in the example shown in FIG. 70 and displaying the support button for Japan 118 illustrated in the example shown in FIG. 42 on the screen provided by the management application. Similarly, the second element "<dm:function>" includes a description of control for displaying the support button for America 119 illustrated in the example shown in FIG. 42 and linking to the user support page for the U.S. 152 illustrated in the example shown in FIG. 59.

The third and fourth elements "<dm:function>" include a function for displaying a support button for each country or area 120 or 121 illustrated in the example shown in FIG. 42 and linking to the user support page of each corresponding country or area (not illustrated).

FIG. 50 illustrates an example of the content of a part of the control files 11 and 12 according to the present exemplary embodiment. The control file includes information about the correspondence between the display according to the registry key and the function corresponding thereto. The control file complies with an American English OS.

A "<dm:model>" element includes the model names of a plurality of devices (printers) that can be managed by the control file, namely, "Kmmn", "Deef", "Oppq", and "Rsst". A negative flag "invert="true"" is set to a "<dm:keywordInRegistry>" element. The elements describe control executed by the above-described case 1, in which none of the following registry keys is described by the setup application 129.

---

(Registry key):

HKEY_LOCAL_MACHINE¥SOFTWARE¥ABC¥Setup¥Kmmn
HKEY_LOCAL_MACHINE¥SOFTWARE¥ABC¥Setup¥Deef
HKEY_LOCAL_MACHINE¥SOFTWARE¥ABC¥Setup¥Oppq
HKEY_LOCAL_MACHINE¥SOFTWARE¥ABC¥Setup¥Rsst

---

The first element "<dm:function>" describes a function for displaying the download button for Japanese market 122 (FIG. 43) on the screen provided by the management application and linking to a software downloading page for Japan (not illustrated). Similarly, the second, third, and fourth elements "<dm:function>" includes a description of a function for displaying a download button for each country or area 123, 124, or 125 illustrated in the example shown in FIG. 43 and linking to a software downloading page for the market of each country or area (not illustrated).

The content of the description continuously illustrated in the examples shown in FIGS. 51 and 52 indicates the content of a part of the control file. The control file includes information indicating the correspondence between the button displayed on the display unit 1205 according to the registry key as the function of the management application and the function of the button. The control file is provided in compliance with an American English OS.

Referring to the examples shown in FIGS. 51 and 52, a "<dm:model>" element includes the model names of a plurality of devices (printers) that can be managed by using the control file, namely, "Kmmn", "Deef", "Oppq", and "Rsst".

The first element "<dm:keywordInRegistry>" includes a description of control executed when the printer driver 50 or the language monitor 36 has set the following registry key and registry information, which corresponds to the above-described case 4.

(Registry Key):
HKEY_LOCAL_MACHINE¥SOFTWARE¥ABC¥Device¥Kmmn¥Kmmn¥LOC:JPN

The registry key includes a description for displaying the support button for Japan 136 (FIG. 68A) and the download button 137 for Japan 137 (FIG. 68A) on the screen provided by the management application if the model name of the device is "Kmmn" and the destination ("LOC:") is JPN.

Furthermore, the registry key includes a description of a function for linking to the Japanese user support page 141 for "Kmmn" illustrated in the example shown in FIG. 56B and to the software downloading page for Japan 145 illustrated in the example shown in FIG. 57B for "Kmmn". With respect to parameter control of the link target URL, the control described above with reference to the examples shown in FIGS. 46 and 47 is executed.

The second element "<dm:keywordInRegistry>" includes a description of control executed when the printer driver 50 or the language monitor 36 has set the following registry key and the registry information, which corresponds to the above-described case 4.

(Registry Key):
HKEY_LOCAL_MACHINE¥SOFTWARE¥ABC¥Device¥Kmmn¥LOC:USA

The registry key includes a description of control for displaying the support button for America 150 (FIG. 58) and the download button for America 151 (FIG. 58) on the screen provided by the management application if the model name of the device is "Kmmn" and the destination ("LOC:") is "USA".

Furthermore, the registry key includes a description of a function for linking to the user support page for the U.S. 138 for "Kmmn" (FIG. 56A) and the software downloading page for the U.S. 142 for "Kmmn" (FIG. 57A). The third element "<dm:keywordInRegistry>" includes a description of control executed when the printer driver 50 or the language monitor 36 has set the following registry key and the registry information, which corresponds to the above-described case 4.

(Registry Key):
HKEY_LOCAL_MACHINE¥SOFTWARE¥ABC¥Device¥Kmmn¥LOC:FRA

The registry key includes a description of control for displaying the support button for France 170 (FIG. 68D) and the download button for France 171 (FIG. 68D) on the screen provided by the management application if the model name is "Kmmn" and the destination ("LOC:") is "FRA".

Furthermore, the registry key includes a description of a function for linking to the user support page for France for "Kmmn" (not illustrated) and to the software downloading page for France for "Kmmn" (not illustrated) if the model name is "Kmmn" and the destination ("LOC:") is "FRA".

As described above, the display content and the function may differ from those of the case where the information described by the setup application 129 is used because the present exemplary embodiment uses the information acquired from the device (the printer 6). Accordingly, it is useful if the control file is provided that implements an appropriate display and function according to a result of comparison as to the specification of the setup application 129 and the device. Furthermore, it is also useful if a description is previously included in the control file, which indicates which information of the above-described different information stored as registry information is to be used according to the characteristic of the information.

The fourth element "<dm:keywordInRegistry>" includes a description of control executed when the printer driver 50 or the language monitor 36 has set the following registry key and the registry information, which corresponds to the above-described case 4.

(Registry Key):
HKEY_LOCAL_MACHINE¥SOFTWARE¥ABC¥Device¥Kmmn¥LOC:"KOR"

The registry key includes a description of control for displaying the support button for Korea 173 (FIG. 68E) and the download button for Korea 174 (FIG. 68E) on the screen provided by the management application if the model name is "Kmmn" and the destination ("LOC:") is "KOR".

Furthermore, the registry key includes a description of a function for linking to the user support page for Korea for "Kmmn" (not illustrated) and the software downloading page for Korea for "Kmmn" (not illustrated) if the model name is "Kmmn" and the destination ("LOC:") is "KOR". The display and function executed here differ from those in the case of using the information described by the setup application 129.

FIG. 53 illustrates an example of the content of a part of the control files 11 and 12 according to the present exemplary embodiment. The control file includes information about the correspondence between the display executed according to the registry key and the function corresponding thereto. The control file is provided in compliance with an American English Os.

A "<dm:model>" element includes the model names of a plurality of devices (printers) that can be managed, namely, "Kmmn", "Deef", "Oppq", and "Rsst". A description about a negative flag "invert="true"" is set to a "<dm:keywordInRegistry>" element. The elements describes control executed in the above-described case 1, in which none of the following registry keys described by the printer driver 50 or the language monitor 36 is set.

| (Registry key): |
| --- |
| HKEY_LOCAL_MACHINE¥SOFTWARE¥ABC¥Device¥Kmmn |
| HKEY_LOCAL_MACHINE¥SOFTWARE¥ABC¥Device¥Deef |
| HKEY_LOCAL_MACHINE¥SOFTWARE¥ABC¥Device¥Oppq |
| HKEY_LOCAL_MACHINE¥SOFTWARE¥ABC¥Device¥Rsst |

The registry key includes a description of control for displaying each button defined by selectSupportArea2_0409 (FIG. 54) and selectDownloadArea2_0409 (FIG. 55) on the screen provided by the management application. Furthermore, the registry key includes a description of a function for linking to each the page of the web site by the URL illustrated in FIGS. 54 and 55.

The first element "<dm:function>" describes a function for displaying the support button 116 (FIG. 41) and a function for shifting to a display screen (FIG. 71) of the management application. Similarly, the second element "<dm:function>" describes a function for displaying the download button 117 (FIG. 41) and a function for shifting to a display screen (FIG. 72) of the management application.

FIG. 54 illustrates an example of the content of a part of the control files 11 and 12 according to the present exemplary embodiment. The control file includes information about the correspondence between the display according to the registry key and the function corresponding thereto. The control file is provided in compliance with an American English OS.

Referring to the example shown in FIG. 54, a "<dm:model>" element includes the model names of a plurality of devices (printers) that can be managed by the control file, namely, "Kmmn", "Deef", "Oppq", and "Rsst". A negative flag "invert="true"" is set to a "<dm:keywordInRegistry>"

element. The element includes a description of control executed in the above-described case 1, in which none of the following registry keys described by the printer driver 50 or the language monitor 36 is set.

---
(Registry key):

HKEY_LOCAL_MACHINE¥SOFTWARE¥ABC¥Device¥Kmmn
HKEY_LOCAL_MACHINE¥SOFTWARE¥ABC¥Device¥Deef
HKEY_LOCAL_MACHINE¥SOFTWARE¥ABC¥Device¥Oppq
HKEY_LOCAL_MACHINE¥SOFTWARE¥ABC¥Device¥Rsst
---

Figure 59:
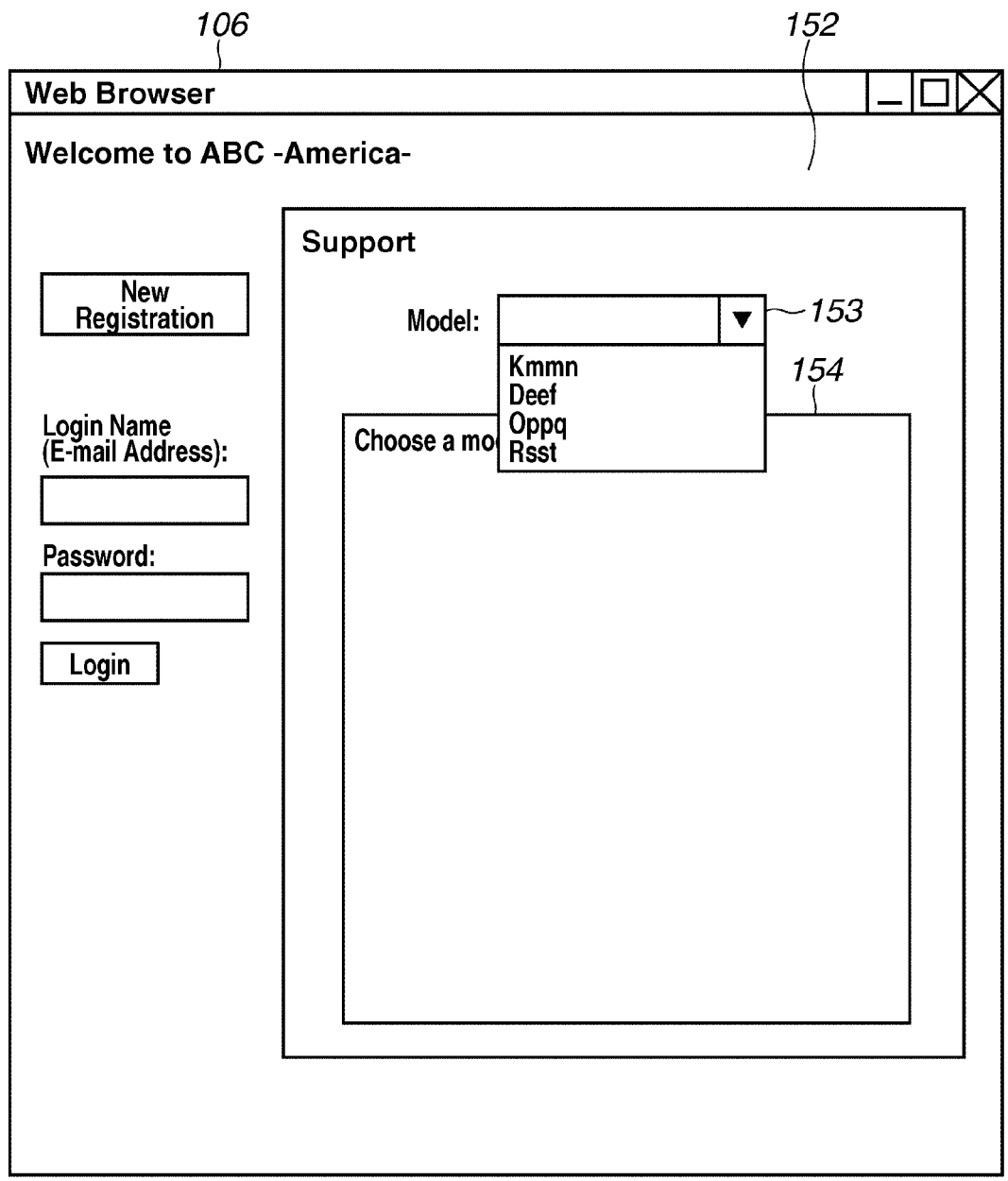
FIG. 59 illustrates an example of a user support page displayed on the display unit by using the web browser according to the fourth exemplary embodiment of the present invention.

The first element "<dm:function>" describes a function for displaying a support button for Japan 184 (FIG. 71) and a function for linking to the Japanese user support page 179 (FIG. 70) on the screen provided by the management application. Similarly, the second element "<dm:function>" describes a function for displaying a support button for America 185 (FIG. 71) and a function for linking to the user support page for the U.S. 152 (FIG. 59).

Similarly, the third and fourth elements "<dm:function>" include a description of a function for displaying a support button 186 or 187 for each corresponding country or area (FIG. 71) and a function for linking to a user support page of each corresponding country or area (not illustrated).

FIG. 55 illustrates an example of the content of a part of the control files 11 and 12 according to the present exemplary embodiment. The control file includes information about the correspondence between the display according to the registry key and the function corresponding thereto. The control file is provided in compliance with an American English OS.

Referring to the example shown in FIG. 55, a "<dm:model>" element describes the model names of a plurality of devices (printers) that can be managed by using the control file, namely, "Kmmn", "Deef", "Oppq", and "Rsst". A negative flag "invert="true"" is set to a "<dm:keywordInRegistry>" element. The element describes control executed in the above-described case 1, in which none of the following registry keys described by the printer driver 50 or the language monitor 36 is set.

---
(Registry key):

HKEY_LOCAL_MACHINE¥SOFTWARE¥ABC¥Device¥Kmmn
HKEY_LOCAL_MACHINE¥SOFTWARE¥ABC¥Device¥Deef
HKEY_LOCAL_MACHINE¥SOFTWARE¥ABC¥Device¥Oppq
HKEY_LOCAL_MACHINE¥SOFTWARE¥ABC¥Device¥Rsst
---

The first element "<dm:function>" describes a function for displaying a download button for Japan 190 (FIG. 72) on the screen provided by the management application and a function for linking to a software downloading page for Japan (not illustrated). Similarly, the second, third, and fourth elements "<dm:function>" describe a function for displaying a download button for each country or area 191, 192, or 193 (FIG. 72) and a function for linking to a software downloading page for each corresponding country or area (not illustrated).

FIGS. 56A and 56B each illustrate an example of a user support page displayed on the display unit 1205 by using the web browser according to the present exemplary embodiment. Referring to the example shown in FIG. 56A, the user support page for the U.S. 138 describes information about the user support for the device such as frequently asked questions (FAQ) of the device of ABC Corporation. A model name selection field 139 displays a list of the model names of the device ("Kmmn", "Deef", "Oppq", and "Rsst"). The user can select a desired model name from among those included in the list. In the example illustrated in FIG. 56A, the model name "Kmmn" has been selected, for example.

A user support information display field 140 displays, in American English, information about the user support such as a FAQ of the device selected by the model name selection field 139. If none of the model name has been selected by the model name selection field 139, the user support information display field 140 displays a message prompting the user to select a model name.

Referring to the example shown in FIG. 56B, a Japanese user support page 141 describes information about the user support for the device such as a FAQ of the device of ABC Corporation. A model name selection field 194 displays a list of the model names of the device ("Kmmn", "Deef", "Oppq", and "Rsst"). The user can select a desired model name from among those included in the list. In the example illustrated in FIG. 56B, the model name "Kmmn" has been selected, for example.

The display content in the example in FIG. 56B is basically the same as that in the example in FIG. 56A. More specifically, a user support information display field 195 displays, in Japanese, various information about the device selected in the model name selection field 194.

FIGS. 57A and 57B each illustrate an example of a software downloading page displayed on the display unit 1205 by using the web browser according to the present exemplary embodiment. Referring to the example shown in FIG. 57A, the software downloading page for the U.S. 142 describes information about software of the device of ABC Corporation. The user can download the software via the software downloading page for the U.S. 142.

A model name selection field 143 displays a list of the model names of the device ("Kmmn", "Deef", "Oppq", and "Rsst"). The user can select a desired model name from among those included in the list. In the example illustrated in FIG. 57A, the model name "Kmmn" has been selected, for example. A software download information display field 144 describes, in American English, information about software of the device selected in the model name selection field 143. The user can download the software by referring to the information described in the software download information display field 144. If no model name has been selected in the model name selection field 143, the software download information display field 144 displays a message prompting the user to select a model.

Referring to the example shown in FIG. 57B, a software downloading page for Japan 145 describes information about software of the device of ABC Corporation. The user can download the software according to the displayed information. A model name selection field 196 displays a list of the model names of the device ("Kmmn", "Deef", "Oppq", and "Rsst"). The user can select a desired model name from among those included in the list. In the example illustrated in FIG. 57B, the model name "Kmmn" has been selected, for example.

The display content in the example illustrated in FIG. 57B is basically the same as that in the example illustrated in FIG. 57A. More specifically, a software download information display field 197 displays, in Japanese, various information about the device selected in the model name selection field 196. The user can download the software according to the displayed information.

Figure 60:
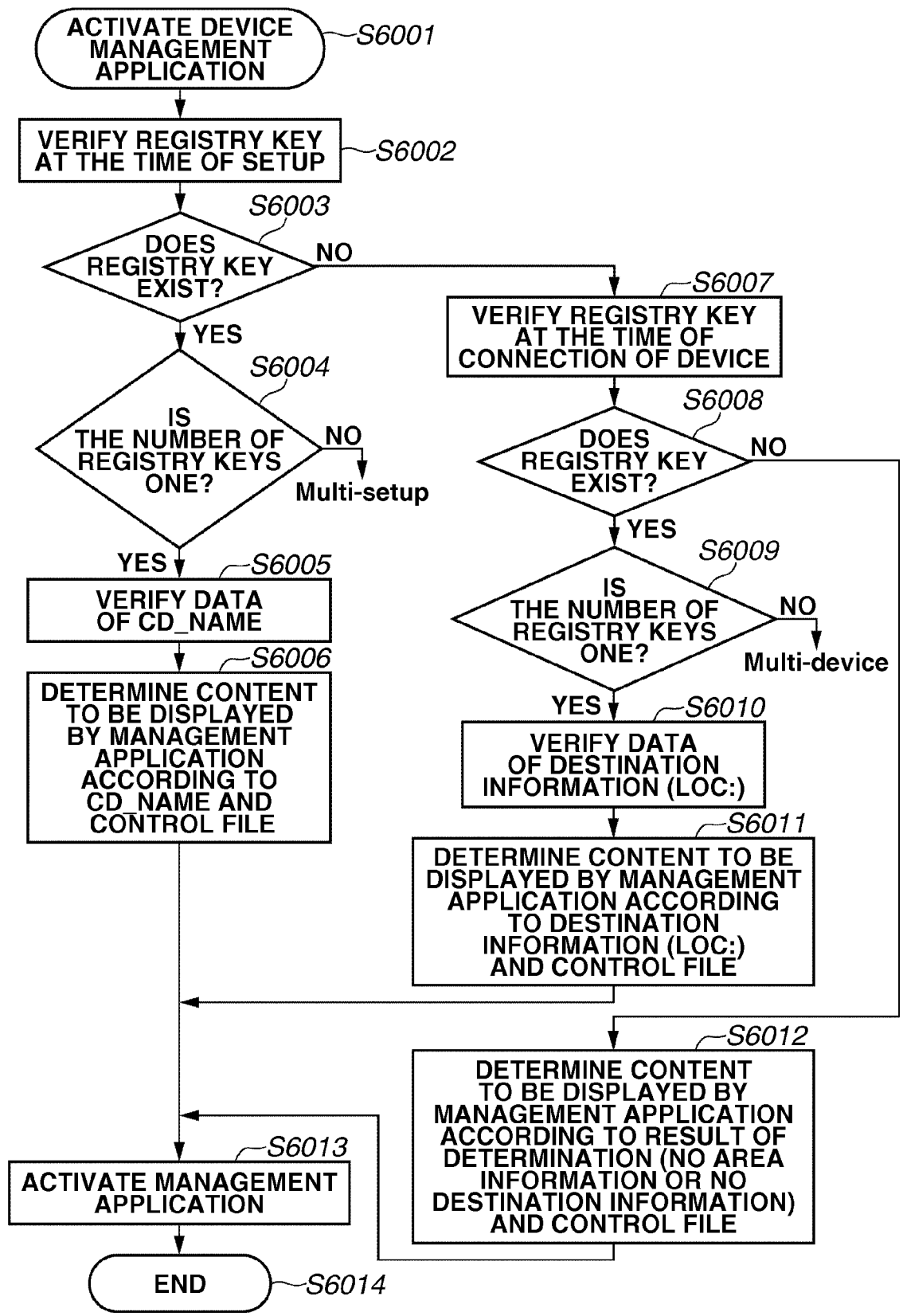
FIG. 60 is a flow chart illustrating exemplary processing executed by a PC for activating the management application according to the fourth exemplary embodiment of the present invention.

FIG. 60 is a flow chart illustrating exemplary processing executed by the PC for activating the management application according to the present exemplary embodiment. When the OS instructs the execution of the management application activation processing in step S1309 in the example shown in FIG. 13, the CPU of the PC starts the management application activation processing in step S6001.

In step S6002, the management application refers to and verifies the registry key generated while setting up the driver by utilizing the setup application 129 (FIG. 44). In step S6003, the OS determines whether the registry key generated during the setup by the setup application 129 exists. If it is determined that the registry key exists (YES in step S6003), then the processing advances to step S6004. On the other hand, if it is determined that no registry key exists (NO in step S6003), then the processing advances to step S6007.

Figure 61:
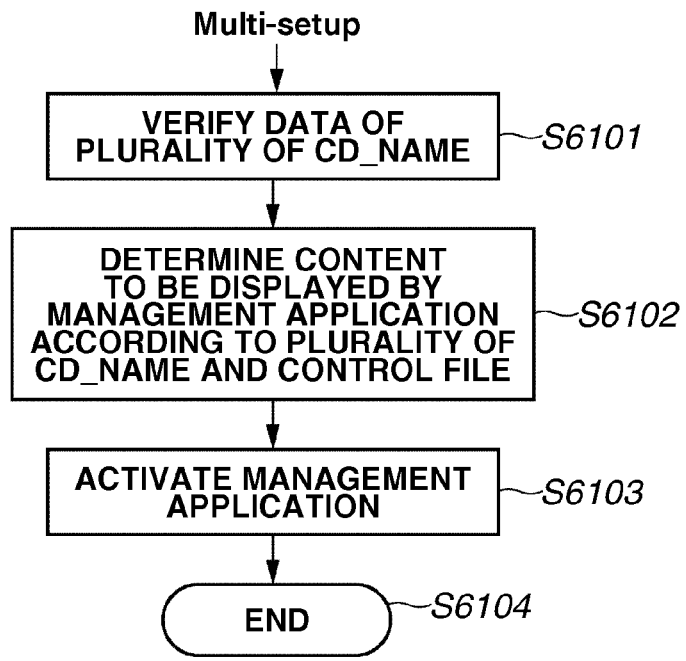
FIG. 61 is a flow chart illustrating exemplary processing executed by a PC for activating the management application according to the fourth exemplary embodiment of the present invention.

In step S6004, the OS determines whether the number of registry keys to be stored is one. If it is determined that the number of registry keys to be stored is one (YES in step S6004), then the processing advances to step S6005. On the other hand, if it is determined that the number of registry keys is two or greater (NO in step S6004), then the processing advances to step S6101 (FIG. 61).

In step S6005, the OS refers to the information set to "CD_Name". In step S6006, the OS determines the content to be displayed by the management application according to the information set to "CD_Name" and the control file stored in step S1405 (FIG. 14).

In step S6007, the OS refers to the registry key (FIG. 45) described by the printer driver 50 or the language monitor 36. In step S6008, the OS determines whether any registry key that has been described by the printer driver 50 or the language monitor 36 exists. If it is determined that any registry key that has been described by the printer driver 50 or the language monitor 36 exists (YES in step S6008), then the processing advances to step S6009. On the other hand, if it is determined that no such registry key exists (NO in step S6008), then the processing advances to step S6012.

Figure 62:
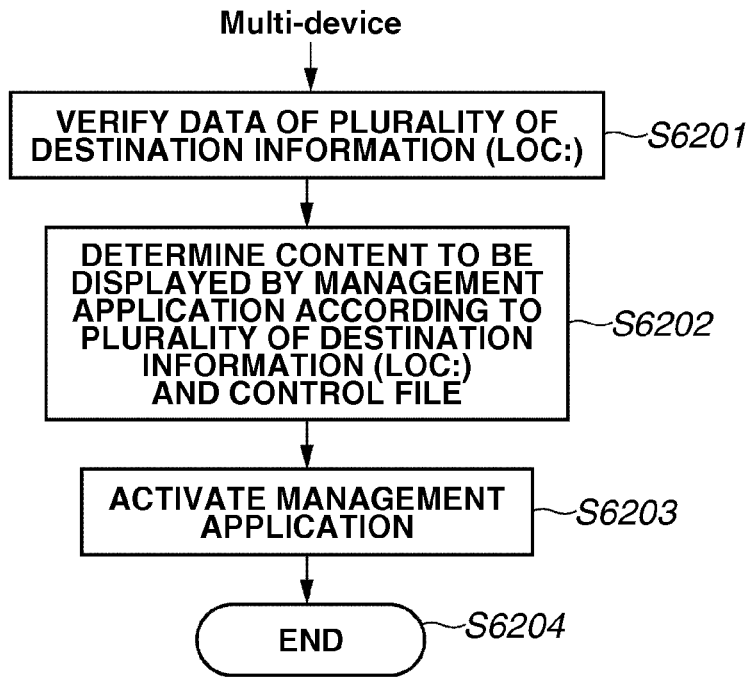
FIG. 62 is a flow chart illustrating exemplary processing executed by a PC for activating the management application according to the fourth exemplary embodiment of the present invention.

In step S6009, the OS determines whether the number of registry keys to be stored is one. If it is determined that the number of registry keys is one (YES in step S6009), then the processing advances to step S6010. On the other hand, if it is determined that the number of registry keys is two or greater (NO in step S6009), then the processing advances to step (FIG. 62).

In step S6010, the OS refers to the information set to the destination information ("LOC:") in the registry key.

In step S6011, the OS determines the content to be displayed by the management application according to the information set to the destination information ("LOC:") and the control file stored in step S1405 (FIG. 14).

In step S6012, the OS determines the content to be displayed by the management application according to the result indicating that no area information or destination information exists and the control file stored in step S1405 (FIG. 14).

In step S6013, the OS executes control for displaying the display content determined in either of steps S6006, S6011, and S6012 as the display executed during activation of the management application. Then, the management application activation processing ends in step S6014.

FIG. 61 is a flow chart illustrating exemplary processing executed by a PC for activating the management application according to the present exemplary embodiment. If the number of registry keys is two or greater in step S6004 (FIG. 60), then the processing advances to step S6101 and the processing in the flow chart in the example shown in FIG. 61 starts.

Referring to the example shown in FIG. 61, in step S6101, the management application refers to the information set to a plurality of descriptions "CD_Name".

In step S6102, the OS determines the content to be displayed according to the data set to a plurality of descriptions "CD_Name" and the control file stored in step S1405 (FIG. 14).

In step S6103, the OS executes control for displaying the display content determined in step S6102 as the display executed during the management application activation processing. Then, the management application activation processing ends in step S6104.

FIG. 62 is a flow chart illustrating exemplary processing executed by the PC for activating the management application according to the present exemplary embodiment. If it is determined that the number of registry keys is two or greater in step S6009 (FIG. 60), then the processing advances to step S6201 and the processing in the flow chart in the example shown in FIG. 62 starts.

Referring to the example shown in FIG. 62, in step S6201, the management application refers to information set to a plurality of pieces of destination information ("LOC:"). In step S6202, the OS determines the content to be displayed by the management application according to the information set to the plurality of pieces of destination information ("LOC:") and the control file stored in step S1405 (FIG. 14).

In step S6203, the OS executes control for displaying the display content determined in step S6202 on the display unit 1205 as the display executed when the management application 80 is activated. In step S6204, the management application activation processing ends.

In the present exemplary embodiment, the registry key and the registry information set by the setup application 129 are utilized in priority to the information about the registry key set by the printer driver 50 or the language monitor 36. With the above-described configuration, the present exemplary embodiment can more appropriately apply the user's desire and improve the user operability with respect to the display and the function provided by the management application because the registry key and the registry information set by the setup application 129 are selected according to the user's desire.

Figure 58:
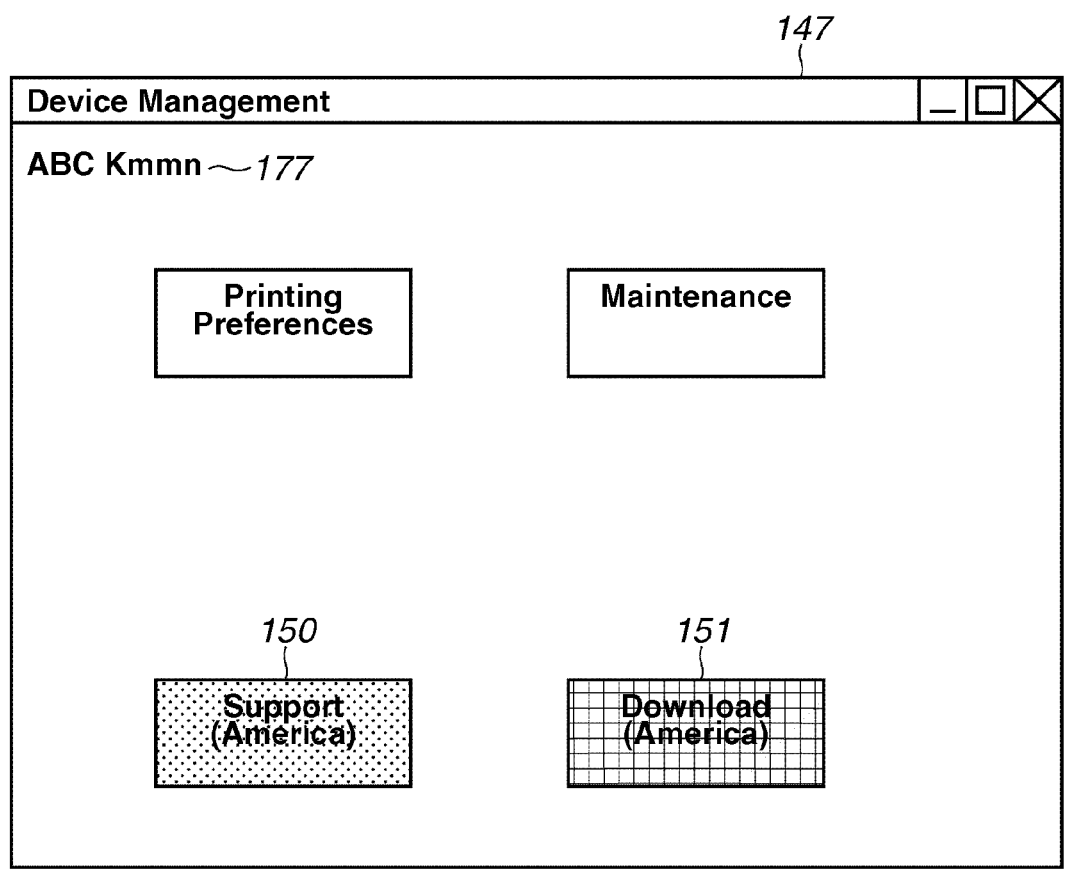
FIG. 58 illustrates an example of a screen displayed on a display unit as a function of a management application according to the fourth exemplary embodiment of the present invention.

FIG. 58 illustrates an example of a display screen 147 provided by the management application and displayed on the display unit 1205 according to the present exemplary embodiment. The user can input an instruction for utilizing the function of the management application via the display screen 147 to manage the printer 5. Referring to the example shown in FIG. 58, a printer name display field 177 displays the printer name of the printer corresponding to the printer icon 110. The support button for America 150 can be operated by the user to issue an instruction for shifting to a screen that provides the user support. The download button for America 151 can be operated by the user to issue an instruction for shifting to a screen that provides the software download function. The support button for America 150 and the download button for America 151 are displayed as icons mutually different in their color and shape to clearly indicate that they offer different services.

FIG. 59 illustrates an example of a user support page display screen displayed on the display unit 1205 by using the web browser 106 according to the present exemplary embodiment. Referring to the example shown in FIG. 59, the user support page for the U.S. 152 describes information about the user support for the device such as a FAQ of the device of ABC Corporation. A model name selection field 153 displays a list of the model names of the device ("Kmmn", "Deef", "Oppq", and "Rsst"). The user can select a desired model name from among those included in the list. In the example illustrated in FIG. 59, no model name has been selected and the mere list of model names is displayed.

A user support information display field 154 displays, in American English, information about the user support such as a FAQ of the device selected by the model name selection field 153. If no model name has been selected by the model name selection field 153, the user support information display field 154 displays a message prompting the user to select a model name.

Figure 63:
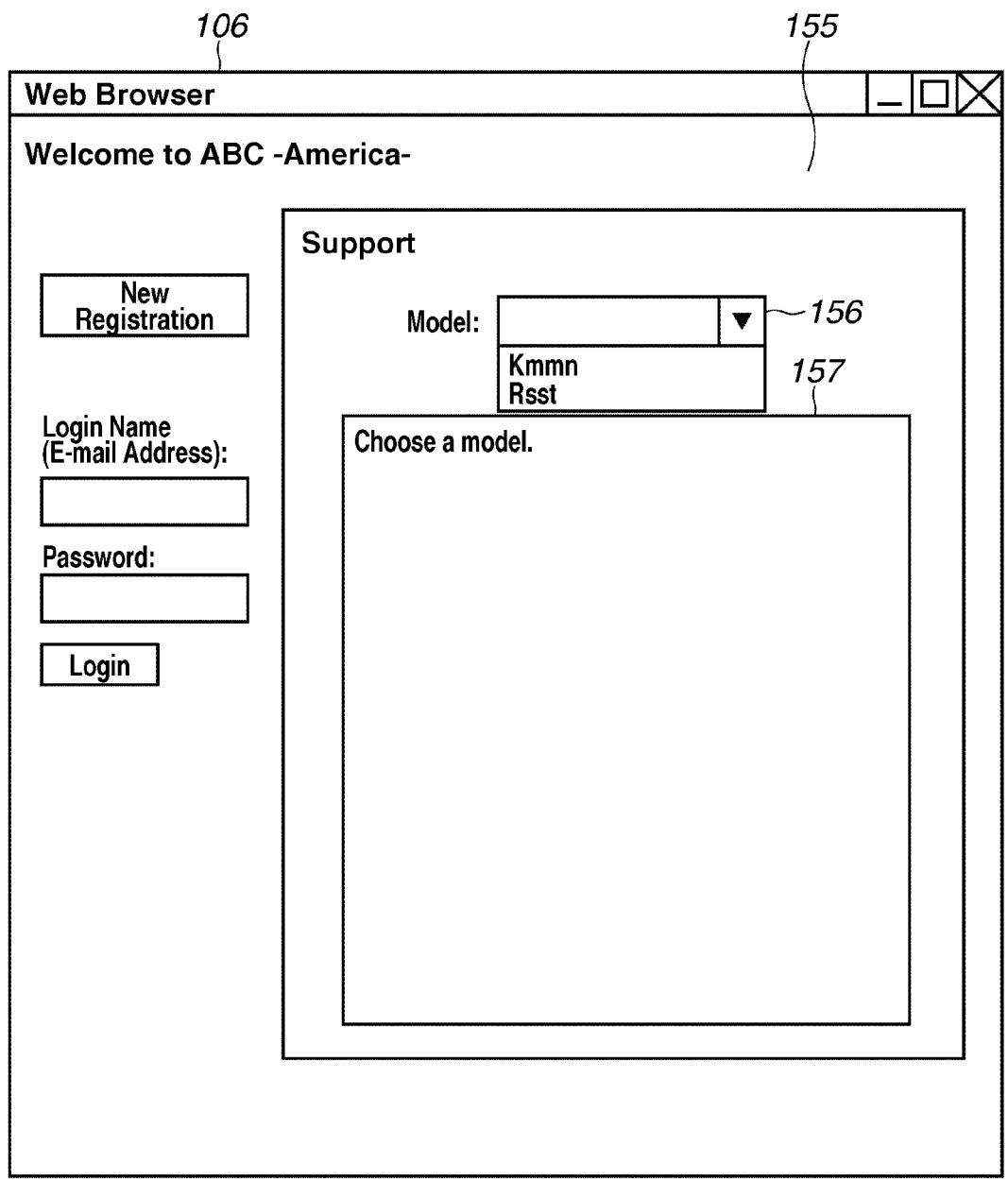
FIG. 63 illustrates an example of a user support page displayed on the display unit by using the web browser according to the fourth exemplary embodiment of the present invention.

FIG. 63 illustrates an example of a user support page display screen displayed on the display unit 1205 by using the web browser 106 according to the present exemplary embodiment. Referring to the example shown in FIG. 63, a user support page for the U.S. 155 describes information about the user support for the device such as a FAQ of the device of ABC Corporation. A model name selection field 156 displays a list of the model names of the device ("Kmmn", "Deef", "Oppq", and "Rsst"). The user can select a desired model name from among those included in the list. In the example illustrated in FIG. 63, no model name has been selected and the mere list of model names is displayed.

A user support information display field 157 displays, in American English, information about the user support such as a FAQ of the device selected by the model name selection field 153.

Figure 64:
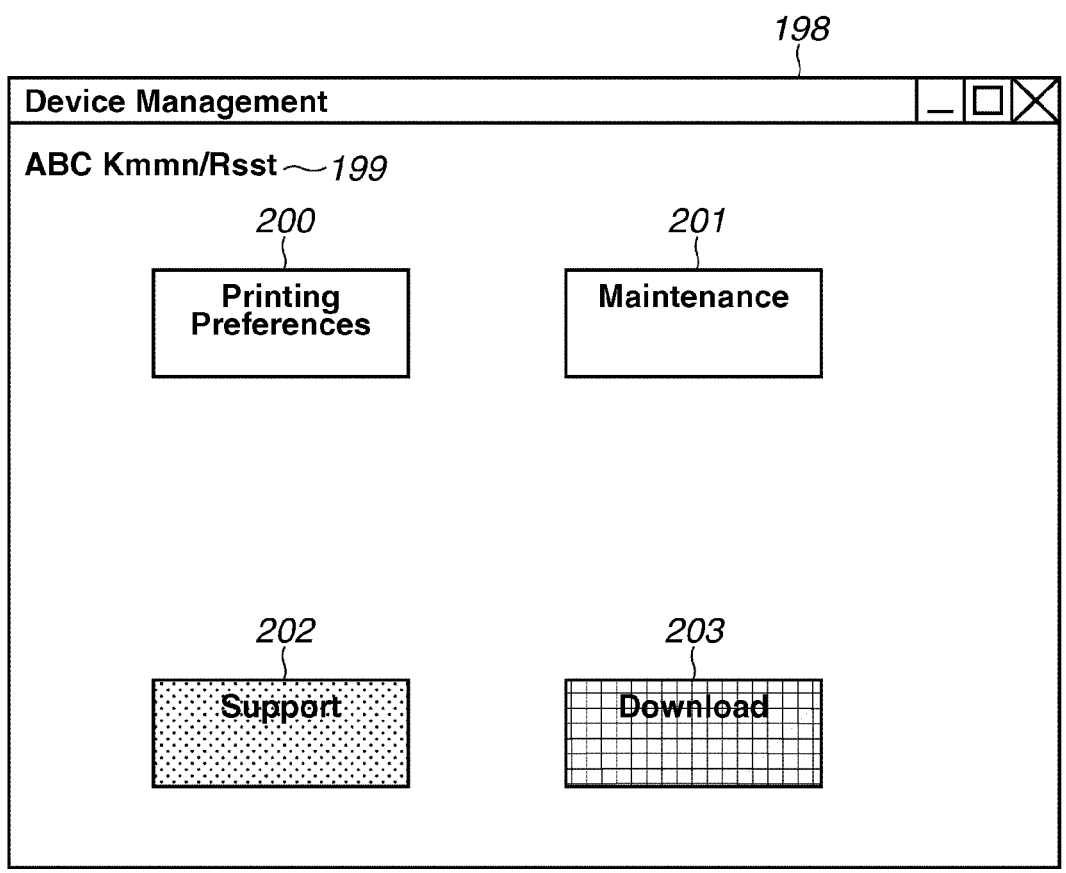
FIG. 64 illustrates an example of a screen displayed on a display unit as a function of a management application according to the fourth exemplary embodiment of the present invention.

FIG. 64 illustrates an example of a display screen 198 displayed on the display unit 1205 provided by the management application according to the present exemplary embodiment. The user can input an instruction for utilizing the function of the management application via the display screen 198 to manage the printer 5. Referring to the example shown in FIG. 64, a printer name display field 199 displays the printer name of the printer. In the example illustrated in FIG. 64, the printer has not been identified, for example. Accordingly, all of the model names of the printer that is the target of support by the management application are displayed.

When the user presses a printing preferences setting button 200, a printing preferences setting dialog is displayed. The user can perform various print settings necessary for printing by the printer via the printing preferences setting button 200. When the user presses a maintenance button 201, a maintenance dialog is displayed. The user can perform various operations necessary for the maintenance of the printer via the maintenance button 201.

A support button 202 can be operated by the user to issue an instruction for shifting to a screen displaying a user support page. A download button 203 can be operated by the user to issue an instruction for shifting to a screen displaying a software downloading page. The support button for America 150 and the download button for America 151 are displayed as icons mutually different in their color and shape to clearly indicate that they offer different services. The processing executed when the support button 202 and the download button 203 will be described in detail later below.

Figure 65:
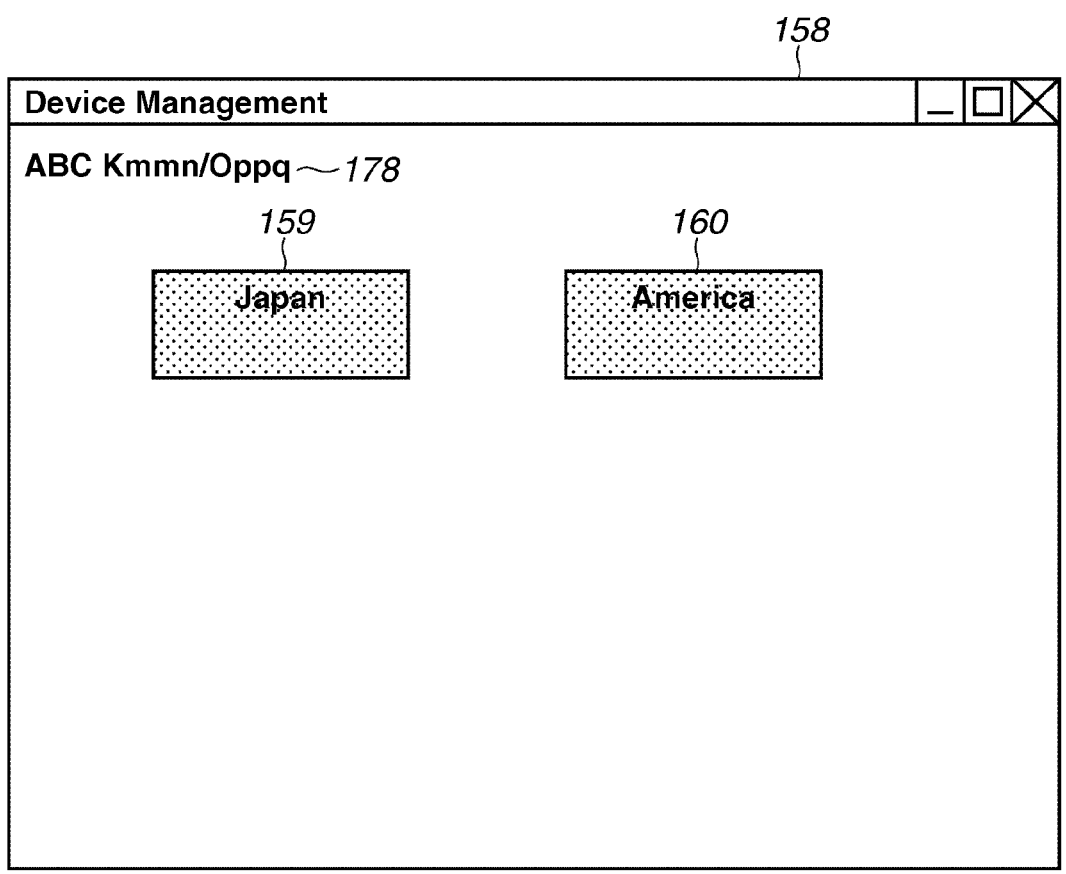
FIG. 65 illustrates an example of a screen displayed on a display unit as a function of a management application according to the fourth exemplary embodiment of the present invention.

FIG. 65 illustrates an example of a display screen 158 displayed on the display unit 1205 provided by the management application according to the present exemplary embodiment. The user can input an instruction for utilizing the function of the management application via the display screen 158 to manage the printer 5. The display screen 158 may be displayed when the user presses the support button 202 (FIG. 64).

Referring to the example shown in FIG. 65, a printer name display field 178 displays the printer name. In the example illustrated in FIG. 65, the printer has not been identified, for example. Accordingly, all of the model names of the printer that is the target of support by the management application are displayed.

When the user presses a support button for Japan 159, "Japan" is set as the area information. Then, a user support page of the web site for the Japanese market is displayed on the web browser 106. Similarly, when the user presses a support button for America 160, the user support page 155 of the web site for the U.S. market (FIG. 63) is displayed on the web browser 106.

Even if area information has not been identified as described above, if the area information can be at least narrowed down to specific areas, the present exemplary embodiment displays information about the areas extracted as a result of the narrow-down. Thus, the present exemplary embodiment can more effectively improve user operability.

In the present exemplary embodiment, both the support button for Japan 159 and the support button for America 160 are displayed as an icon having the color and shape the same as that of the support button 202. Accordingly, the user can visually and easily recognize that the user can access the user support page of the web site corresponding to the country or area that the user has selected. Thus, the present exemplary embodiment can improve user operability.

Figure 66:
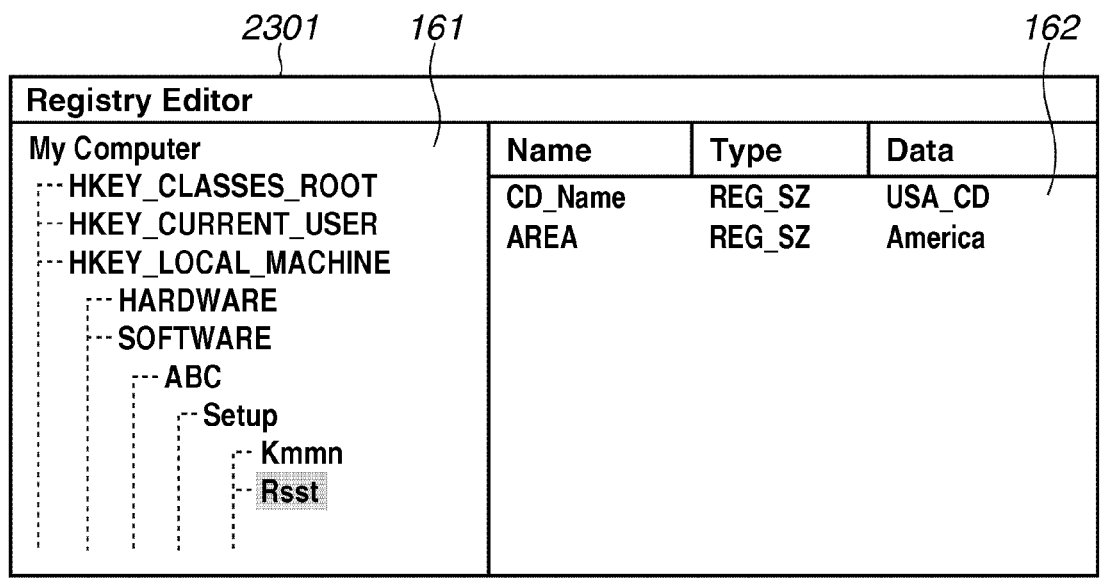
FIG. 66 illustrates an example of information described in the registry of a PC according to the fourth exemplary embodiment of the present invention.

FIG. 66 illustrates an example of information described in the registry of the PC 1 according to the present exemplary embodiment. Referring to FIG. 66, a display field 161 displays the tree structure of the registry. In the example illustrated in FIG. 66, a registry key "My Computer¥HKEY_LOCAL_MACHINE¥SOFTWARE¥ABC¥Setup¥Rsst" has been selected. A display field 162 displays a value described in the registry key selected in the display field 161.

In the example illustrated in FIG. 66, the name of the CD-ROM 10 is "CD_Name". Furthermore, two pieces of information have been stored. More specifically, data of the name "USA_CD" and the data type "REG_SZ" and data of the name "America" and the data type "REG_SZ" have been stored.

The registry key and the registry information are described by the setup application 129 when the setup application 129 of the device (printer), which is an application other than the management application, is executed. The setup application 129 is generally supplied with the printer.

FIG. 66 illustrates an example of information 2301 described in the registry of the PC 1 according to the present exemplary embodiment. The display field 161, which indicates the tree structure of the registry, includes information about the printer 131 (FIG. 69) "My Computer¥HKEY_LOCAL_MACHINE¥SOFT-WARE¥ABC¥Setup¥Rsst" as a registry key. Furthermore, the display field 161 includes the description "My Computer¥HKEY_LOCAL_MACHINE¥SOFT-WARE¥ABC¥Setup¥Kmmn" as a registry key (FIG. 44). The registry key indicates information about the printer 5 (FIG. 69). Therefore, it can be recognized that the PC 1 has been installed with two printer drivers, namely, the printer 131 and the printer 5.

Accordingly, the present exemplary embodiment can at least identify the device to be managed by the management application to either of the printer 131 and the printer 5. Furthermore, the present exemplary embodiment can identify that "USA" has been set as the area information because "USA_CD" is set to "CD_Name" in both registry keys. Therefore, the above-described case corresponds to the case 3. When the user presses the support button 116 (FIG. 41), the user support page for the U.S. 155 (FIG. 63) is displayed according to the processing in the flow charts in FIGS. 60 through 62.

Figure 67:
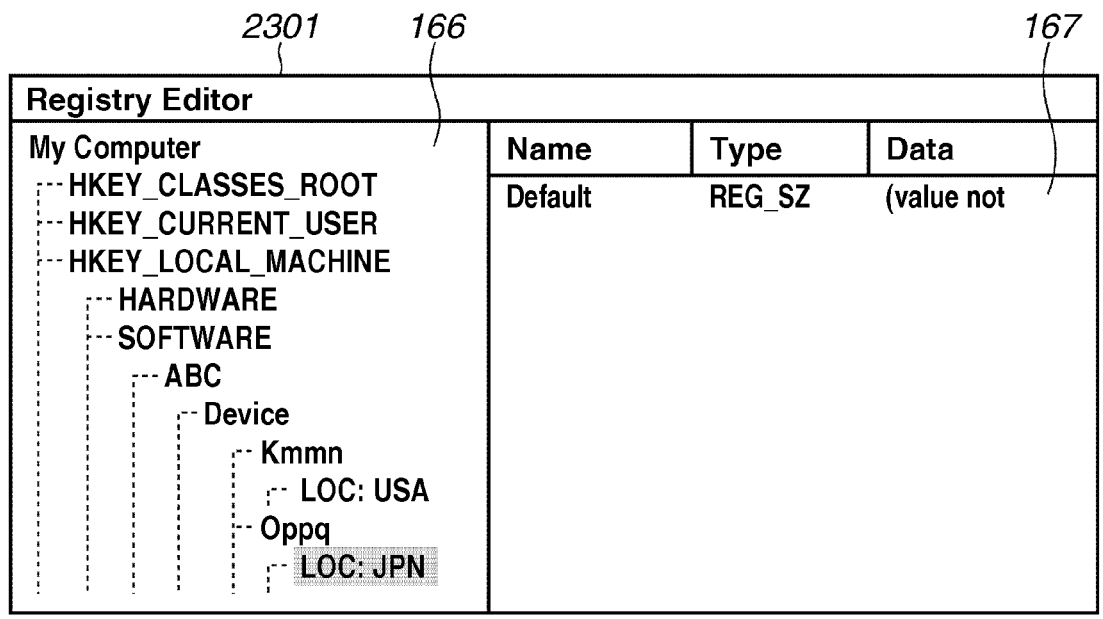
FIG. 67 illustrates an example of information described in the registry of a PC according to the fourth exemplary embodiment of the present invention.

FIG. 67 illustrates an example of information 2301 described in the registry of the PC 1 according to the present exemplary embodiment. Referring to the example shown in FIG. 67, a display field 166 indicates the tree structure of the registry. In the display field 166, a registry key "My Computer¥HKEY_LOCAL_MACHINE¥SOFTWARE¥ ABC¥Device¥Oppq¥LOC:JPN" has been selected. A display area 167 indicates a value described in the registry key selected in the display field 166. In the example illustrated in FIG. 67, only the default registry information, which has been generated when the registry key was generated, is described.

The registry key is generated in the following manner. That is, the language monitor 36 acquires a device ID illustrated in each of the examples shown in FIGS. 73A through 73C from the printer 130 when the printer driver 50 operates. Then, information to be included in the registry key is generated based on the information included in the acquired device ID. Then, the acquired information is described in the registry key. The registry key generated in this manner includes the model name of the device identified according to the device ID and the destination information of the device.

The destination information can be converted into the area information. Accordingly, the model name and the destination information of the device can be acquired from the registry key. However, the present exemplary embodiment is not limited to this. That is, it is also useful if a similar registry key is generated by another arbitrary method that can implement the effect of the present exemplary embodiment. More specifically, it is also useful if a registry key is generated based on the information about the device acquired by the printer driver 50 by utilizing a unit other than that described above.

Referring to the example shown in FIG. 67, the registry key "My Computer¥HKEY_LOCAL_ MACHINE¥SOFTWARE¥ABC¥Device¥Oppq¥LOC:JPN" indicates information about the printer 130 (FIG. 69).

In the example illustrated in FIG. 67, the registry key "My Computer¥HKEY_LOCAL_MACHINE¥SOFTWARE¥ ABC¥Device¥Kmmn¥LOC:USA", which is also described above with reference to FIG. 44, is described. The registry key indicates the information about the printer 5 (FIG. 69). Furthermore, in the example illustrated in FIG. 67, the device to be managed by the management application can be identified to either of the printer 130 or the printer 5.

Furthermore, because the destination of the printer 130 is Japan ("LOC:JPN") and the destination of the printer 5 is the United States ("LOC:USA"), the area information about the printer 130 can be set as "JPN" and that about the printer 5 can be set as "USA". Accordingly, the above-described case is a case derived from the cases 2 and 3.

When the user presses the support button 116 (FIG. 41), the display screen 158 (FIG. 65) is displayed according to the processing in the flow chart in each of FIGS. 60 through 62.

FIGS. 68A through 68E each illustrate an example of a screen displayed on the display unit 1205 provided by the management application according to the present exemplary embodiment. Referring to the example shown in FIG. 68A, the user can input an instruction for utilizing the function of a management application 135 via the display screen. The management application 135 includes the support button for Japan 136. The support button for Japan 136 can be operated by the user to issue an instruction for shifting to a screen that provides the user support. The download button for Japan 137 can be operated by the user to issue an instruction for shifting to a screen that provides the software downloading function.

The support button for America 150 and the download button for America 151 are displayed as icons mutually different in their color and shape to clearly indicate that they offer different services.

Figure 68A:
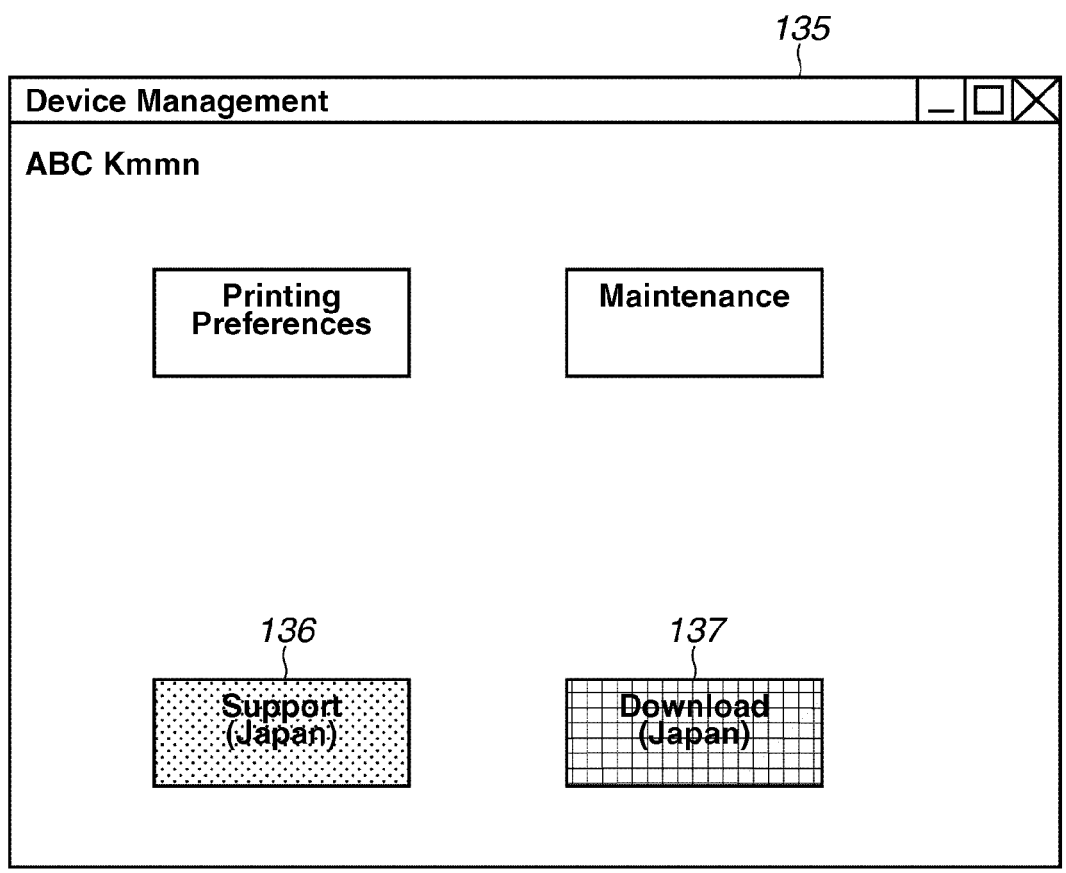
FIGS. 68A through 68E each illustrate an example of a screen displayed on a display unit as a function of a management application according to the fourth exemplary embodiment of the present invention.
Figure 68B:
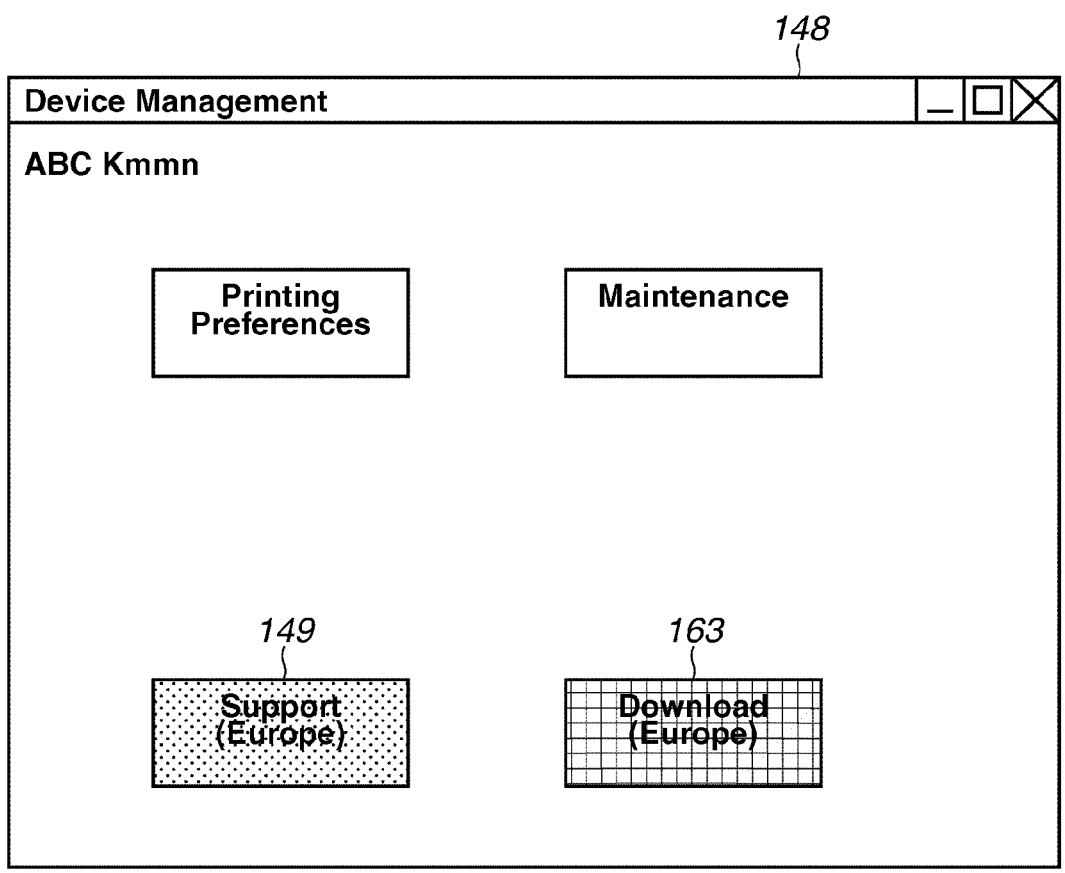
Figure 68C:
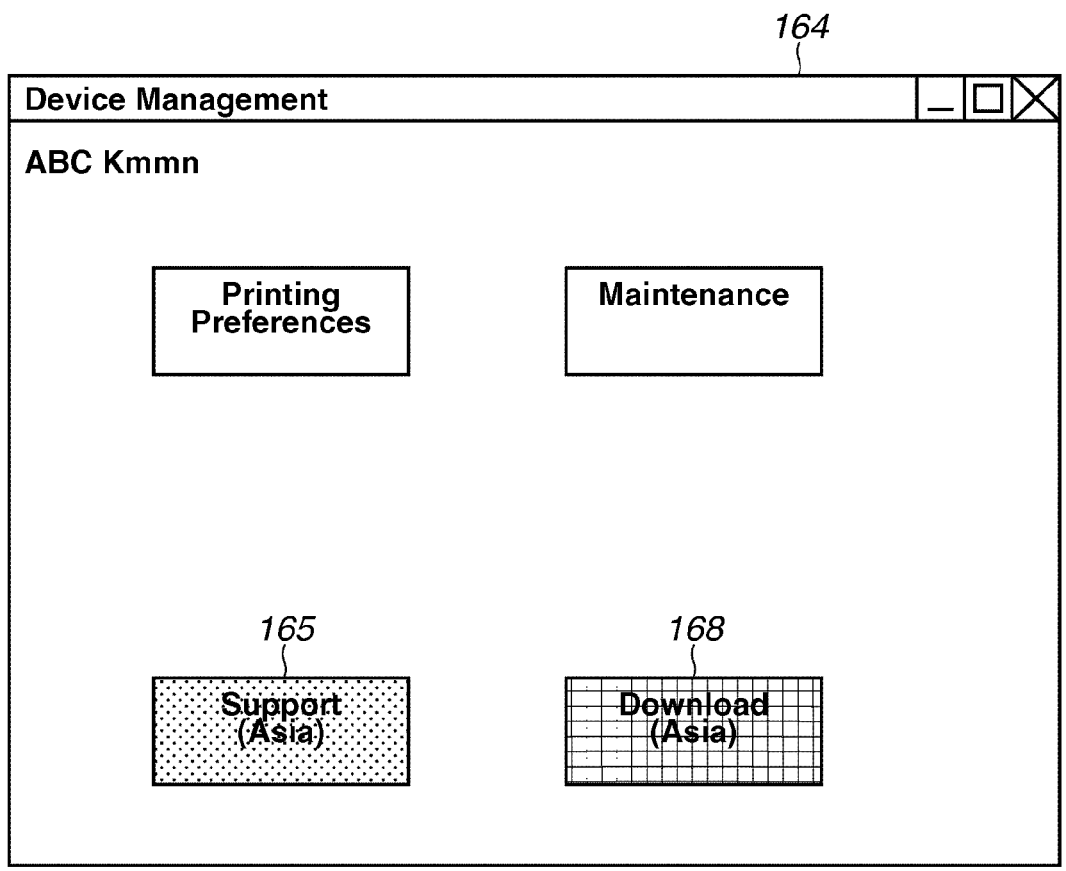

FIG. 68A illustrates a case where the setup on the printer 3 is executed by utilizing the setup application 129 (FIG. 69) (the case 4), in which the model name is "Kmmn" and "CD_Name" is "JPN_CD". As described above, the model name and the area information can be identified by operating on the screen illustrated in FIG. 68A.

Referring to the example shown in FIG. 68B, the user can input an instruction for utilizing a management application 148 via a screen illustrated therein to manage the printer. A support button for Europe 149 and a download button for Europe 163 are displayed as icons mutually different in their color and shape to clearly indicate that they offer different services.

FIG. 68B illustrates a case where the setup on the printer 6 is executed by utilizing the setup application 129 (FIG. 69) (the case 4), in which the model name is "Kmmn" and "CD_Name" is "EUR_CD". As described above, the model name and the area information can be identified by operating on the screen illustrated in FIG. 68B.

Referring to the example shown in FIG. 68C, the user can input an instruction for utilizing a function of a management application 164 via a screen illustrated therein to manage the printer. A support button for Asia 165 and a download button for Asia 168 are displayed as icons mutually different in their color and shape to clearly indicate that they offer different services.

FIG. 68C illustrates a case where the setup on the printer 7 is executed by utilizing the setup application 129 (FIG. 69) (the case 4), in which the model name is "Kmmn" and "CD_Name" is "ASIA_CD". As described above, the model name and the area information can be identified by operating on the screen illustrated in FIG. 68C.

Figure 68D:
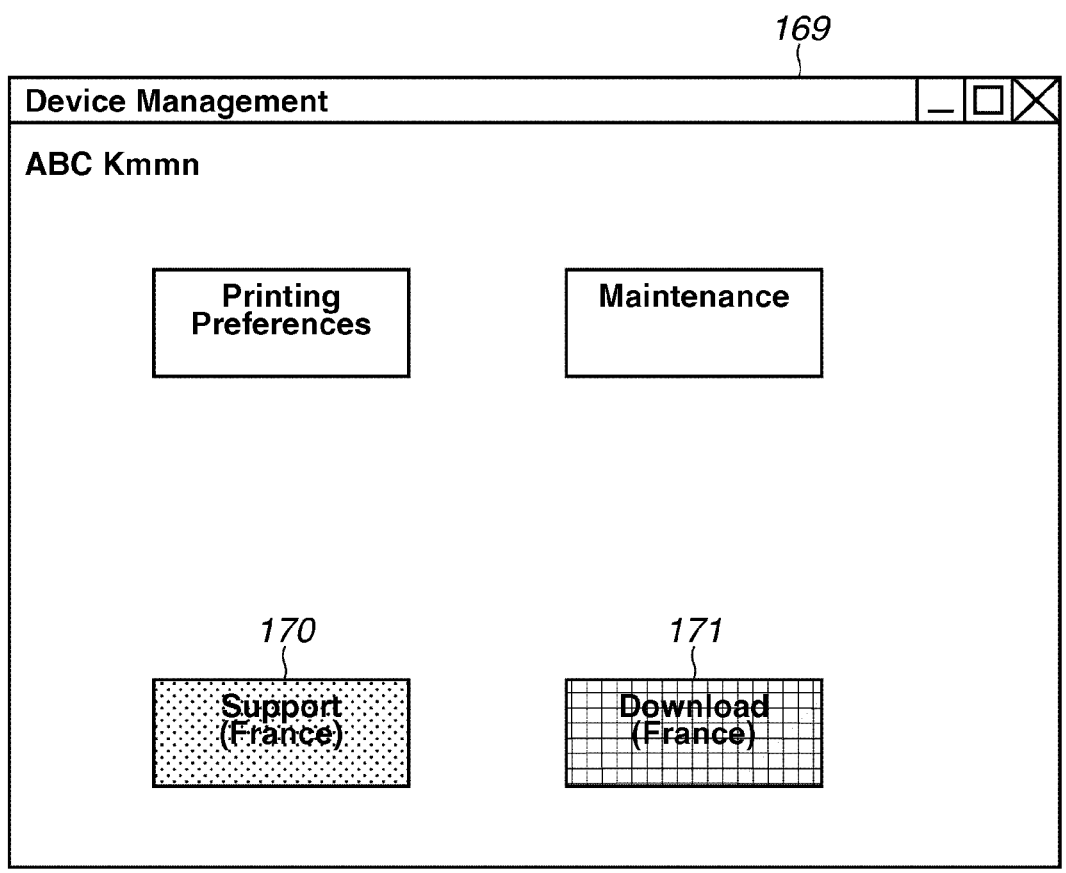

Referring to the example shown in FIG. 68D, the user can input an instruction for utilizing a function of a management application 169 via a screen illustrated therein to manage the printer. A support button for France 170 and a download button for France 171 are displayed as icons mutually different in their color and shape to clearly indicate that they offer different services.

FIG. 68D illustrates a case where the information stored by the printer driver 50 or the language monitor 36 in the registry key is utilized according to the device ID acquired from the printer 6 (the case 4), in which the model name is "Kmmn" and the destination ("LOC:") is "FRA". As described above, the model name and the area information can be identified by operating on the screen illustrated in FIG. 68D. The example illustrated in FIG. 68D is different from the example illustrated in FIG. 68B in a point that the area information in FIG. 68D is restricted to "France".

Figure 68E:
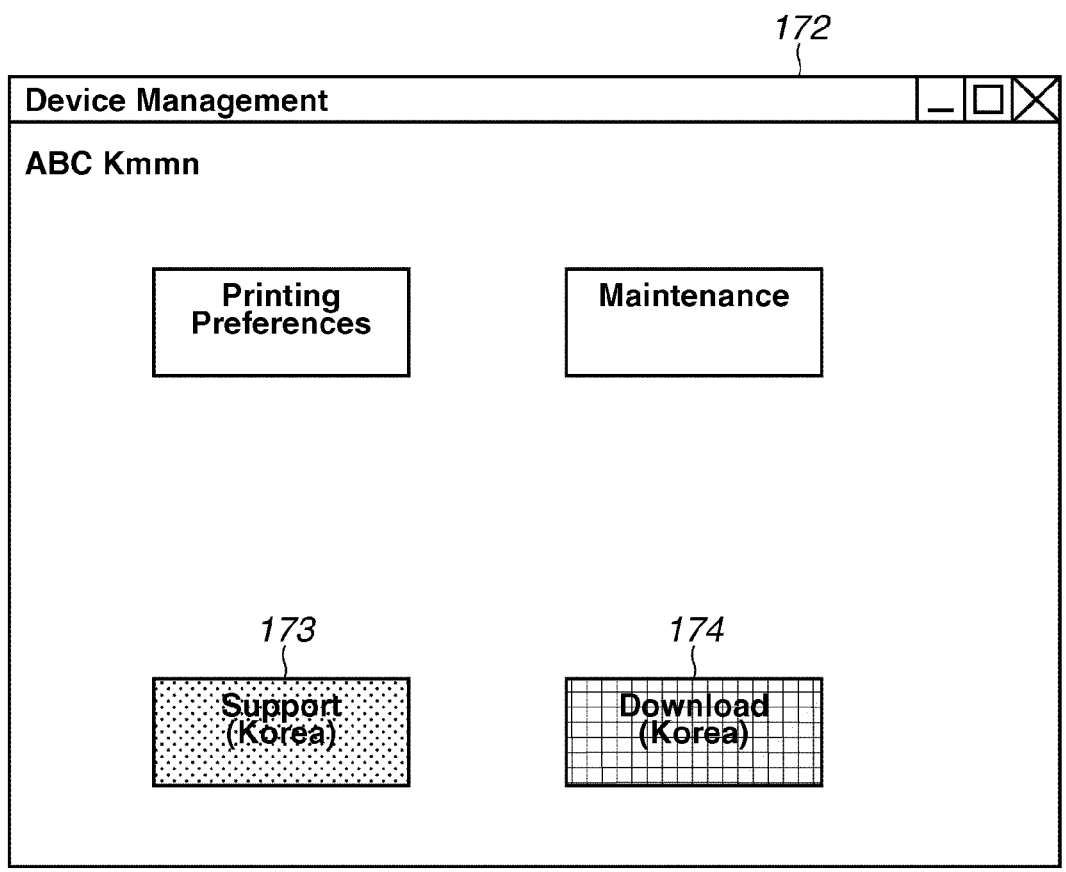

Referring to the example shown in FIG. 68E, the user can input an instruction for utilizing a function of a management application 172 via a screen illustrated therein to manage the printer. A support button for Korea 173 and a download button for Korea 174 are displayed as icons mutually different in their color and shape to clearly indicate that they offer different services.

FIG. 68E illustrates a case where the information stored by the printer driver 50 or the language monitor 36 in the registry key is utilized according to the device ID acquired from the printer 7 (the case 4), in which the model name is "Kmmn" and the destination ("LOC:") is "KOR". As described above, the model name and the area information can be identified by operating on the screen illustrated in FIG. 68E. The example illustrated in FIG. 68E is different from the example illustrated in FIG. 68C in a point that the area information in FIG. 68E is restricted to "Korea".

FIG. 70 illustrates an example of a user support page display screen displayed on the display unit 1205 by using the web browser 106 according to the present exemplary embodiment. Referring to FIG. 70, a Japanese user support page 179 describes information about the user support for the device such as a FAQ of the device of ABC Corporation. A model name selection field 180 displays a list of the model names of the device ("Kmmn", "Deef", "Oppq", and "Rsst"). The user can select a desired model name from among those included in the list. In the example illustrated in FIG. 70, no model name has been selected and the mere list of model names is displayed. A user support information display field 181 displays, in Japanese, various support information about the device selected in the model name selection field 180.

Figure 71:
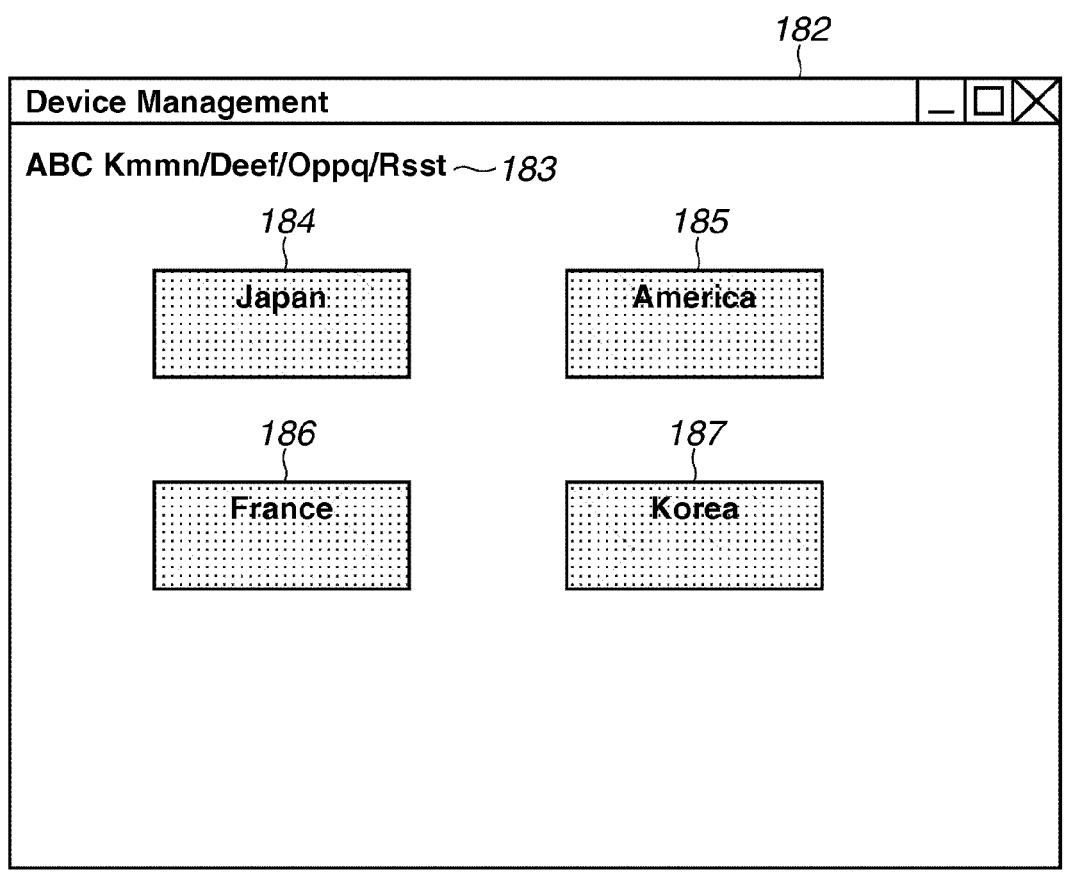
FIG. 71 illustrates an example of a screen displayed on a display unit as a function of a management application according to the fourth exemplary embodiment of the present invention.

FIG. 71 illustrates an example of a screen displayed on the display unit 1205 provided by the management application according to the present exemplary embodiment. The user can input an instruction for utilizing the function of the management application via a display screen 182. When the user presses the support button 116 (FIG. 41), the management application 182 can be displayed according to the current status.

In the example illustrated in FIG. 71, no printer has been identified. Accordingly, all of the model names of the printer that is the target of support by the management application are displayed in a printer name display field 183.

When the user presses a support button for Japan 184, "Japan" is set as the area information. Then, a user support page 179 (FIG. 70) of the web site for the Japanese market is displayed on the web browser 106. Similarly, when the user presses a support button for America 185, the user support page 152 of the web site for the U.S. market (FIG. 59) is displayed on the web browser 106.

Similarly, when the user presses a support button for France 186 or a support button for Korea 187, a user support page of the web site for the market of each country is displayed on the web browser 106. All of the support buttons 184 through 187 are displayed as icons similar to the support button 116 with respect to their color and shape to clearly indicate that they offer the user support service.

With the above-described configuration, the present exemplary embodiment can allow the user to visually and easily recognize that the user can access the user support page of the web site by selecting the desired area by pressing the corresponding button. Accordingly, the present exemplary embodiment can greatly improve user operability.

Figure 72:
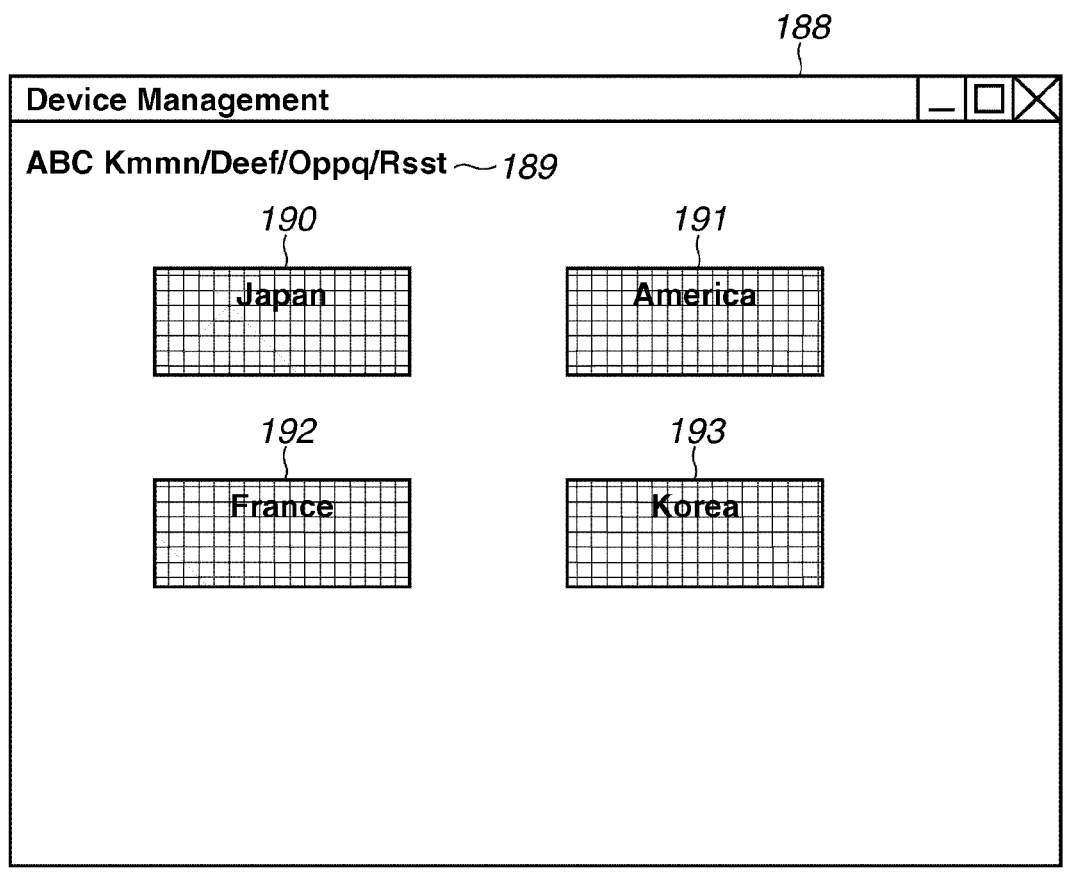
FIG. 72 illustrates an example of a screen displayed on a display unit as a function of a management application according to the fourth exemplary embodiment of the present invention.

FIG. 72 illustrates an example of a screen displayed on the display unit 1205 provided by the management application according to the present exemplary embodiment. The user can input an instruction for utilizing the function of the management application via a display screen 188. When the user presses the download button 117 (FIG. 41), the management application 188 can be displayed according to the current status.

In the example illustrated in FIG. 72, no printer has been identified. Accordingly, all of the model names of the printer that is the target of the support by the management application are displayed in a printer name display field 189. When the user presses the support button for Japan 190, Japan is set as the area information. Furthermore, a software downloading page of the web site for the Japanese market is displayed by the web browser 106. A software download button for America 191, a software download button for France 192, and a software download button for Korea 193 can be operated by the user to issue an instruction for displaying a software downloading page of the web site for each corresponding market on the web browser 106.

The download buttons 190 through 193 are displayed as icons having the color and shape similar to as those of the download button 117 to clearly indicate that the user can download software by operating the button. As described above, the present exemplary embodiment can allow the user to visually and easily recognize that the user can access the software downloading page of the web site by selecting the desired area by pressing the corresponding button. Thus, the present exemplary embodiment can greatly improve the user operability.

FIGS. 73A through 73C each illustrate an example of a device ID according to the present exemplary embodiment. Referring to the example shown in FIG. 73A, a device ID of the printer 130 includes the following information.

| | |
|---|---|
| Manufacturer (MFG:): | ABC |
| Model (MDL:): | Oppq |
| Class (CLS:): | PRINTER |
| Command (CMD:): | K4 (ABC Corporation's private print control command) |
| Description (DES:): | ABCO ppq |
| Destination (LOC:): | JPN (Japan) |

Referring to the example shown in FIG. 73B, a device ID of the printer 131 includes the following information.

| | |
|---|---|
| Manufacturer (MFG:): | ABC |
| Model (MDL:): | Rsst |
| Class (CLS:): | PRINTER |
| Command (CMD:): | K4 (ABC Corporation's private print control command) |
| Description (DES:): | ABC Rsst |
| Destination (LOC:): | USA (America) |

Referring to the example shown in FIG. 73C, a device ID of the printer 204 includes the following information.

| | |
|---|---|
| Manufacturer (MFG:): | ABC |
| Model (MDL:): | Deef |
| Class (CLS:): | PRINTER |
| Command (CMD:): | K4 (ABC Corporation's private print control command) |
| Description (DES:): | ABC Deef |
| Destination (LOC:): | FRA (France) |

Figure 34:
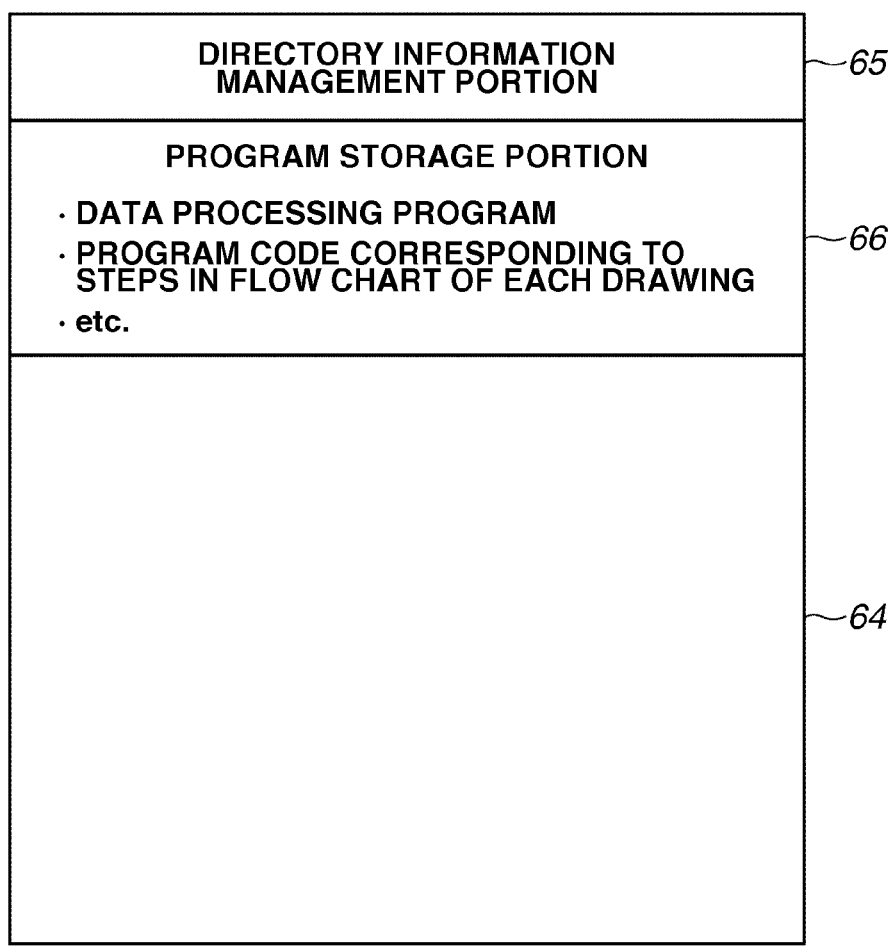
FIG. 34 illustrates an example of a memory map of a storage medium storing various data processing programs that can be read in the system according to an exemplary embodiment of the present invention.

FIG. 34 illustrates an example of a memory map of a storage medium storing various data processing programs that can be read in a peripheral apparatus control system according to an exemplary embodiment of the present invention.

Although not illustrated in FIG. 34, information for managing the programs stored in the storage medium such as version information and information concerning the creator of a program, for example, can be stored in the storage medium. In addition, information that depends on an OS of an apparatus that reads the program, such as an icon for identifying and displaying the program, can be stored in the storage medium.

Referring to the example shown in FIG. 34, a storage medium 64 includes a hard disk. A directory information management unit 65 manages data that is subordinate to various programs. A program storage unit 66 can store a program for installing the various programs on a computer. In addition, the program storage unit 66 can store a program for decompressing a compressed program if a program to be installed has been compressed.

Furthermore, the functions according to the above-described exemplary embodiments illustrated in the examples shown in FIGS. 13 through 15, FIGS. 21 and 22, FIGS. 27 through 29, and FIGS. 60 through 62 can be implemented by a host computer using a program and/or computer-executable instructions that are externally installed. In this case, aspects of the present invention may be applied to the case where a group of information including a program and/or computer-executable instructions is supplied to an output device from a storage medium such as a CD-ROM, a flash memory, and a flexible disk (FD) or from an external storage medium via a network.

Aspects of the present invention can also be achieved by providing a system or an apparatus with a computer-readable storage medium storing program code of software and/or computer-executable instructions implementing the functions of the embodiments, and by reading and executing the program code and/or computer-executable instructions stored in the storage medium with a computer of the system or the apparatus (a CPU or a micro processing unit (MPU)).

In this case, the storage medium having the program code and/or computer-executable instructions itself, may implement functions of the embodiments described above, and accordingly, the storage medium storing the program code may constitute an aspect according to the present invention.

As the storage medium for supplying such program code and/or computer-executable instructions, a floppy disk, a hard disk, an optical disk, a magneto-optical disc (MO), a CD-ROM, a compact disc recordable (CD-R), a compact disc rewritable (CD-RW), a magnetic tape, a nonvolatile memory card, a ROM, and electrically erasable programmable ROM (EEPROM), for example, can be used.

In addition, in one version, functions according to embodiments of the invention can be implemented not only by executing the program code read by the computer, but also implemented by the processing in which an OS or the like carries out a part of or the whole of the actual processing based on an instruction given by the program code and/or computer-executable instructions.

In the above-described exemplary embodiments of the present invention, the management applications (Device Management) illustrated in FIGS. 7 through 9 and FIG. 30 are described as an example of the management applications 80, 81, 98, and 100. However, the present invention is not limited to this. That is, it may also be useful to implement effects according to embodiments of the present invention with an arbitrary application having a function similar to that described above.

In the above-described exemplary embodiments of the present invention, an inkjet printer is described. However, the present invention is not limited to this. That is, an arbitrary type printer such as a laser beam printer can also be used to implement the effect of the present invention. In this case, the present invention can be implemented as a toner cartridge purchasing service.

In the above-described exemplary embodiments of the present invention, a PC is used as an example of the information processing apparatus. However, the present invention is not limited to this. That is, the present invention can also be implemented on an information processing apparatus (terminal apparatus) that can be used in a manner similar to that described above, such as a set-top box, an Internet home appliance, or the like.

In the above-described exemplary embodiments of the present invention, an OS similar to Windows® Vista is used as the OS. However, the present invention is not limited to this. That is, an arbitrary OS can also be used to implement the present invention.

Furthermore, in the above-described exemplary embodiments of the present invention, Ethernet is used as an example of the network 4. However, a different arbitrary network can also be used.

In addition, in the above-described exemplary embodiments of the present invention, Ethernet is used as an example of an interface between the PC 1 and the printers 3, 5, 6, and 7. However, a different arbitrary interface, such as a wireless the LAN, Institute of Electrical and Electronic Engineers (IEEE) 1394, Bluetooth, or USB can also be used.

Furthermore, WSD is used as an example of a protocol for the web service. However, a different arbitrary protocol such as an IHV unique protocol can also be used.

In the above-described exemplary embodiments of the present invention, the service of an online cartridge purchasing system is described. However, the exemplary embodiments of the present invention can also be implemented as an appropriate arbitrary service.

In the above-described exemplary embodiments of the present invention, a model name selection field is provided on a user support page and a software downloading page, and the peripheral apparatus control system having such configuration can allow a user to select a desired model name via the model name selection field. However, a function similar to the model name selection field can also be provided to the management application, instead.

In addition, the peripheral apparatus control system according to the exemplary embodiments of the present invention includes a management application having a function for selecting area information. Furthermore, the peripheral apparatus control system can allow the user to select a desired area by using this function and open a user support page and a software downloading page of a web site of the designated country or area by accessing thereto. However, the present invention is not limited to this. That is, it may also be useful if a function for selecting area information is provided on a user support page or a software downloading page, for example.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-107942 filed Apr. 17, 2008, No. 2008-256417 filed Oct. 1, 2008, and No. 2009-035628 filed Feb. 18, 2009, which are hereby incorporated by reference herein in their entirety.

What is claimed is:

1. An information processing apparatus comprising:
a first display unit configured to display a first object which accepts an instruction to provide a first function when a first area information is stored in a registry of the information processing apparatus and the first area information indicates a first geographical location; and
a second display unit configured to display the first object which accepts the instruction to provide the first function without displaying a second object which accepts an instruction to provide a second function when the first area information is not stored in the registry and second area information which is acquired from a peripheral apparatus indicates the first geographical location, and to display the second object which accepts the instruction to provide the second function without displaying the first object which accepts the instruction to provide the first function when the first area information is not stored in the registry and the second area information indicates a second geographical location, wherein the first area information in the first display unit is information stored in a setup program for setting up a driver before the peripheral apparatus is connected.

2. The information processing apparatus according to claim 1, further comprising:

an acquisition unit configured to acquire the second area information, which is information about a destination from the peripheral apparatus via a communication line or from information included in a device ID for identifying the peripheral apparatus.

3. The information processing apparatus according to claim 1, further comprising:

a third display unit configured to display a third object which accepts an instruction to provide a software downloading service.

4. The information processing apparatus according to claim 1, further comprising:

a third display unit configured to display, on a screen, an icon corresponding to functions for performing a setting on the peripheral apparatus, an icon corresponding to functions for providing a user support service, and an icon corresponding to functions for providing a software downloading service.

5. A method for managing an information processing apparatus, the method comprising:

displaying a first object which accepts an instruction to provide a first function when first area information is stored in a registry of the information processing apparatus and the first area information indicates a first geographical location; and displaying the first object which accepts an instruction to provide the first function without displaying a second object which accepts an instruction to provide a second function when the first area information is not stored in the registry and second area information which is acquired from a peripheral apparatus indicates the first geographical location, and displaying the second object which accepts the instruction to provide the second function without displaying the first object which accepts the instruction to provide the first function when the first area information is not stored in the registry and the second area information indicates a second geographical location, wherein the first area information is information which is stored in a setup program for setting up a driver before the peripheral apparatus is connected.

6. A non-transitory computer-readable storage medium having computer-executable instructions stored thereon for managing an information processing apparatus, the computer-readable storage medium comprising:

computer-executable instructions for displaying a first object which accepts an instruction to provide a first function when first area information is stored in a registry of the information processing apparatus and the first area information indicates a first geographical location; and computer-executable instructions for displaying the first object which accepts the instruction to provide the first function without displaying a second object which accepts an instruction to provide a second function when the first area information is not stored in the registry and second area information which is acquired from a peripheral apparatus indicates the first geographical location, and displaying the second object which accepts the instruction to provide the second function without displaying the first object which accepts the instruction to provide the first function when the first area information is not stored in the registry and the second area information indicates a second geographical location, wherein the first area information is information which is stored in a setup program for setting up a driver before the peripheral apparatus is connected.

7. The information processing apparatus according to claim 3, wherein the objects displayed by the first display unit, the second display unit, and the third display unit are link buttons.

8. The information processing apparatus according to claim 1, further comprising:

a third display unit configured to display at least two buttons for user support of at least two areas after a user presses a support button.

9. The information processing apparatus according to claim 1, further comprising:

a loading unit configured to load a control file for providing a plurality of functions in each of a first language and a second language which is different from the first language, wherein the objects which the first display unit and second display unit display are in the first language or the second language based upon a user selection, and wherein the plurality of functions include functions for at least one of user support, managing the peripheral apparatus, and controlling the peripheral apparatus.

10. The method according to claim 5, further comprising:
acquiring the second area information which is information about a destination from the peripheral apparatus via a communication line or from information included in a device ID for identifying the peripheral apparatus.

11. The method according to claim 5, further comprising:
displaying an object which accepts an instruction to provide a software downloading service.

12. The method according to claim 5, further comprising:
displaying, on a screen, an icon corresponding to functions for performing a setting on the peripheral apparatus, an icon corresponding to functions for providing a user support service, and an icon corresponding to functions for providing a software downloading service.

13. The method according to claim 11, wherein the displayed objects are link buttons.

14. The method according to claim 5, further comprising:
displaying at least two buttons for user support of at least two areas after a user presses a support button.

15. The method according to claim 5, further comprising:
loading a control file for providing a plurality of functions in each of a first language and a second language which is different from the first language, wherein the displayed objects are in the first language or the second language based upon a user selection, and wherein the plurality of functions include functions for at least one of user support, managing the peripheral apparatus, and controlling the peripheral apparatus.

* * * * *